(12) United States Patent
McDonald et al.

(10) Patent No.: US 7,386,504 B2
(45) Date of Patent: Jun. 10, 2008

(54) MORTGAGE LOAN DATA COLLECTION METHOD AND APPARATUS FOR A FINANCIAL PLANNING ORIGINATOR AND/OR FINANCIAL INSTITUTION ORIGINATOR OF A MORTGAGE LOAN

(75) Inventors: Russell W. McDonald, Orinda, CA (US); Russell W. McDonald, II, Orinda, CA (US)

(73) Assignee: SOURCETEC, Inc., Pleasant Hill, CA (US)

(*) Notice: Subject to any disclaimer, the term of this patent is extended or adjusted under 35 U.S.C. 154(b) by 871 days.

(21) Appl. No.: 10/429,383

(22) Filed: May 5, 2003

(65) Prior Publication Data
US 2004/0019558 A1 Jan. 29, 2004

Related U.S. Application Data

(63) Continuation of application No. 09/349,517, filed on Jul. 8, 1999.

(60) Provisional application No. 60/093,729, filed on Jul. 22, 1998, provisional application No. 60/093,730, filed on Jul. 22, 1998, provisional application No. 60/093,750, filed on Jul. 22, 1998.

(51) Int. Cl.
*G06Q 40/00* (2006.01)
(52) U.S. Cl. .................................................. 705/38
(58) Field of Classification Search ............... 705/38, 705/35, 1
See application file for complete search history.

(56) References Cited

U.S. PATENT DOCUMENTS 2,635,807 A * 4/1953 Flint .......................... 235/375
5,239,462 A * 8/1993 Jones et al. ................... 705/38
5,699,527 A * 12/1997 Davidson ...................... 705/38
5,765,144 A    6/1998 Larche et al.
5,819,230 A * 10/1998 Christie et al. ................. 705/4
5,870,721 A *  2/1999 Norris ......................... 705/38
5,878,403 A    3/1999 DeFrancesco et al.
5,930,776 A    7/1999 Dykstra et al.
5,940,812 A *  8/1999 Tengel et al. .................. 705/38
5,966,699 A * 10/1999 Zandi .......................... 705/38
5,966,700 A * 10/1999 Gould et al. .................. 705/38
5,995,947 A * 11/1999 Fraser et al. .................. 705/38
6,012,047 A    1/2000 Mazonas et al.
6,012,050 A    1/2000 Eaton et al.
6,112,190 A    8/2000 Fletcher et al.

(Continued)

OTHER PUBLICATIONS

Advertisement entitled: "The New Real Estate Environment Is Here." Creation date unknown.

(Continued)

*Primary Examiner*—James P. Trammell
(74) *Attorney, Agent, or Firm*—Earle Jennings; GSS Law Group

(57) ABSTRACT

The present invention includes a method and apparatus for collecting information for a mortgage loan originated by a loan originator for a loan customer in coordination with a loan broker. The loan originator is not the loan broker. The loan originator provides services necessary for the origination of the mortgage loan and not duplicative of services provided by the loan broker. In certain embodiments, the loan originator is at least one of the following: CPA, Financial Planner, Broker/Dealer, Stock Broker, Insurance Broker/Agent, Attorney or other financial professionals. In other embodiments, the loan originator is one of the following: a Bank, Savings and Loan, Thrift, or Credit Union.

19 Claims, 47 Drawing Sheets

U.S. PATENT DOCUMENTS

| | | |
|---|---|---|
| 6,185,543 B1 | 2/2001 | Galperin et al. |
| 6,192,347 B1 * | 2/2001 | Graff .................... 705/36 R |
| 6,385,594 B1 | 5/2002 | Lebda et al. |
| 2000/0011246 | 8/2001 | Tammaro |

OTHER PUBLICATIONS

Advertisement entitled: "Third Party Loan Orgination Compliance Empowers." Creation date unknown.

Advertisement entitled: "We Have Compliance Down To A System." Creation date unknown.

Advertisement entitled: "The Recognized Leader in Compliance." Creation date unknown.

Advertisement entitled: "One Pipeline Success in The Face of Change." Creation date unknown.

Possibly web page or PowerPoint print outs (21 pagees), First page entitled: "One Pipeline." Creation date unknown.

OnePipeline In Employment Application Agreement (6 pages including attachment A). Creation date unknown.

OnePipeline Real Estate Broker/Owner Assistance Agreement. Creation date unknown.

News release entitled: "OnePipeline Picks UP Insurance Agents." Dated Sep. 3, 2001.

OnePipeline Co-Mortage Broker Agreement. Creation date unknown.

* cited by examiner

STEP #4 (CONT) - INFORMATION AND INTERVIEW
FOR ORIGINATOR "RE"

― 220

Property information to be entered includes (but is not limited to) sales price of home, contingencies, amount of deposits, amount of future deposits, etc. ORIGINATOR also tells Cypher whether the Buyer/Borrower wants a set loan amount or if the loan is to be a set percentage of the ultimate sales price.

― 222

Loan details to be entered include (but are not limited to) estimated final sales price after all options are selected and an estimated final loan amount (should estimate on the high side); rate; term; points; whether or not there is a balloon payment; title and escrow fees (if Cypher has these fees in advance they can be pre-programmed into the system) and whether or not ORIGINATOR is giving a credit for closing costs. Such a credit can be manually input or Cypher can calculate the credit if it is based on a pre-determined formula. ORIGINATOR will also indicate whether or not the Buyer/Borrower will have impounds for taxes/insurance.

― 224

ORIGINATOR must also complete the Declarations section on the loan application (example page 3 of current FNMA 1003), this section discloses any lawsuits, bankruptcies, foreclosures, loan defaults, etc. Also, information about sex and national origin is requested. If Buyer/Borrower does not wish to provide information about sex and national origin, ORIGINATOR will acknowledge that Buyer/Borrower does not wish to provide such information.

| ORIGINATOR prints and explains forms to Buyer/Borrower, including forms and pamphlets from the lot folder (the boiler plate forms). Buyer/Borrower signs all forms. | ORIGINATOR collects all applicable documentation on the stacking order checklist from the Buyer/Borrower, including (but not limited to) W-2 forms, paystubs, bank statements, tax returns, bankruptcy papers, retirement information, etc. | 228 |

226

ORIGINATOR packages up all gathered information and puts said information in a pre-determined stacking order and sends it to Broker/Lender for processing.

230

Process Continues in Fig. 3Y, Step #5

STEP #4 (CONT) - INFORMATION AND INTERVIEW
FOR ORIGINATOR "B"

─ 290

Property information to be entered includes (but is not limited to) sales price of new home, date of price list being used, prices of any options and upgrades, amount of deposits, amount of future deposits, etc. ORIGINATOR also tells Cypher whether the Buyer/Borrower wants a set loan amount or if the loan is to be a set percentage of the ultimate sales price.

Loan details to be entered include (but are not limited to) estimated final sales price after all options are selected and an estimated final loan amount (should estimate on the high side); rate; term; points; whether or not there is a balloon payment; title and escrow fees (if Cypher has these fees in advance they can be pre-programmed into the system) and whether or not ORIGINATOR is giving a credit for closing costs. Such a credit can be manually input or Cypher can calculate the credit if it is based on a pre-determined formula. ORIGINATOR will also indicate whether or not the Buyer/Borrower will have impounds for taxes/insurance.

─ 292   ─ 294

ORIGINATOR must also complete the Declarations section on the loan application (example page 3 of current FNMA 1003), this section discloses any lawsuits, bankruptcies, foreclosures, loan defaults, etc. Also, information about sex and national origin is requested. If Buyer/Borrower does not wish to provide information about sex and national origin, ORIGINATOR will acknowledge that Buyer/Borrower does not wish to provide such information.

| ORIGINATOR prints and explains forms to Buyer/Borrower, including forms and pamphlets from the lot folder (the boiler plate forms). Buyer/Borrower signs all forms. | ORIGINATOR collects all applicable documentation on the stacking order checklist from the Buyer/Borrower, including (but not limited to) W-2 forms, paystubs, bank statements, tax returns, bankruptcy papers, retirement information, etc. |

─ 296   ─ 298

ORIGINATOR packages up all gathered information and puts said information in a pre-determined stacking order and sends it to Broker/Lender for processing.

─ 300   Continue with Step #5, Fig. 3Y →

STEP #3 - PRELIMINARY SETUP - FOR ORIGINATOR "FP"

STEP #4 - (CONT) - FOR ORIGINATOR "FI"
└─ 450

Loan details to be entered include (but are not limited to) rate; term; points; whether or not there is a balloon payment; title and escrow fees (if Cypher has these fees in advance they can be pre-programmed into the system) and whether or not Broker/Lender is giving a credit for closing costs. Such a credit can be manually input or Cypher can calculate the credit if it is based on a pre-determined formula. ORIGINATOR will also indicate whether or not the Buyer/Borrower will have impounds for taxes/insurance. If loan is to be a "No Point, No Fee" Cypher will calculate and disclose applicable credits.

↓ 452

ORIGINATOR must also complete the Declarations section on the loan application (example page 3 of current FNMA 1003), this section discloses any lawsuits, bankruptcies, foreclosures, loan defaults, etc. Also, information about sex and national origin is requested. If Buyer/Borrower does not wish to provide information about sex and national origin, ORIGINATOR will acknowledge that Buyer/Borrower does not wish to provide such information.

↓ 454

ORIGINATOR prints and explains forms to Buyer/Borrower, including forms and pamphlets from the lot folder (the boiler plate forms). Buyer/Borrower signs all forms.

↓ 456

ORIGINATOR collects all applicable documentation on the stacking order checklist from the Buyer/Borrower, including (but not limited to) W-2 forms, paystubs, bank statements, tax returns, bankruptcy papers, retirement information, etc.

↓ 458

ORIGINATOR packages up all gathered information and puts said information in a pre-determined stacking order and sends it to Broker/Lender for processing.

↓   460   Continue with Step #5, Fig. 3Y →

Fig. 3Q

STEP #4 - (CONT) - FOR ORIGINATOR "R"

```
                                                                    ┌─ 530
┌──────────────────────────────────────────────────────────────────────┐
│ Loan details to be entered include (but are not limited to) estimated final sales price │
│ after all options are selected and an estimated final loan amount (should estimate on   │
│ the high side); rate; term; points; whether or not there is a balloon payment; title and│
│ escrow fees (if Cypher has these fees in advance they can be pre-programmed into        │
│ the system) and whether or not Broker/Lender is giving a credit for closing costs       │
│ and if so the amount of the credit. Such a credit can be manually input or Cypher       │
│ can calculate the credit if it is based on a pre-determined formula. ORIGINATOR         │
│ will also indicate whether or not the Buyer/Borrower will have impounds for taxes/      │
│                                  insurance.                                             │
└──────────────────────────────────────────────────────────────────────┘
```

┌─ 532

ORIGINATOR must also complete the Declarations section on the loan application (example page 3 of current FNMA 1003), this section discloses any lawsuits, bankruptcies, foreclosures, loan defaults, etc. Also, information about sex and national origin is requested. If Buyer/Borrower does not wish to provide information about sex and national origin, ORIGINATOR will acknowledge that Buyer/Borrower does not wish to provide such information.

┌─ 534

ORIGINATOR prints and explains forms to Buyer/Borrower, including forms and pamphlets from the lot folder (the boiler plate forms). Buyer/Borrower signs all forms.

┌─ 536

ORIGINATOR collects all applicable documentation on the stacking order checklist from the Buyer/Borrower, including (but not limited to) W-2 forms, paystubs, bank statements, tax returns, bankruptcy papers, retirement information, etc.

┌─ 538

ORIGINATOR packages up all gathered information and puts said information in a pre-determined stacking order and sends it to Broker/Lender for processing.

┌─ 540
           │              Continue with Step #5, Fig. 3Y

Fig. 3U

STEP #4 - (CONT) - FOR ORIGINATOR "C"

─ 580
Property information to be entered includes (but is not limited to) sales price of home, contingencies, amount of deposits, amount of future deposits, etc. Consumer also tells Cypher whether the Buyer/Borrower wants a set loan amount or if the loan is to be a set percentage of the ultimate sales price.

↓ ─ 582
Loan details to be entered include (but are not limited to) estimated final sales price after all options are selected and an estimated final loan amount (should estimate on the high side); rate; term; points; whether or not there is a balloon payment; title and escrow fees (if Cypher has these fees in advance they can be pre-programmed into the system) and if Broker/Lender is giving a credit for all or part of the non-recurring closing costs. Such a credit can be manually input or Cypher can calculate the credit if it is based on a pre-determined formula. Consumer will also indicate whether or not the Buyer/Borrower will have impounds for taxes/insurance.

↓ ─ 584
Consumer must also complete the Declarations section on the loan application (example page 3 of current FNMA 1003), this section discloses any lawsuits, bankruptcies, foreclosures, loan defaults, etc. Also, information about sex and national origin is requested. If Buyer/Borrower does not wish to provide information about sex and national origin, Consumer will acknowledge that Buyer/Borrower does not wish to provide such information.

↓ ─ 586
Consumer prints all forms and also prints an explanation sheet regarding all the forms and then proceeds to sign the forms.

↓ ─ 588
Consumer collects all applicable documentation on the stacking order checklist including (but not limited to) W-2 forms, paystubs, bank statements, tax returns, bankruptcy papers, retirement information, etc.

↓ ─ 590
Consumer packages up all gathered information and puts said information in a pre-determined stacking order and sends it to Broker/Lender for processing.

↓ ─ 592    Continue with Step #5, Fig. 3Y →

Fig. 3X

STEP #5 - PACKAGE RECEIVED BY BROKER/LENDER

Fig. 4C

Contract Information - Lots and Costs (1 of 2) — 34a / 30c

Lot: 1  Block: [ ]  Unit (Phase): [ ]
Our Lot # (if different from above): [ ]
Community Name: Sterling Village
Street Address: 1 Magnolia Avenue
City: Rohnert Park  Zip: 94928
County: Sonoma Amount of daily penalty for late close to be listed in paragraph #6: 100 — 34e
Amount to be listed for liquidated damages [paragraph 14]: 3000 — 34d
☒ Check if Subject to CC&Rs — 34f
☐ Check if Subject to Prior Sale — 34g Date of Price List: 1/1/98
Base Price per List Mentioned Above: 245000
34b — Lot Premium: 500
Upgrades per ATC #1: 6400
34k  #'s for other ATC's: [ ]
Total for other ATC's: 0
Total Purchase Price: 251900
LTV to use for Loan Calcs: ○ 100%  ○ 97%  ○ 95%
— 34h   ○ 90%  ◉ 80%  ○ Other [input loan manually] →

Deposit Received this date [to escrow]: 1000 — 34i, 34j
Deposit Payable To [escrow company]: North American Ti
Date Additional Deposit to be Due: [ ]
Amount of Additional Deposit: 0
Amt ATCs Rec'd: 0
Date Add'l ATCs Due: [ ]
Amt Add'l ATCs Due: 0
Loan Amount: 201520 — 34l

Lender Information
Cost of Credit Report: 55
Lender Name: Wymac Capital
◉ Seller's Lender  ○ Other Lender
Date Loan Contingency Expires: 2/25/98
— 34c

NOTE The figures for purchase price and loan amount WILL NOT be automatically carried forward to the loan screens because the initial numbers usually lack a significant amount of options and the loan applied for may be too low. Try to estimate high on the requested loan amount on the loan screen.

[Next] [Previous] [Main Menu] — 34m

Fig. 4D

Contract Information - Buyer Info (2 of 2) — 30d

Buyers[s] Name[s]: John Smith | Mary Smith — 36f
Present Address: 123 S. Main Street | 123 S. Main Street
36b City, State ZIP: Walnut Creek, CA 94596 | Walnut Creek, CA 94596
36c Home Phone: [510] 932-1234 | [510] 932-1234

Do You ☒ Own ☐ Rent  3 Yrs at Address | Do You ☒ Own ☐ Rent  3 Yrs at Address
36d Monthly Rent/Mtg Payment: 1100 | Monthly Rent/Mtg Payment: 1100
Market Value of Home [if homeowner]: 145000 | Market Value of Home [if homeowner]: 145000

[Copy Address Info to Co-Buyer] — 36g
36i Social Security Number: 123-45-6789 — 36e  Social Security Number: 987-65-4321 — 36j, 36h

Buyer's Employment
○ Employed    Job Title: Custodian
◉ Self-Employed  Employer: We Kleen U
○ Retired     Bus. Address: 123 S. Main Street
○ Not Employed          Walnut Creek, CA
Years There   Bus. Phone: [510] 932-1234
3             Monthly Income: 4500

Co-Buyer's Employment
◉ Employed    Job Title: Receptionist
○ Self-Employed  Employer: Spectacles
○ Retired     Bus. Address: [ ]
○ Not Employed          Walnut Creek
Years There   Bus. Phone: [510] 932-0000
5             Monthly Income: 1200

[Next] [Previous] [Main Menu] — 36a

Loan Information – Screen 1 of 3 — 30e

Est. Final Purchase Price [With ALL Options]: 255000

Loan Amount (38a)
- Loan Amount: 204000

Terms for 1st Mtg (38b)
- Rate: 7.25
- Term [Years]: 30
- Balloon? ○ ◉
- Yrs to Balloon: 0
- Points to Charge: 0

Amort Type: ◉ Fixed  ○ ARM
Loan Type: ◉ Conv.  ○ VA  ○ FHA

Escrow/Title/Tax Issues (38c)
- Escrow Fee:
- Owner's Title Ins.:
- Lender's Title Ins.:
- Transfer Tax: 0

*NOTE* Only input these items if they will be charged to the buyers. If you are giving a credit for using Builder's Lender and want these fees to be paid in part by that credit then enter them here. Note that in many counties the transfer tax is almost seller paid.

☐ Check for Tax/Insurance Impounds

Credit to Closing Costs (38d)
- Amount of Credit towards closing costs to show on application: 2000

[Next] [Previous] [Main Menu] (40)

Loan Information - Screen 2 of 3 — 30f

If the answer to any questions 'a' through 'i' is "YES" then attach explanation (ON NEXT SCREEN)

| Question | Borrower Yes | Borrower No | Co-Borrower Yes | Co-Borrower No |
|---|---|---|---|---|
| a. Are there any outstanding judgements against you? | ☐ | ☒ | ☐ | ☒ |
| b. Have you been declared bankrupt in the last 7 years? | ☐ | ☒ | ☐ | ☒ |
| c. Have you had property foreclosed upon or given title or deed in lieu thereof in the last 7 years? | ☐ | ☒ | ☐ | ☒ |
| d. Are you party to a lawsuit? | ☐ | ☒ | ☐ | ☒ |
| e. Have you directly or indirectly been obligated on any loan which resulted in foreclosure, transfer of title in lieu of foreclosure, or judgement? (This includes such loans as home mtg., SBA Loans, home improvement loans, educational loans, mobile home loans, any mortgage, financial obligation, bond, or loan guarantee. If "Yes" provide details, incl. date, name/address of lender, FHA or VA case # if any and reasons for the action.) | ☐ | ☒ | ☐ | ☒ |
| f. Are you presently delinquent or in default on any federal debt or any other loan, mortgage, financial obligation, bond or loan guarantee? If "YES" give details as described in the preceding section. | ☐ | ☒ | ☐ | ☒ |
| g. Are you obligated to pay alimony, child support or separate maintenance? | ☐ | ☒ | ☐ | ☒ |
| h. Is any part of the down payment borrowed? | ☐ | ☒ | ☐ | ☒ |
| i. Are you a co-maker or co-endorser on a note? | ☐ | ☒ | ☐ | ☒ |
| j. Are you a U.S. citizen? | ☒ | ☐ | ☒ | ☐ |
| k. Are you a permanent resident alien? | ☐ | ☒ | ☐ | ☒ |
| l. You intend to occupy property as primary residence? | ☒ | ☐ | ☒ | ☐ |
| m. Have you had ownership in property in last 3 yrs? If yes select appropriate answers from list below | ☐ | ☒ | ☒ | ☐ |

(38e)

Borrower: [PR - Principal Res. ▼] [Owned w/Spouse [S] ▼]
Co-Borrower: [PR - Principal Res. ▼] [Owned w/Spouse [S] ▼]
(38f)

[Next] [Previous] [Main Menu] (42)

Fig. 4F

Client Information Screen

| | | | |
|---|---|---|---|
| Borrower(s) Name(s) | John Smith | Mary Smith | |
| Present Address | 123 S. Main Street | 123 S. Main Street | |
| City, State ZIP | Walnut Creek, CA 94596 | Walnut Creek, CA 94596 | |
| Home Phone | (925) 932-1234 | Home Phone (925) 932-1234 | |

Do You ☑ Own ☐ Rent  4  Yrs at Address          Do You ☑ Own ☐ Rent  4  Yrs at Address
Monthly Rent/Mtg Payment  $1,500.00              Monthly Rent/Mtg Payment  $1,500.00
Market Value of Home [if homeowner]  $250,000.00  Market Value of Home [if homeowner]  $250,000.00

Copy Address Info to Co-Borrower

Social Security Number  123-45-6789              Social Security Number  987-65-4321

Copy Address from Borrower's Address Above    Subject Property Address  123 S. Main Street - Walnut Creek, CA ☐ Self-Employed   Job Title  Supervisor          ☐ Self-Employed   Job Title  Manager
Years There  4    Employer  City of Walnut Creek  Years There  5    Employer  Cal-Trans
                  Bus. Address                                      Bus. Address
Monthly Income  $4,000.00   Phone  (925) 935-0000  Monthly Income  $4,000.00   Phone  (925) 937-9990

Main Menu

Loan Information -- Screen 1 of 3

Property Value  250000

Are there other liens on this property for which borrower is obligated? ☑ Yes ☐ No

| Lienholder's Name: | Bank of America | Amt Owing: | $200,000.00 | Priority: | First |
|---|---|---|---|---|---|
| | | | $0.00 | | |
| | | | $0.00 | | |

Loan Amount
Loan Amount  $200,000.00

Terms for 1st Mtg
Rate  7.25
Term [Years]  30
Balloon? ○ Yes  ● No
Yrs to Balloon  0
Points to Charge  0

Escrow Fee  $372.00
Lender's Title Fee  $620.90
☑ Check for Impounds for Taxes/Ins.
☑ Check for No Point/No Fee Loan

| Amort Type | Loan Type |
|---|---|
| ● Fixed | ● Conventional |
| ○ ARM | ○ VA |
| | ○ FHA |

Next
Previous
Main Menu

Fig. 5D

| Loan Information - Screen 2 of 3 | | | | | |
|---|---|---|---|---|---|
| If the answer to any questions 'a' through 'i' is "YES" then attach explanation (ON NEXT SCREEN) | Borrower Yes | No | Co-Borrower Yes | No | |
| a. Are there any outstanding judgements against you? | ☐ | ☑ | ☐ | ☑ | |
| b. Have you been declared bankrupt in the last 7 years? | ☐ | ☑ | ☐ | ☑ | |
| c. Have you had property foreclosed upon or given title or deed in lieu thereof in the last 7 years? | ☐ | ☑ | ☐ | ☑ | |
| d. Are you party to a lawsuit? | ☐ | ☑ | ☐ | ☑ | |
| e. Have you directly or indirectly been obligated on any loan which resulted in foreclosure, transfer of title in lieu of foreclosure, or judgement? (This includes such loans as home mtg., SBA Loans, home improvement loans, educational loans, mobile home loans, any mortgage, financial obligation, bond, or loan guarantee. If "Yes" provide details, incl. date, name/address of lender, FHA or VA case #, if any and reasons for the action.) | ☐ | ☑ | ☐ | ☑ | |
| f. Are you presently delinquent or in default on any federal debt or any other loan, mortgage, financial obligation, bond or loan guarantee? If "YES" give details as described in the prceding section. | ☐ | ☑ | ☐ | ☑ | |
| g. Are you obligated to pay alimony, child support or separate maintenance? | ☐ | ☑ | ☐ | ☑ | |
| h. Is any part of the down payment borrowed? | ☐ | ☑ | ☐ | ☑ | |
| i. Are you a co-maker or co-endorser on a note? | ☐ | ☑ | ☐ | ☑ | |
| j. Are you a U.S. citizen? | ☑ | ☐ | ☑ | ☐ | [Next] |
| k. Are you a permanent resident alien? | ☐ | ☑ | ☐ | ☑ | |
| l. You intend to occupy property as primary residence? | ☑ | ☐ | ☑ | ☐ | [Previous] |
| m. Have you had ownership in property in last 3 yrs? If yes select appropriate answers from list below | ☑ | ☐ | ☑ | ☐ | [Main Menu] |
| Borrower [PR - Principal Res. ▼] [Owned w/Spouse [S▼] | | | Co-Borrower [PR - Principal Res. ▼] [Owned w/Spouse [S▼] | | |

Fig. 5E

| Loan Information - Screen 3 of 3 |
|---|
| X. INFORMATION FOR GOVERNMENT MONITORING PURPOSES |

| ☐ Do not wish to provide ☐ Male ☑ Female | ☐ Do not wish to provide ☑ Male ☐ Female |
|---|---|
| ☐ American Indian or Alaskan Native ☐ Asian or Pacific Islander ☑ White, not Hispanic | ☐ American Indian or Alaskan Native ☐ Asian or Pacific Islander ☑ White, not Hispanic |
| ☐ Black, not Hispanic ☐ Hispanic ☐ Other (specify) | ☐ Black, not Hispanic ☐ Hispanic ☐ Other (specify) |

Use the following text boxes to attach any explanations required for declarations section or any other information that needs to be included on page 4. The system will automatically carry over any additional assets/liabilities on its own.

[text box]

[Next] [Previous] [Main Menu]

Fig. 5F

Print Menu - Loan Forms [CPA Version]

- ☑ 1003 - Page 1
- ☑ 1003 - Page 2
- ☑ 1003 - Page 3
- ☑ 1003 - Page 4
- ☑ CA 883 - Page 1
- ☑ CA 883 - Page 2
- ☑ Fair Lending Notice
- ☑ Information Disclosure Authorization
- ☑ CA Appraisal Notice
- ☑ IRS 4506
- ☑ Wymac/CPA Disclosure
- ☑ Asset/Liabilities Disclosure Print Forms ◉ Print ALL forms on LEGAL sized paper [default].
○ Print Letter sized forms on LETTER sized paper

DONE

Fig. 5G

Calculation Results

| | Rate #1 | Points (#1) | Payment (#1) | PITI #1 | Debt Ratios #1 | Rate #2 | Points (#2) | Pay (# |
|---|---|---|---|---|---|---|---|---|
| 30 Yr Fixed Conforming | 6.75% | 2 | $1258.28 | $1584.95 | 30.7/33.1 | 7% | 1 | $129 |
| 30 Yr Fixed Conforming 2-1 Buydown | 5.625% | 2 | $1116.77 | $1443.44 | 27.9/30.4 | 5.875% | 1 | $114 |
| 30 Yr Fixed Jumbo | 7% | 2 | $1290.69 | $1617.35 | 31.3/33.7 | 7.25% | 1 | $132 |
| 30 Yr Fixed Jumbo Quick-Qualifier | 7.375% | 2 | $1339.91 | $1666.58 | 32.3/34.7 | 7.625% | 1 | $137 |
| 30 Yr NO RATIO Fixed | 7.5% | 2 | $1356.48 | $1683.14 | 32.6/35.0 | 7.75% | 1 | $138 |

Info on Deal:
File Name: TEST2.SR
Purchase Price: $245,000.00
Loan Amount: $194,000.00
Monthly Income: $5,166.67
Percent Down: 20.82%
Taxes: $255.21  Insurance: $71.46

Pre-Qual
w/Shading
w/o Shading
Print Info
Summary
Detailed
Done

Fig. 8E

Qualification Information

| | Maximum Loan Amount | Maximum Purchase Price | Loan To Value | Rate | Points (#2) | Payment | Tax (estim |
|---|---|---|---|---|---|---|---|
| 30 Yr Fixed Conforming | $210,979.91 | $261,979.91 | 80.53% | 6.750% | 2.000% | $1,368.41 | $272 |
| 30 Yr Fixed Conforming 2-1 Buydown | $217,641.29 | $268,641.29 | 81.02% | 5.625% | 2.000% | $1,252.87 | $279 |
| 15 Yr Fixed Conforming | $174,744.80 | $225,744.80 | 77.41% | 6.500% | 2.000% | $1,522.21 | $235 |
| 30 Yr Fixed Jumbo Quick-Qualifier | $206,827.17 | $257,827.03 | 80.22% | 7.000% | 2.000% | $1,376.03 | $268 |
| 30 Yr Fixed Jumbo | $200,468.17 | $251,468.17 | 79.72% | 7.375% | 2.000% | $1,384.58 | $261 |
| 30 Yr NO RATIO Fixed | $204,000.00 | $255,000.00 | 80.00% | 7.500% | 2.000% | $1,426.40 | $265 |

Info on Deal:
File Name: TEST2.SR
Down Payment: $51,000.00
Monthly Income: $5166.67

Print Info
Summary
Detailed
Done

Loan Program Listing

- 30 Yr Fixed Conforming
- 30 Year Fixed Conforming 2-1 Buydown
- 15 Yr Fixed Conforming
- 30 Year Fixed Jumbo
- 30 Year Fixed Jumbo Quick-Qualifier
- 30 Yr NO RATIO Fixed
- 15 Year Fixed Jumbo
- COFI No Neg - 40 Yr
- 1 Yr MTA (No Neg)
- 11th District COFI Neg-Am (40 Yr)
- MTA Neg-AM
- 3 Yr. Fixed/1Yr. ARM 84a View Details — 84b Print List Return to Main

Detailed Program Information

Program Name: 30 Yr NO RATIO Fixed

Loan Term: 30 years   Index: FIXED   Margin:   Life Cap:

Maximum LTV: 80 | 75 | 65 | 55
Max. Amounts: $400,000 | $650,000 | $1,000,000 | $3,000,000
Income Docs: No Ratio   Required cash reserves:

Rates: 7.500% | 7.750% | 8.000%
Qual. Rates: 7.500% | 7.750% | 8.000%
Points: 2.000 | 1.000 | 0.000

This information is intended for licensed real estate professionals only and may not br distributed to the general public. NO APR% HAVE BEEN CALCULATED FOR THIS REPORT Print Info Important Notes:
This program simply does not require calculation of debt/income ratios. Any income information is left blank on the application. Requirements for liquid reserves and credit scores vary.

Return to List

NOTE: All rates and programs are subject to change without notice. Wymac Capital, Inc. assumes no liability for errors or omissions of any kind. All programs assume 'A' quality credit and property unless otherwise noted. Other restrictions may apply.

Fig. 8H

MORTGAGE LOAN DATA COLLECTION METHOD AND APPARATUS FOR A FINANCIAL PLANNING ORIGINATOR AND/OR FINANCIAL INSTITUTION ORIGINATOR OF A MORTGAGE LOAN

CROSS REFERENCE TO RELATED APPLICATIONS

This application is a continuation of U.S. patent application Ser. No. 09/349,517, filed Jul. 8, 1999, which claims the benefit of the filing date of provisional applications with Ser. Nos. 60/093,729, 60/093,730 and 60/093,750 all filed on Jul. 22, 1998, the specifications of which are all hereby incorporated by reference.

FIELD OF THE INVENTION

This invention relates generally to a mortgage loan data and financial services processing system and more particularly a method and system enabling financial planners including CPAs, broker/dealers, stock brokers, insurance broker/agents, and attorneys, as well as, financial institutions including banks, savings and loans, thrifts, and credit unions to originate a real estate loans or mortgage transactions for potential home buyers or homeowners in compliance with RESPA and other regulatory agencies. The present invention also enables the origination of equipment leases, insurance, investments and the like.

BACKGROUND OF THE INVENTION

The Real Estate Settlement Procedures Act ("RESPA") was enacted by Congress to implement reforms in the process of real estate settlement to insure that consumers are provided with greater and more timely information on the nature and costs of the settlement process and that the consumers are protected from unnecessarily high settlement charges caused by abusive practices. RESPA is applicable to "federally-related" residential mortgage loan transactions and is intended to result in:

1. More effective advance disclosure to home buyers and sellers of loan settlement costs;
2. Elimination of kickbacks or referral fees that tend to unnecessarily increase the costs of certain settlement services;
3. A reduction in the amount of funds home buyers are required to place in escrow accounts for payment of real estate insurance and real estate taxes; and
4. Significant reform and modernization of local record keeping of land title information.

RESPA is administered by Federal Housing and Urban Development, commonly known as HUD. RESPA does not affect the validity or enforceability of any sale or contract for the sale of real property or any loan, loan agreement, mortgage, or lien made or arising in connection with a federally regulated mortgage loan. A "federally related mortgage loan" is broadly defined as a loan which is secured by a first or subordinate lien on residential real property (including individual units of condominiums and co-operatives) designed principally for the occupancy of one to four families, and which is made by a lender who is regulated by or whose deposits or accounts are insured by an agency of the Federal Government, or it is made or insured, supplemented, guaranteed or assisted by designated Federal agencies or officers.

With regards to fees paid by lenders, most states will generally follow RESPA guidelines to determine if a fee paid to real estate agents or builders is an "illegal referral fee" or a "legal origination fee." Under HUD's interpretation of RESPA, lenders may pay a fee for actual services performed by their agents or contractors. In enforcing RESPA, HUD will look at whether or not actual work has been performed, and not solely whether there is an agreement to do the work. The work performed must be necessary for the transaction and cannot be duplicative of services performed by others. Under HUD's interpretation of RESPA, the "mere taking of an application is not sufficient work to justify a fee under RESPA."

The present invention provides a novel data processing system and method for coordinating and processing mortgage loans in a manner that complies with (or exceeds) RESPA guide lines to allow payment of origination fees to real estate brokers, builders, licensed mortgage bankers, mortgage brokers, etc. Real estate brokers and others utilize the system of the present invention to originate mortgages, gather documents, complete forms, explain loan programs, provide disclosures, order appraisals, etc. in order to foster RESPA compliance.

SUMMARY OF THE INVENTION

The present invention solves the problems posed by RESPA and other regulatory guidelines through a unique information and gathering system and method.

In accordance with the illustrated preferred embodiment, the present invention provides a novel, cost effective mortgage loan and financial services data processing system.

It is an object of the invention to provide a mortgage loan data processing system that complies with RESPA guidelines.

Also, it is an object of the invention to provide a financial services data processing system that complies with all applicable state and federal regulatory guidelines.

Another object of the invention is to provide a mortgage loan and financial services data processing system that allows real estate agents, mortgage bankers, mortgage brokers, banks, institutions, CPAs, attorneys, home builders, direct consumers and other mortgage and non-mortgage related persons to originate a real estate loan or mortgage transaction for potential home buyers or homeowners.

An additional object of the invention is to provide a mortgage loan and financial services data processing system which eliminates the gathering of duplicative information from a loan customer.

The system of the present invention includes, briefly, a mortgage loan data processing system for managing the origination of a mortgage loan by a loan originator for a loan customer, comprising: computer processor means for processing data; storage means for storing data on a storage medium; means for initializing the storage medium; means for processing data regarding the loan customer already possessed by the loan originator; means for processing data regarding the loan customer not previously possessed by the loan originator input through screen displays; means for processing data regarding the already possessed and not previously possessed data and for generating a loan application for the loan customer; and means for processing data regarding the mortgage loan and the data regarding the loan customer and for generating disclosure documents.

The present invention has other objects and advantages which are set forth in the description of the Best Mode of Carrying Out the Invention. The features and advantages described in the specification, however, are not all inclusive, and particularly, many additional features and advantages will be apparent to one of ordinary skill in the art in view of the drawings, specification, and claims herein.

BRIEF DESCRIPTION OF THE DRAWINGS

FIGS. 4a-h are schematic representations of display screens of the loan originator computer system of the present invention displaying the user interface for CPA's.

FIGS. 5a-g are schematic representations of display screens of the loan originator computer system of the present invention displaying the user interface for Builders.

FIGS. 8a-h are schematic representations of display screens of the loan originator computer system of the present invention displaying the user interface for loan calculation portion of the present invention.

DETAILED DESCRIPTION

The present invention is a computerized data processing system and method for coordinating and processing mortgage loans. The hardware and software components of the loan present invention are shown in FIG. 1.

Figure 1:
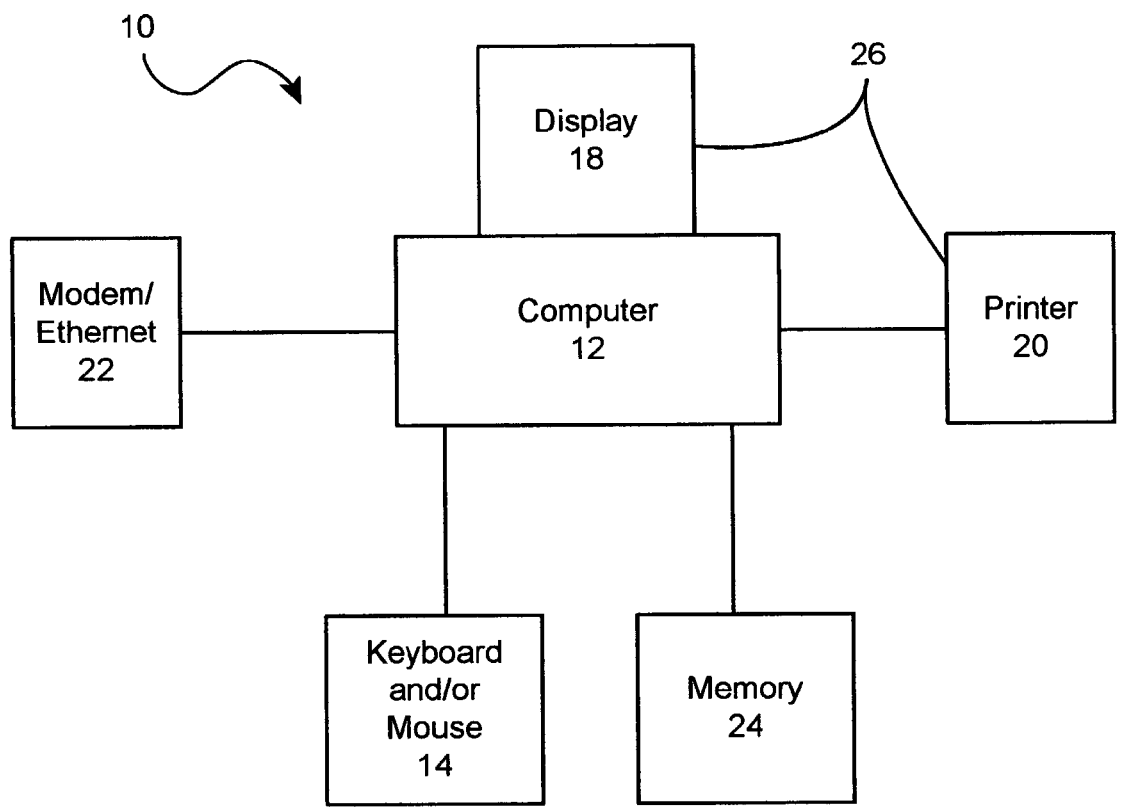
FIG. 1 is a schematic diagram illustrating the loan origination computer system of the present invention.

As shown in FIG. 1, the loan originator computer system 10 of the present invention includes a central processing unit (CPU) 12, primary input hardware 14, which typically includes both a keyboard and a mouse for entering data and commands into the CPU; output hardware 16 including a display such as a monitor screen 18 for displaying graphical user interface windows and the like and, typically, a printer 20 for generating hard copies of the loan application and disclosure forms; a modem or Ethernet card 22 for transferring the loan application and/or other data to other computers; and a memory unit 24.

The computer system 10 and method of the present invention preferably utilize an IBM PC or equivalent hardware (e.g. 32 bit platforms) that operate under WINDOWS 95 software or greater (e.g., WINDOWS 98 or WINDOWS NT). The computer system 10 preferably includes an Intel PENTIUM processor or compatible computer with at a hard drive and at least 16 Mb of RAM and a VGA display. Essentially, the computer system must be capable of running either WINDOWS 95, 98 or NT. The WINDOWS 95 software or greater software environment allows multiple software packages to run concurrently and communicate between themselves. Communication between the software packages leverages the software packages functionally into an integrated solution and minimizes software development.

The software of the computer system 10 preferably includes the following commercially available application software or its equivalent: WINDOWS 95 software or greater software available from Microsoft and a commercially available database such as Microsoft Access. This software is stored in memory unit 24 along with the program software of the present invention. Also stored in the memory unit 24 of the computer system 10 is data from other customer service software. For example, a CPA would have data regarding clients stored in memory unit 24 in connection with the CPA's accounting software.

The present invention enables various mortgage and non-mortgage related persons to use information which they already possess or can obtain about clients, prospective clients, and other contacts to originate a real estate loan transaction, thus acting as a loan originator. The system is specialized for each group based on information that is already in the loan originator's possession, or can be obtained by the loan originator with regards to prospective borrowers or is used in conjunction with or in lieu of the loan originator's normal software system for gathering and organizing and/or processing data.

Figure 2:
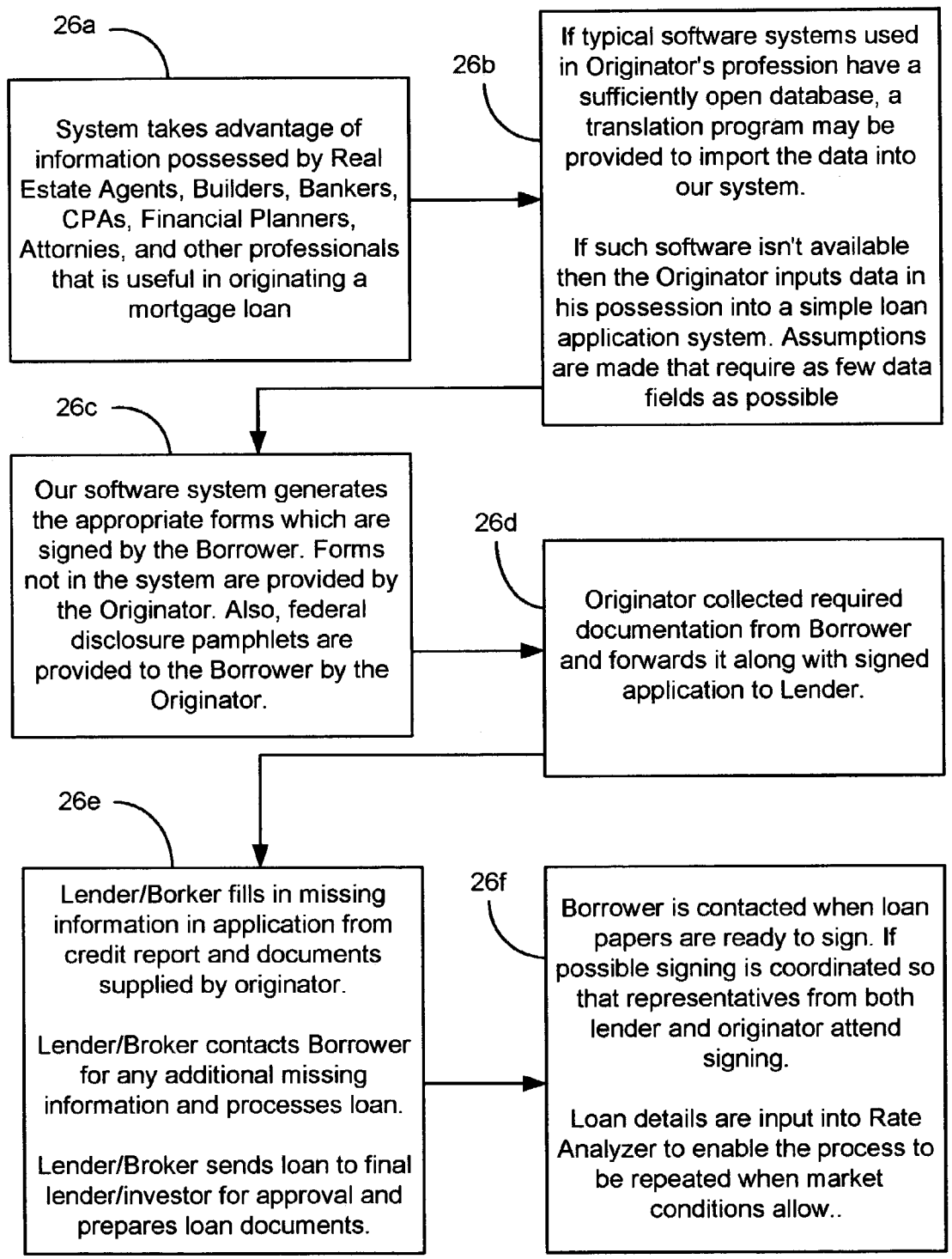
FIG. 2 is a flow chart describing the general methodology of the present invention. the present invention.

The general methodology of the present invention is set forth in flow chart form in FIG. 2. As depicted, the process of the present invention identifies useful information already possessed by a loan originator 26a, imports the data into the loan origination system 26b, generates the necessary forms for the borrower 26c, collects additional information from the borrower 26d, all of the borrower information is transferred to a lender/broker where the loan application is finalized and approved 26e, and facilitates borrower's signing of the loan papers 26f. The specifics of the methodology of the present invention are described in detail in the flow chart depicted in FIGS. 3A-3AE. The flow chart provides the customized process for a variety of different types of loan originators 28 including real estate brokers/agents 28a (identified as Originator "RE"); home builders, FSBO's and the like 28b (identified as Originator "B"); CPA's, financial planners, brokers/dealers, stock brokers, insurance brokers/agents, attorneys and other financial professionals 28c (identified as Originator "FP"); financial institutions such as banks, savings and loans, thrifts, credit unions and the like 28d (identified as Originator "FI"); relocation companies 28e (identified as Originator "R"); and consumers 28f (identified as Originator "C"). The flow chart describes the process from the loan originator through the automated underwriting system to funding of the loan.

The loan originator utilizes user interface screens generated by the software of the present invention to enter mortgage related data from the borrower to computer system 10. The customized user interface screens are displayed on monitor 18 and the loan originator utilizes the mouse and keyboard input devices 14 to enter the data. Examples of the user interface screens of the present invention for builders and CPA's are depicted in FIGS. 4 and 5.

In the case of real estate agents, builders and owner-sellers acting as loan originators, the system is customized with the purchase contract and other forms that the loan originator requires. Data for these forms is typically duplicated in one or more places in a typical loan application and the software system will automatically send this data to the appropriate forms and systems. Also, for these referral sources that are most likely to have purchase-borrowers (as opposed to refinances), the system is pre-configured for each loan application to assume a purchase.

Figure 3A:
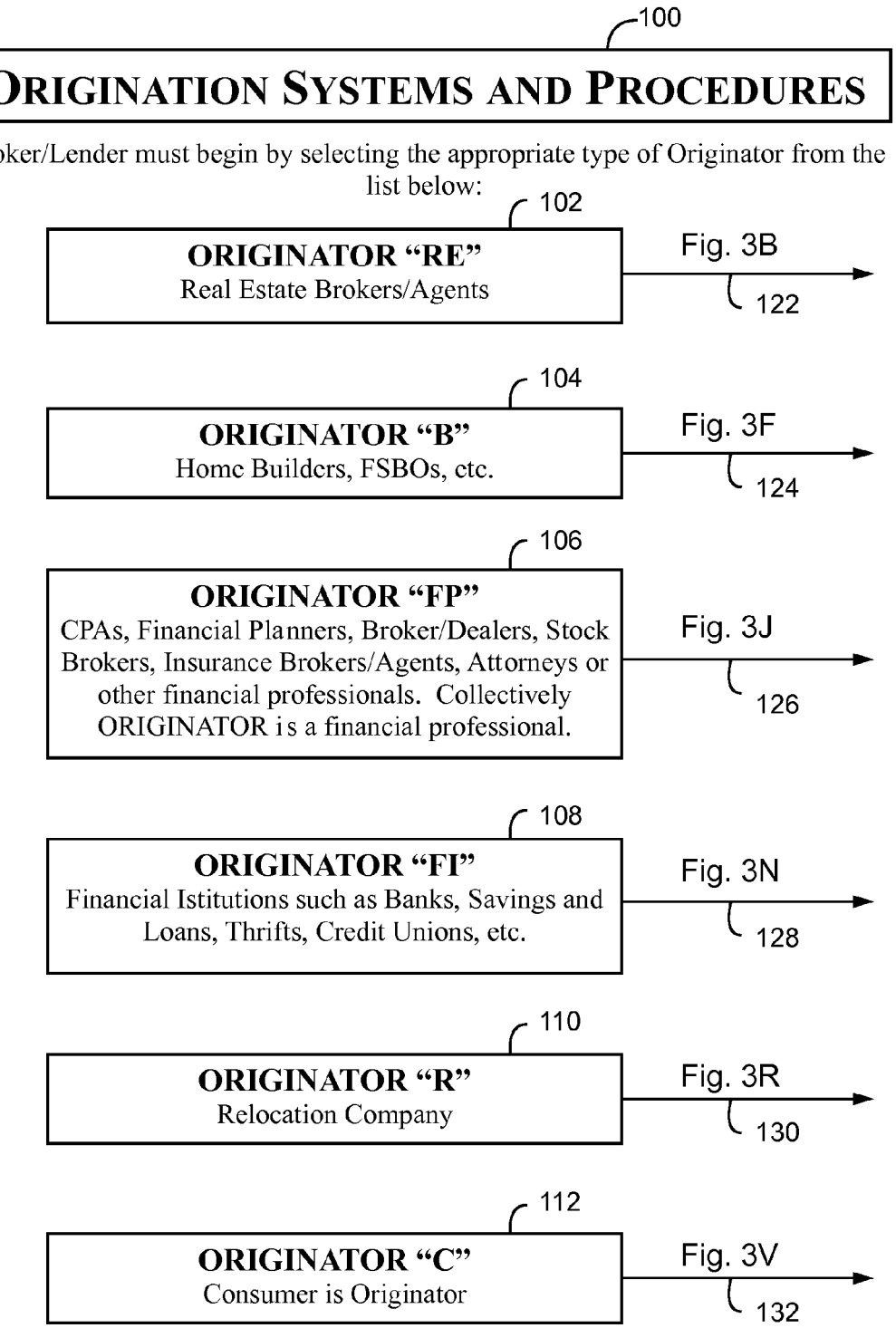
FIGS. 3A-3AE is a flow chart describing the detailed methodology of the present invention.

FIGS. 3A-3AE is a flowchart in 35 pages. Pages 10 to 13 are canceled without prejudice, as duplicating the material found in pages 6 to 9.

FIG. 3A includes the following.

Box 100 shows ORIGINATION SYSTEMS AND PROCEDURES. The Broker/Lender must begin by selecting the appropriate type of Originator from the list below:

Box 102 shows the originator "RE" (Real Estate Brokers/Agents). Arrow 122 directs the system and procedure go to FIG. 3B.

Box 104 shows the originator "B" (Home Builders, FSBOs, etc.). Arrow 124 directs the system and procedure go to FIG. 3F.

Box 106 shows the originator "FP", which includes CPAs, Financial Planners, Broker/Dealers, Stock Brokers, Insurance Brokers/Agents, Attorneys or other financial professionals. Collectively the originator is a financial professional. Arrow 126 directs the system and procedure go to FIG. 3J.

Box 108 shows the originator "FI" (Financial Institutions such as Banks, Savings and Loans, Thrifts, Credit Unions, etc.). Arrow 128 directs the system and procedure go to FIG. 3N.

Box 110 shows the originator "R" (Relocation Company). Arrow 130 directs the system and procedure go to FIG. 3R.

Box 112 shows the originator "C" (Consumer is Originator). Arrow 132 directs the system and procedure go to FIG. 3V.

Figure 3B:
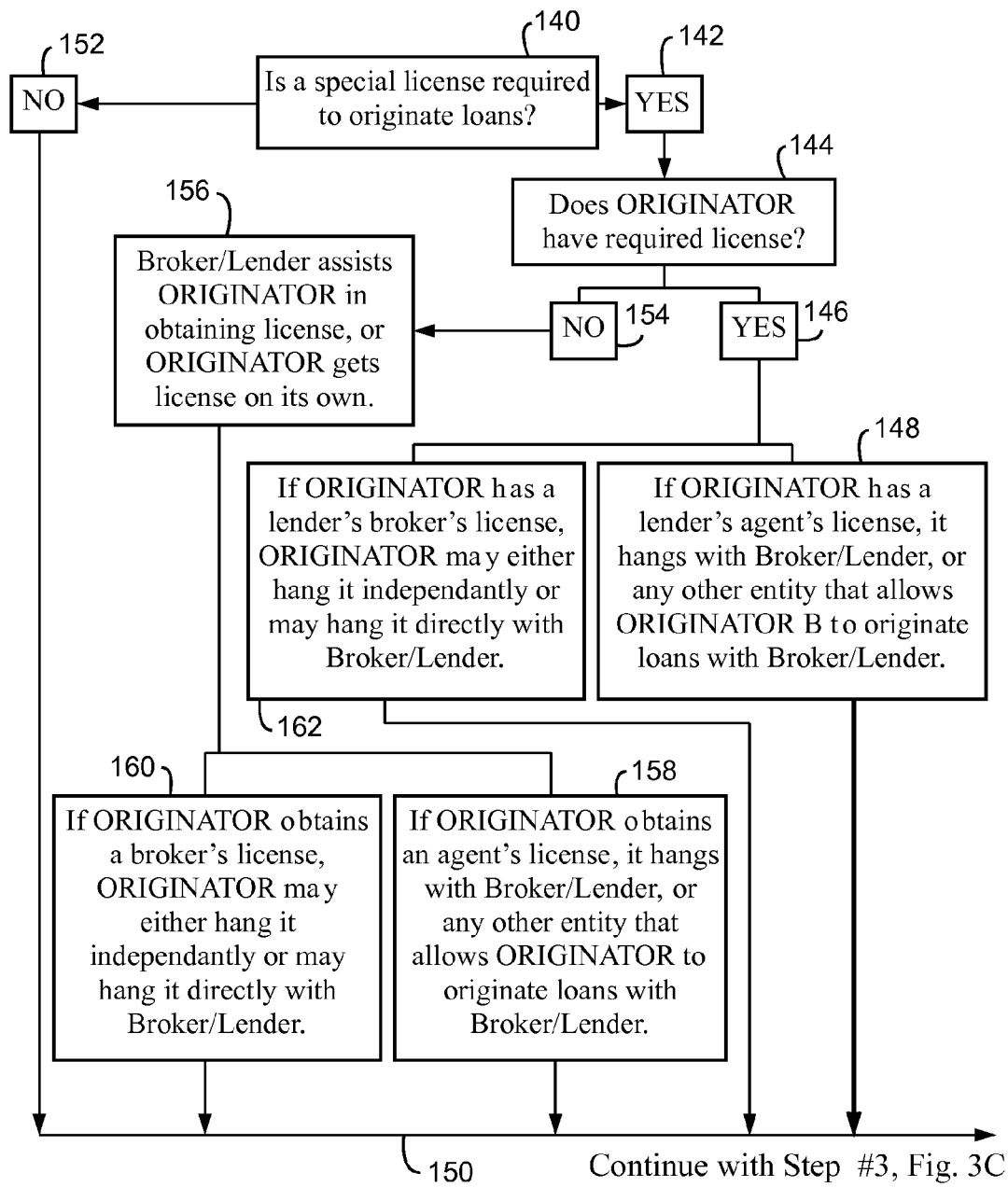

FIG. 3B includes the following for STEP #2—LICENSING—FOR the originator "RE".

Box 140 asks "Is a special license required to originate loans?" Box 142 shows YES to the question of Box 140.

Box 144 asks "Does the originator have required license?" Box 146 shows YES to the question of Box 144.

Box 148 shows the following. If the originator has a lender's agent's license, it hangs with the Broker/Lender, or any other entity that allows the originator B to originate loans with the Broker/Lender.

Figure 3C:
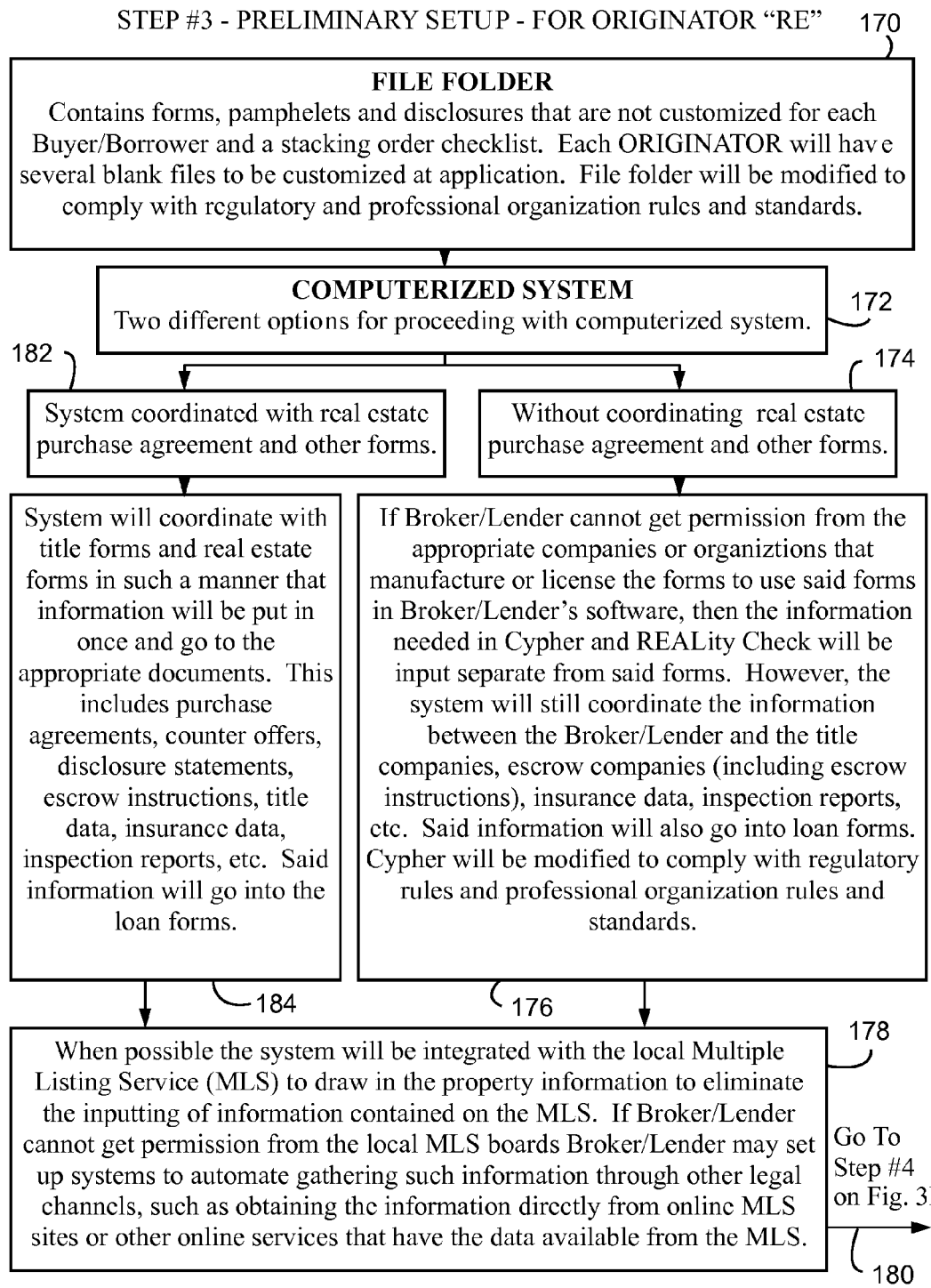

Arrow 150 directs the system and procedure to go to Step #3, FIG. 3C.

Box 152 shows NO to the question of Box 140. Box 154 shows No to the question of Box 144.

Box 156 shows the Broker/Lender assists the originator in obtaining license, or the originator gets license on its own.

Box 158 shows the following. If the originator obtains an agent's license, it hangs with the Broker/Lender, or any other entity that allows the originator to originate loans with the Broker/Lender.

Box 160 shows the following. If the originator obtains a broker's license, the originator may either hang it independently or may hang it directly with the Broker/Lender.

Box 162 shows the following. If the originator has a lender's broker's license, the originator may either hang it independently or may hang it directly with the Broker/Lender.

FIG. 3C includes the following for STEP #2—LICENSING—FOR the originator "RE".

Box 170 shows the file folder, which contains forms, pamphlets and disclosures that are not customized for each Buyer/the Borrower and a stacking order checklist. Each the originator will have several blank files to be customized at application. File folder will be modified to comply with regulatory and professional organization rules and standards.

Box 172 shows COMPUTERIZED SYSTEM (Two different options for proceeding with computerized system).

Box 174 shows without coordinating real estate purchase agreement and other forms.

Box 176 shows the following. If the Broker/Lender cannot get permission from the appropriate companies or organizations that manufacture or license the forms to use said forms in the Broker/Lender's software, then the information needed in Cypher and REALity Check will be input separate from said forms. However, the system will still coordinate the information between the Broker/Lender and the title companies, escrow companies (including escrow instructions), insurance data, inspection reports, etc. Said information will also go into loan forms. Cypher will be modified to comply with regulatory rules and professional organization rules and standards.

Box 178 shows the following. When possible the system will be integrated with the local Multiple Listing Service (MLS) to draw in the property information to eliminate the inputting of information contained on the MLS. If the Broker/Lender cannot get permission from the local MLS boards the Broker/Lender may set up systems to automate gathering such information through other legal channels, such as obtaining the information directly from online MLS sites or other online services that have the data available from the MLS.

Arrow 180 directs the system and procedure to go to step #4 on page 4 of FIG. 3.

Box 182 shows System coordinated with real estate purchase agreement and other forms.

Box 184 shows System will coordinate with title forms and real estate forms in such a manner that information will be put in once and go to the appropriate documents. This includes purchase agreements, counter offers, disclosure statements, escrow instructions, title data, insurance data, inspection reports, etc. Said information will go into the loan forms.

Figure 3D:
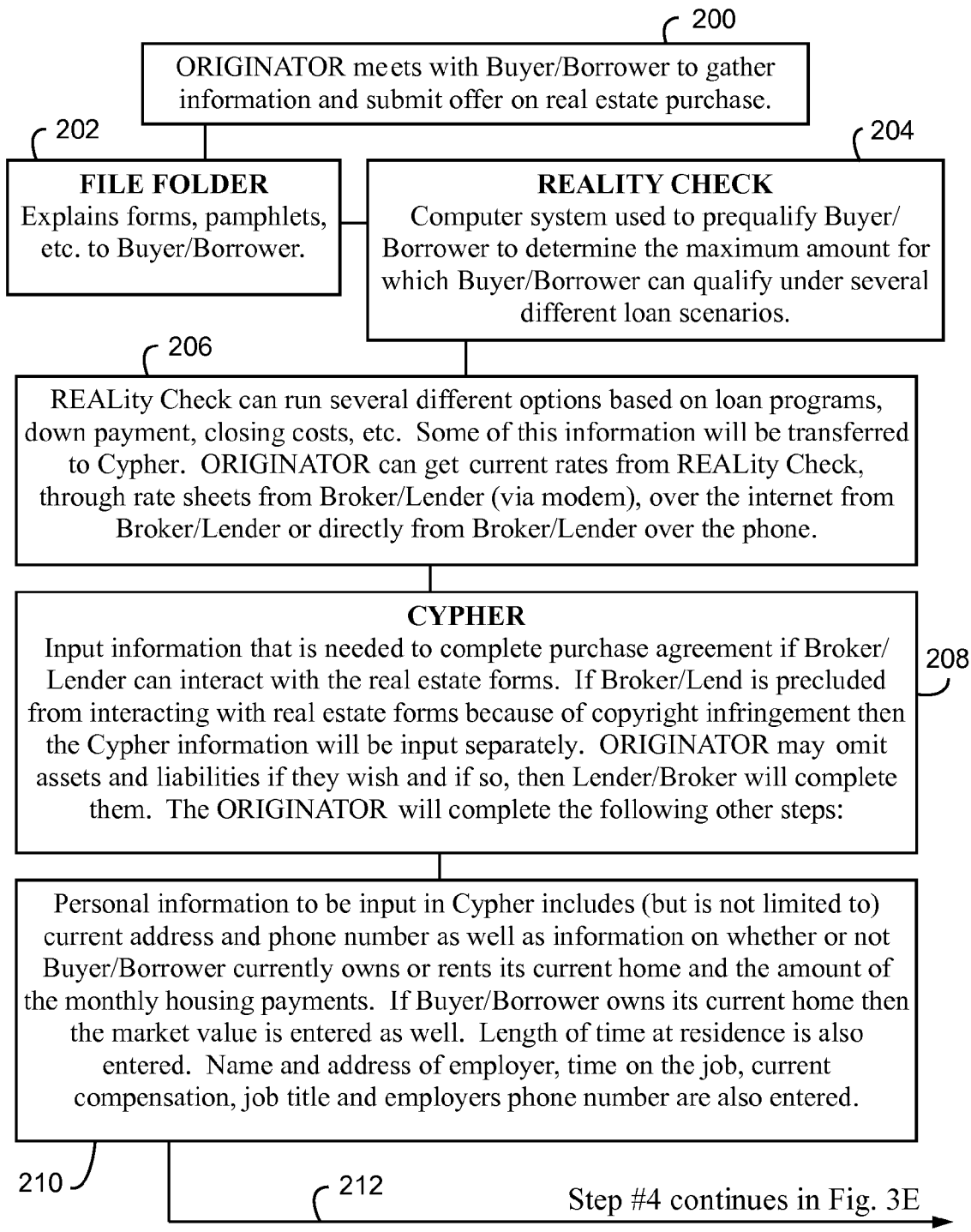

FIG. 3D includes the following for STEP #4—INFORMATION AND INTERVIEW FOR the originator "RE".

FIG. 3D includes the following for STEP #4—INFORMATION AND INTERVIEW FOR the originator "RE".

Box 200 shows the originator meets with Buyer/the Borrower to gather information and submit offer on real estate purchase.

Box 202 shows the file folder, which explains forms, pamphlets, etc. to Buyer/the Borrower.

Box 204 shows REALITY CHECK Computer system used to prequalify Buyer/the Borrower to determine the maximum amount for which Buyer/the Borrower can qualify under several different loan scenarios.

Box 206 shows REALity Check can run several different options based on loan programs, down payment, closing costs, etc. Some of this information will be transferred to Cypher. the originator can get current rates from REALity Check, through rate sheets from the Broker/Lender (via modem), over the internet from the Broker/Lender or directly from the Broker/Lender over the phone.

Box 208 shows CYPHER Input information that is needed to complete purchase agreement if Broker/Lender can interact with the real estate forms. If Broker/Lend is precluded from interacting with real estate forms because of copyright infringement then the Cypher information will be input separately. the originator may omit assets and liabilities if they wish and if so, then Lender/Broker will complete them. The originator will complete the following other steps:

Box 210 shows Personal information to be input in Cypher includes (but is not limited to) current address and phone number as well as information on whether or not Buyer/the Borrower currently owns or rents its current home and the amount of the monthly housing payments. If Buyer/the Borrower owns its current home then the market value is entered as well. Length of time at residence is also entered. Name and address of employer, time on the job, current compensation, job title and employers phone number are also entered.

Arrow 212 directs the system and procedure to go to continue step #4 on FIG. 3E.

FIG. 3E includes the following for STEP #4 (CONT)—INFORMATION AND INTERVIEW FOR the originator "RE".

Box 220 shows Property information to be entered includes (but is not limited to) sales price of home, contingencies, amount of deposits, amount of future deposits, etc. the originator also tells Cypher whether the Buyer/the Borrower wants a set loan amount or if the loan is to be a set percentage of the ultimate sales price.

Box 222 shows Loan details to be entered include (but are not limited to) estimated final sales price after all options are selected and an estimated final loan amount (should estimate on the high side); rate; term; points; whether or not there is a balloon payment; title and escrow fees (if Cypher has these fees in advance they can be pre-programmed into the system) and whether or not the originator is giving a credit for closing costs. Such a credit can be manually input or Cypher can calculate the credit if it is based on a pre-determined formula. the originator will also indicate whether or not the Buyer/the Borrower will have impounds for taxes/insurance.

Box 224 shows the originator must also complete the Declarations section on the loan application (example page 3 of current FNMA 1003), this section discloses any lawsuits, bankruptcies, foreclosures, loan defaults, etc. Also, information about sex and national origin is requested. If Buyer/the Borrower does not wish to provide information about sex and national origin, the originator will acknowledge that Buyer/the Borrower does not wish to provide such information.

Box 226 shows the originator prints and explains forms to Buyer/the Borrower, including forms and pamphlets from the lot folder (the boiler plate forms). Buyer/the Borrower signs all forms.

Box 228 shows the originator collects all applicable documentation on the stacking order checklist from the Buyer/the Borrower, including (but not limited to) W-2 forms, paystubs, bank statements, tax returns, bankruptcy papers, retirement information, etc.

Box 230 shows the originator packages up all gathered information and puts said information in a pre-determined stacking order and sends it to the Broker/Lender for processing.

Figure 3F:
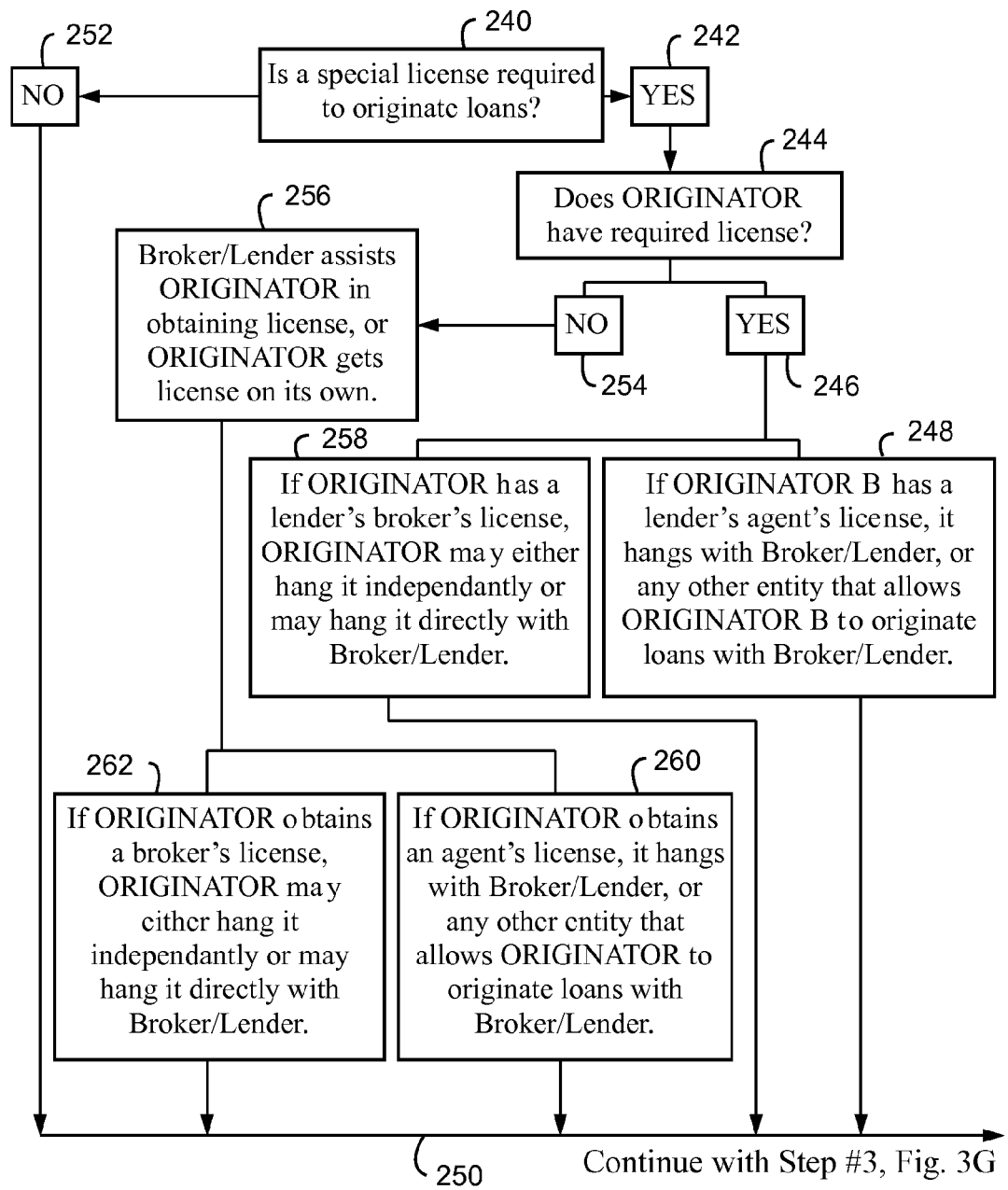
Figure 3G:
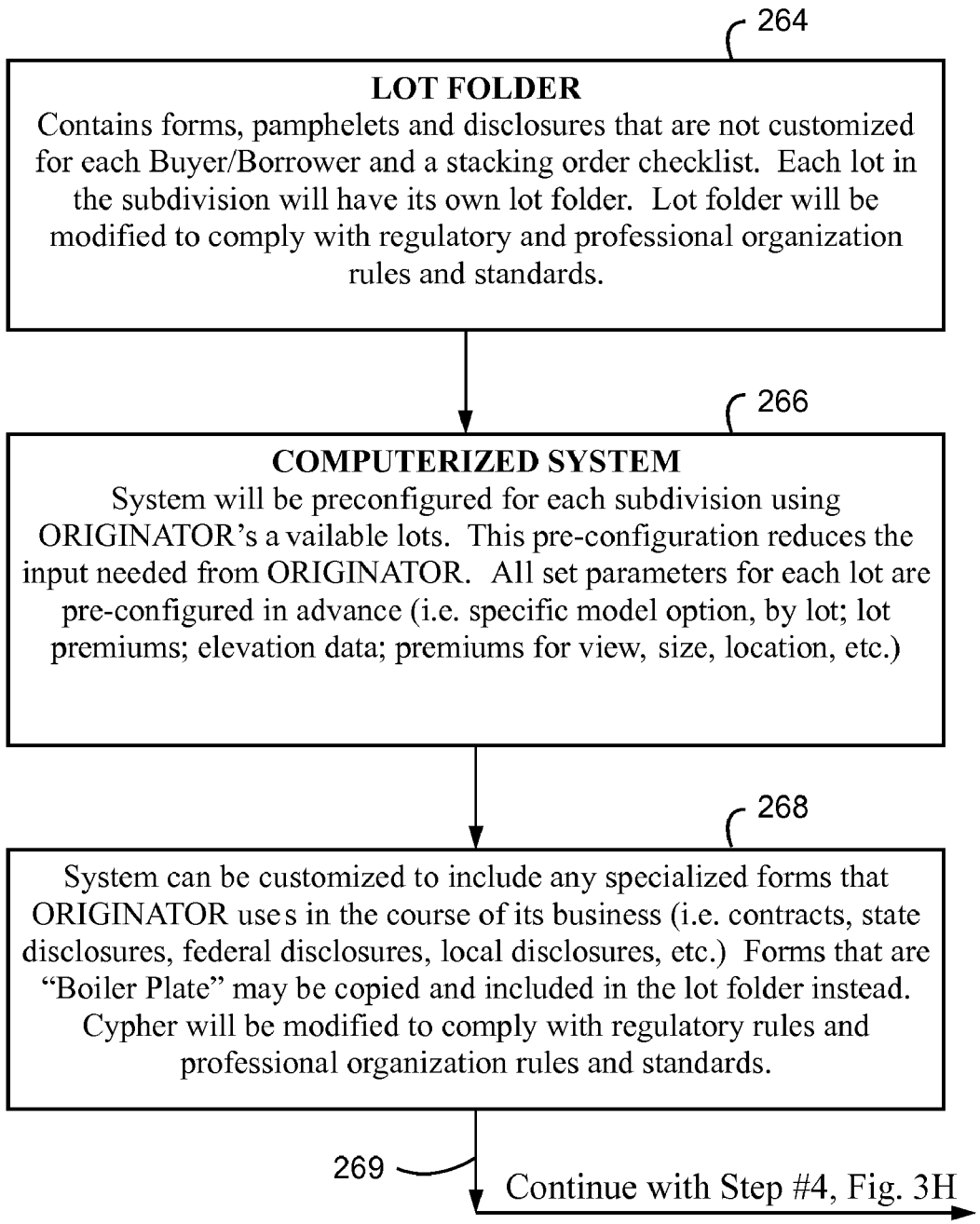
Figure 3H:
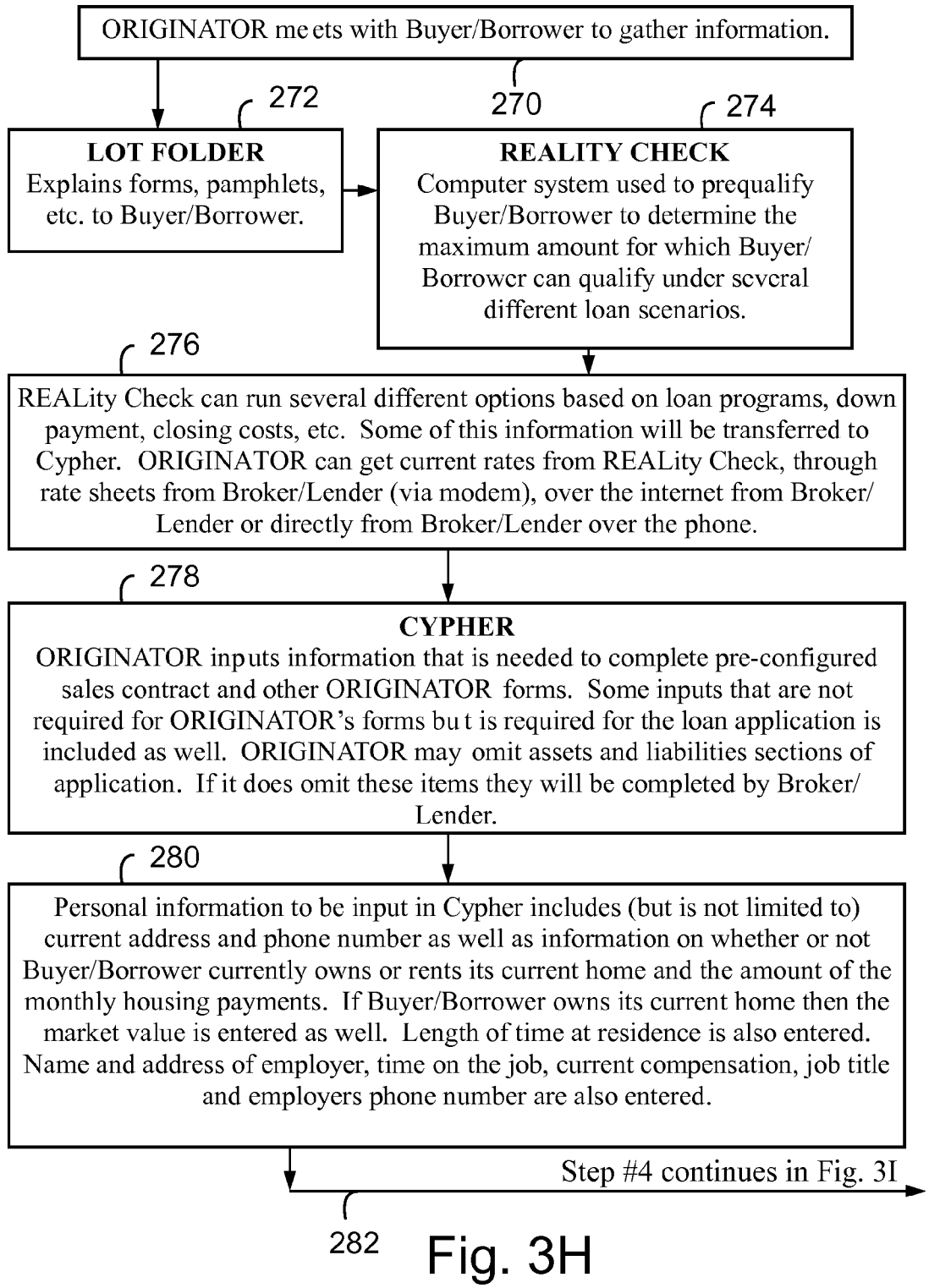
Figure 3J:
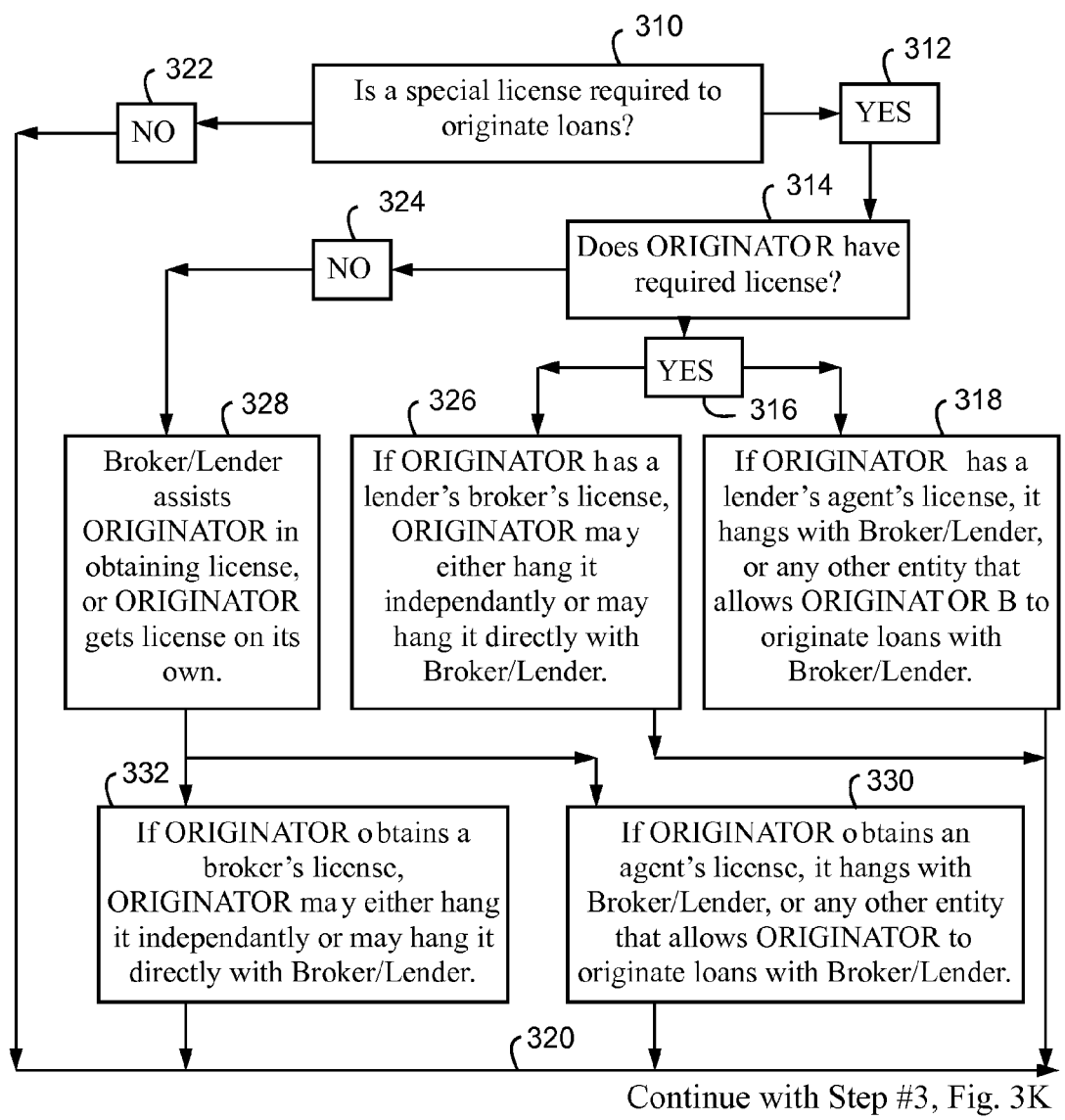
Figure 3K:
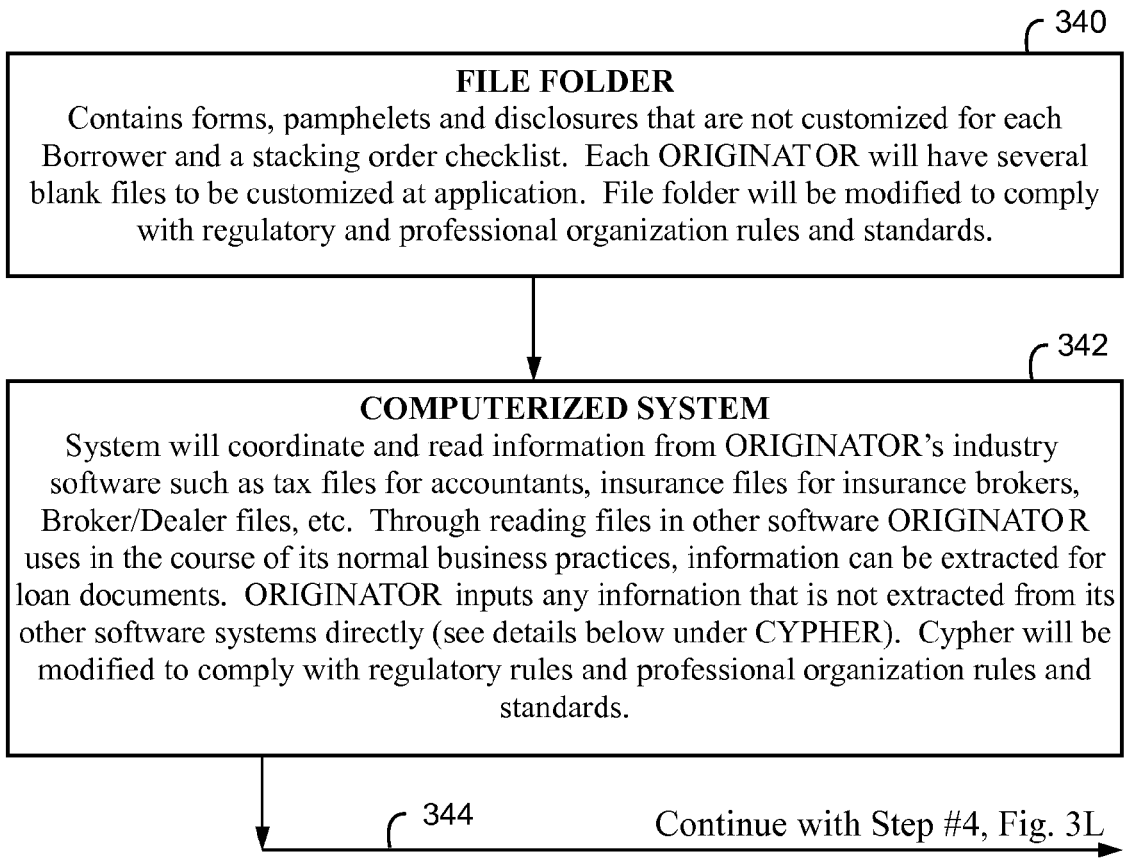
Figure 3L:
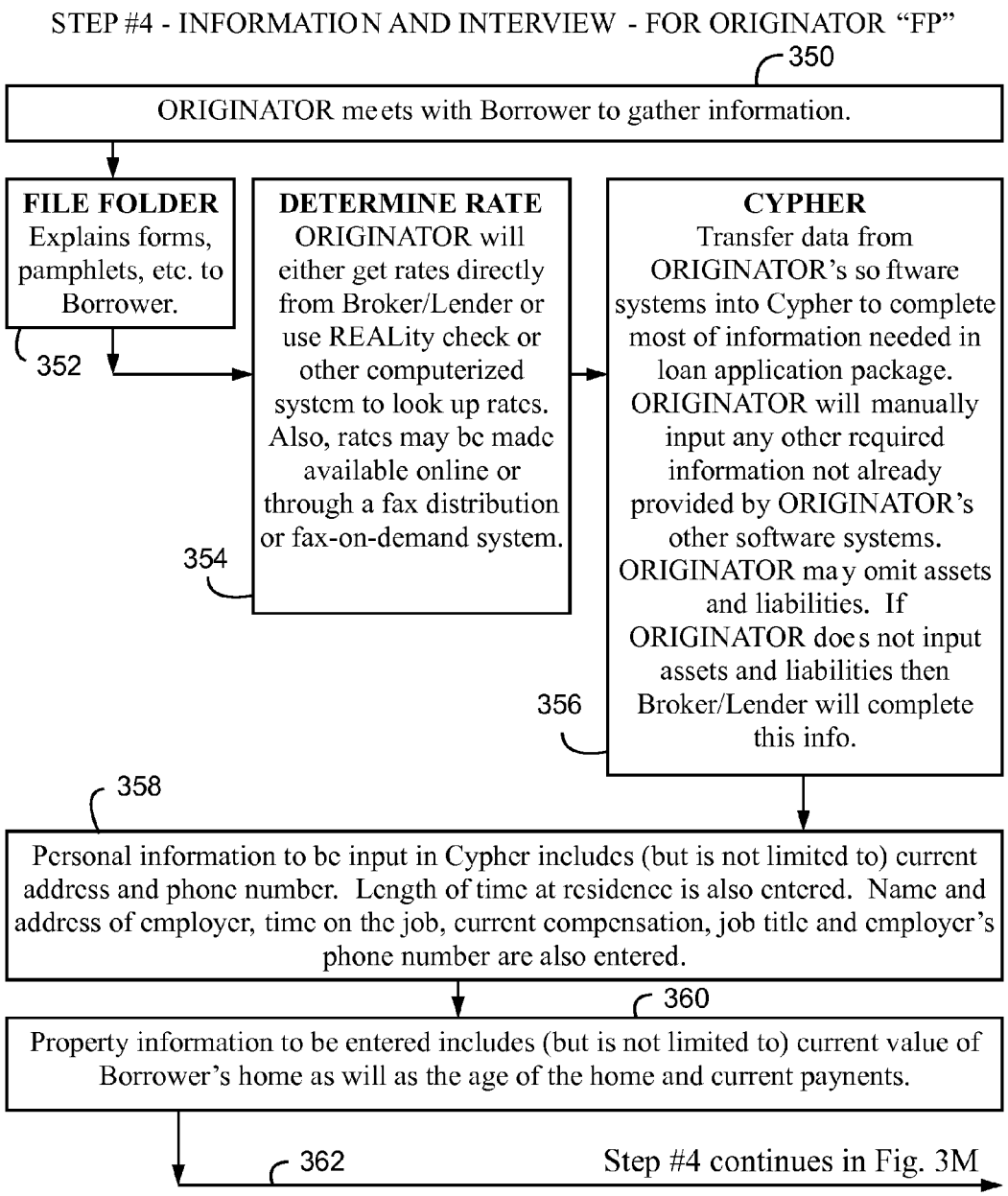
Figure 3M:
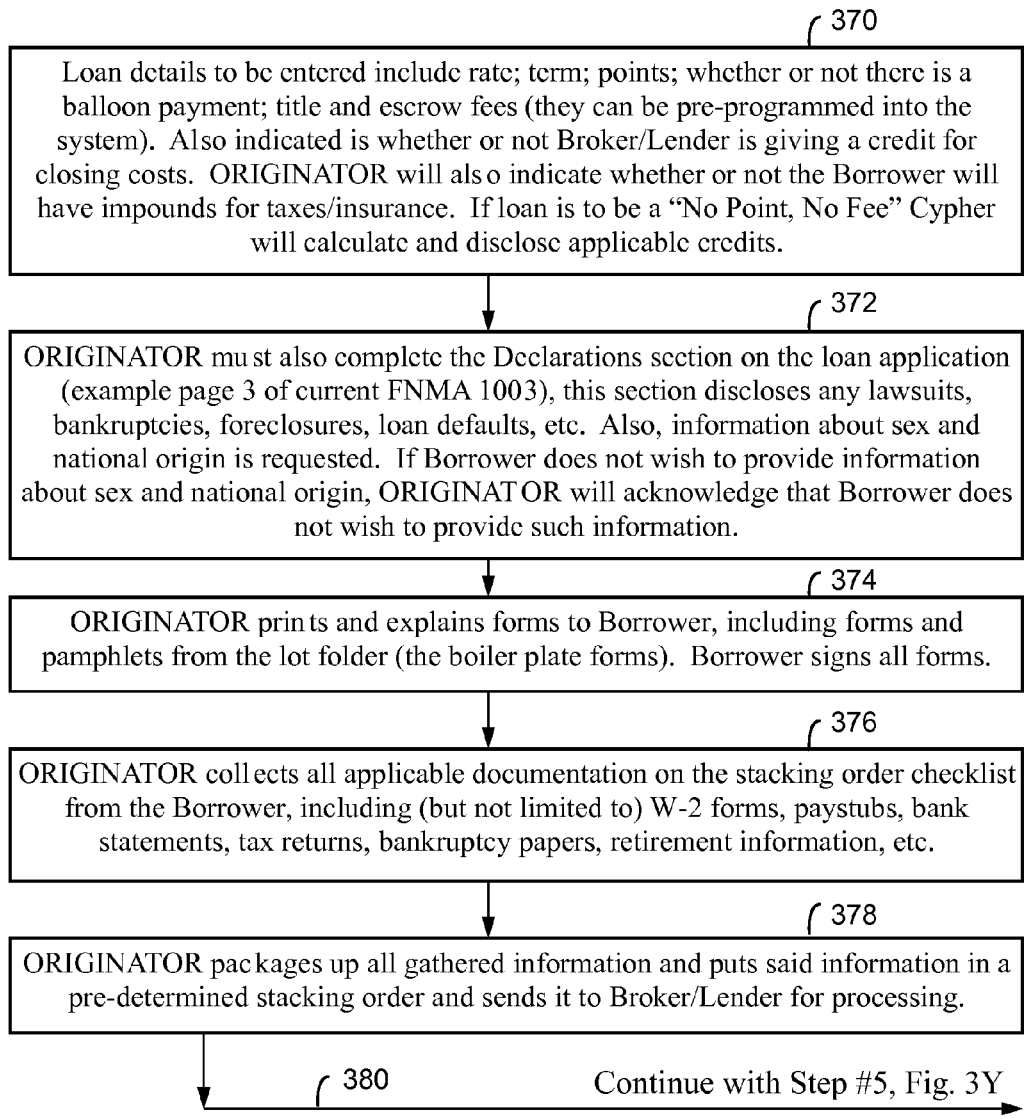
Figure 3N:
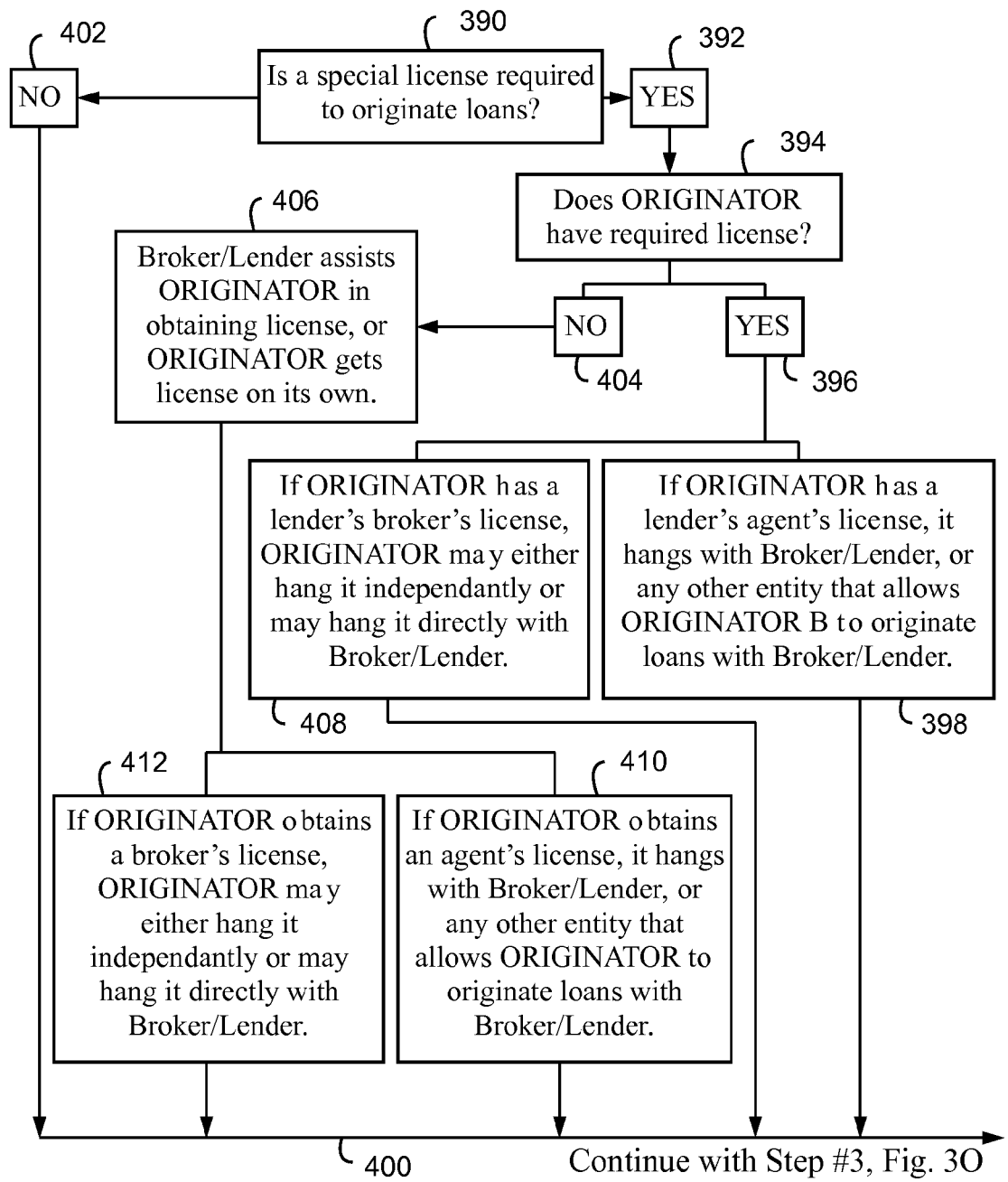
Figure 3O:
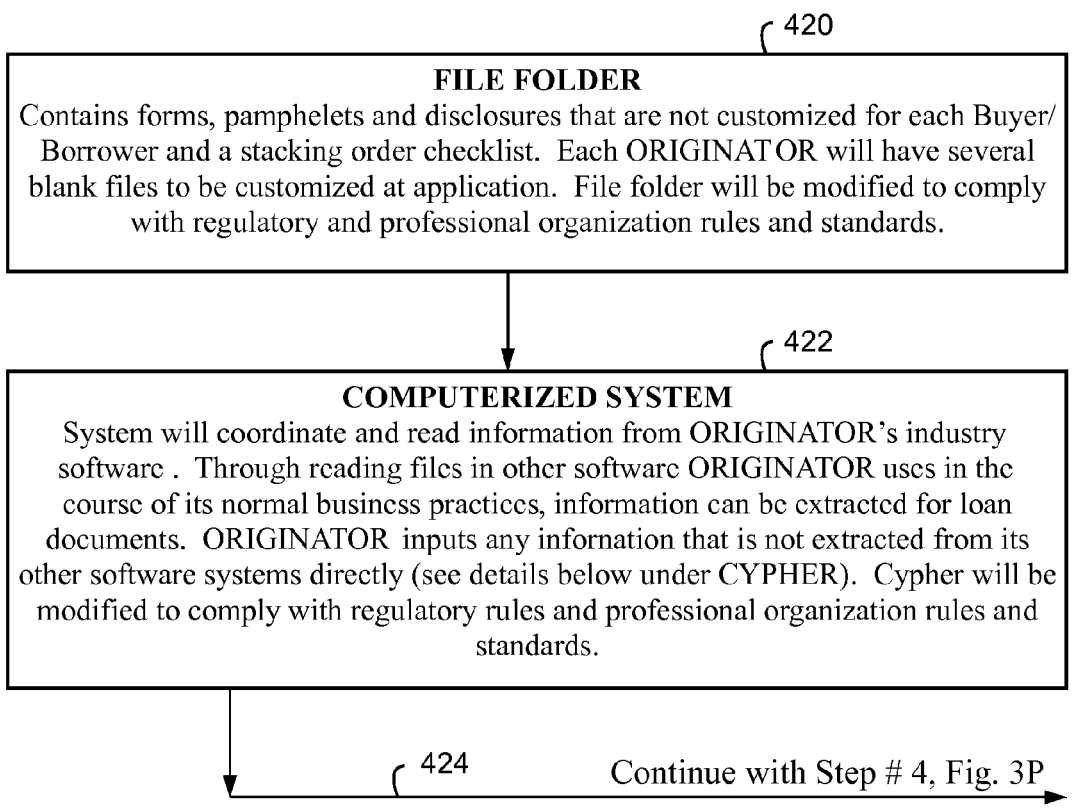
Figure 3P:
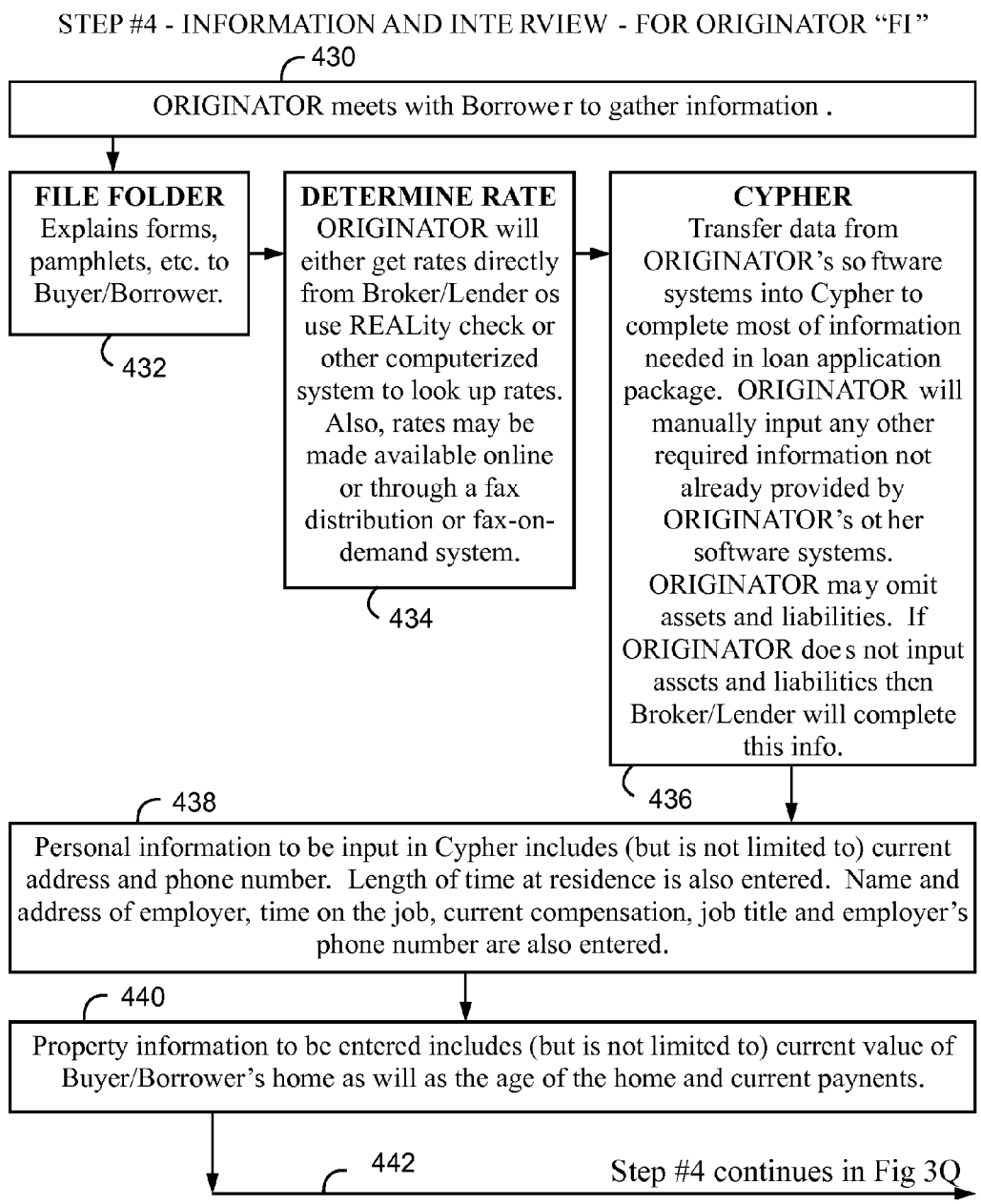
Figure 3R:
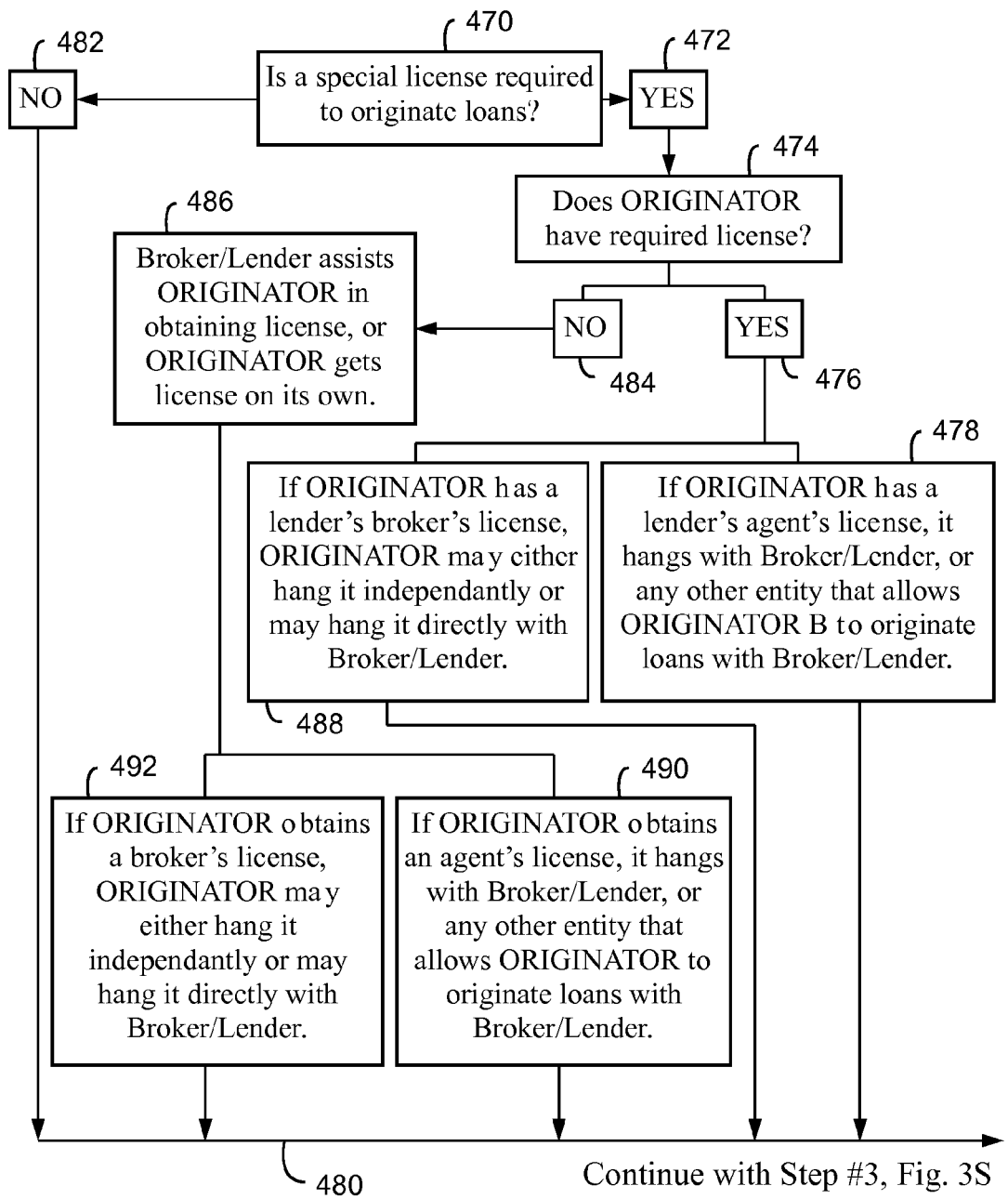
Figure 3S:
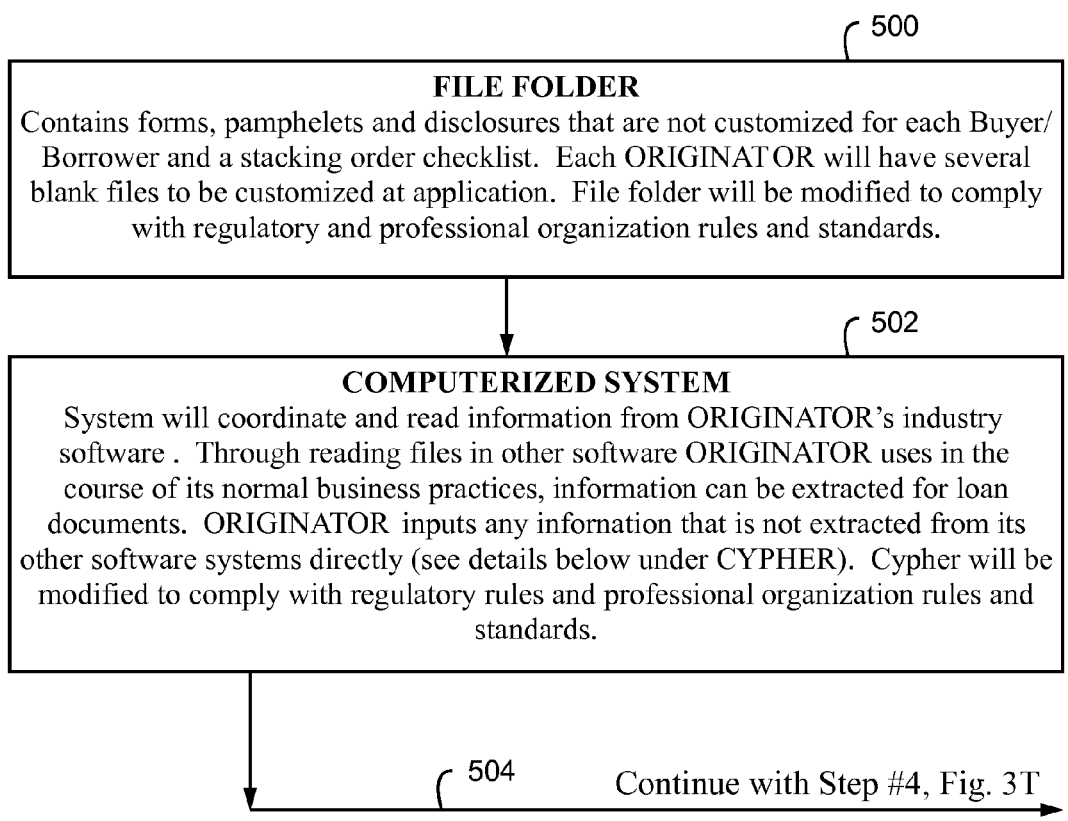
Figure 3T:
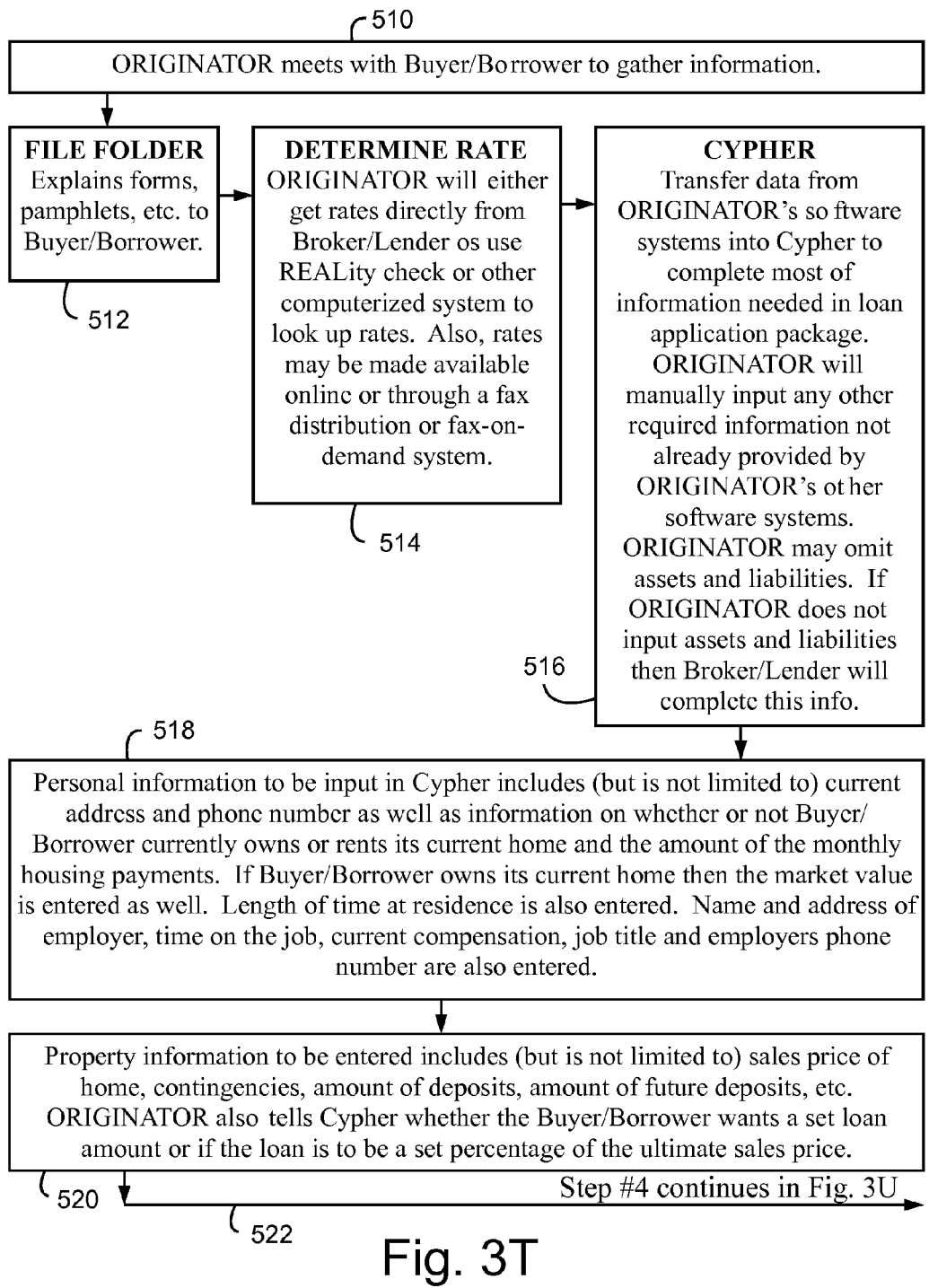
Figure 3V:
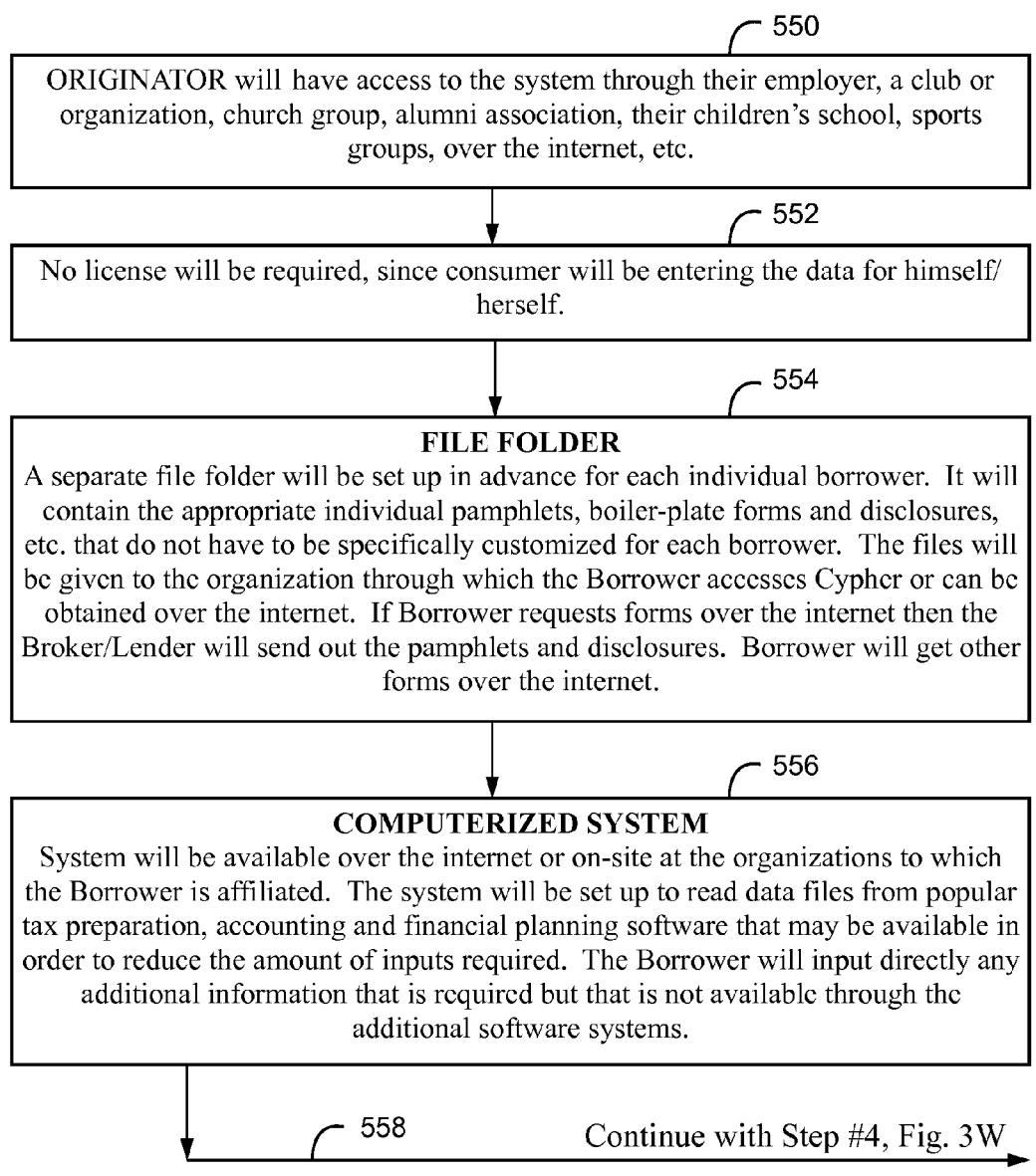
Figure 3W:
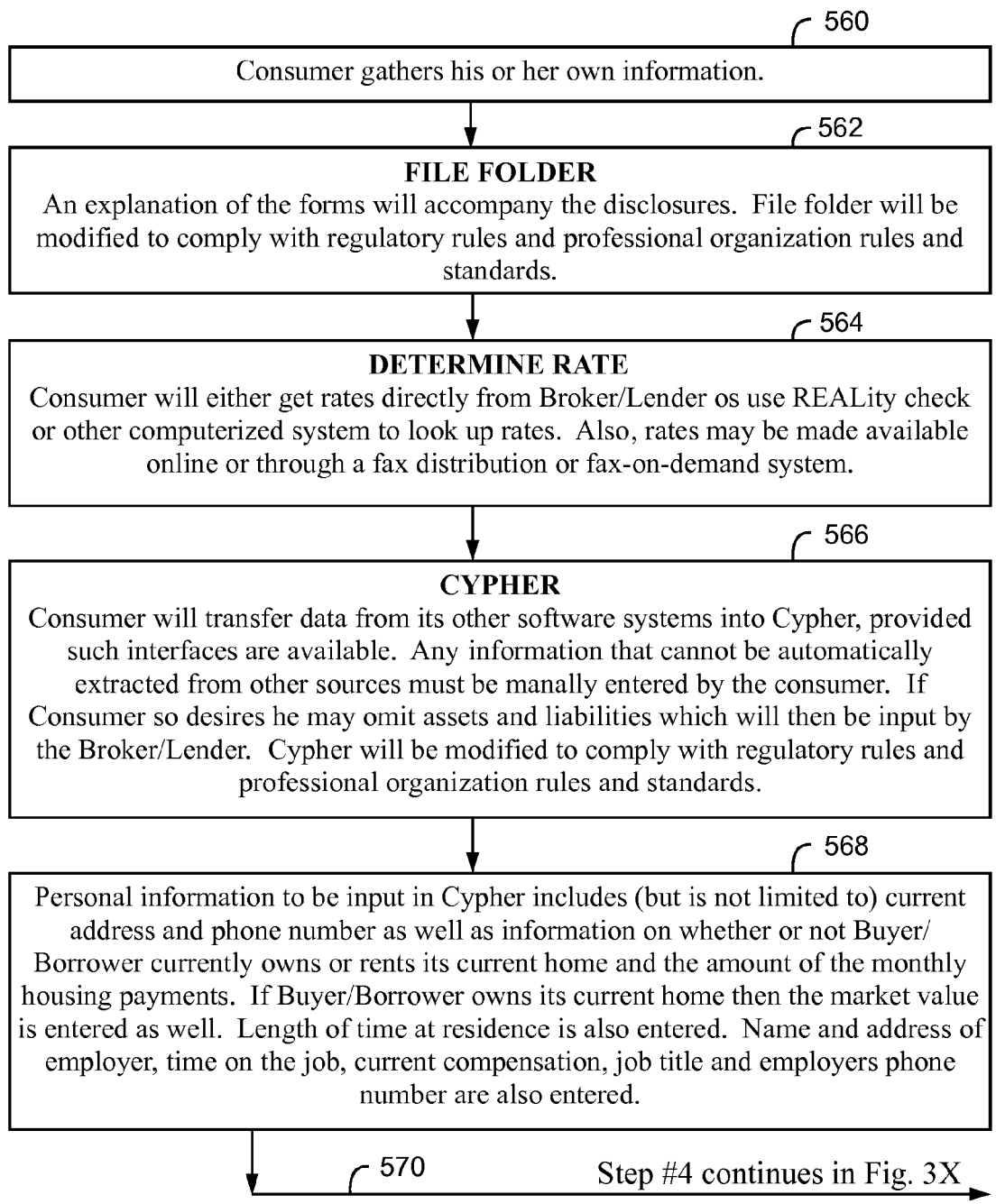
Figure 3Y:
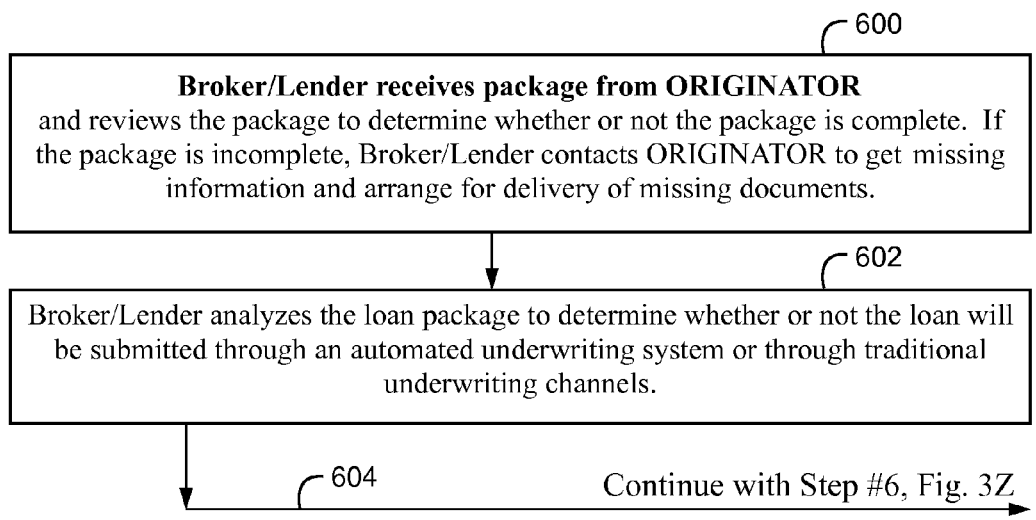

Arrow 232 directs the system and procedure to go to FIG. 3Y with step #5.

FIG. 3F includes the following for STEP #2—LICENSING—FOR the originator "B".

Box 240 asks "Is a special license required to originate loans?" Box 242 shows YES for Box 240.

Box 244 asks "Does the originator have required license?" Box 246 shows YES for Box 244

Box 248 shows the following. If the originator B has a lender's agent's license, it hangs with the Broker/Lender, or any other entity that allows the originator B to originate loans with the Broker/Lender.

Arrow 250 directs the system and procedure to go to Step #3 FIG. 3G.

Box 252 shows NO for Box 240.

Box 254 shows NO for Box 244.

Box 256 shows the Broker/Lender assists the originator in obtaining license, or the originator gets license on its own.

Box 258 shows the following. If the originator has a lender's broker's license, the originator may either hang it independently or may hang it directly with the Broker/Lender.

Box 260 shows the following. If the originator obtains an agent's license, it hangs with the Broker/Lender, or any other entity that allows the originator to originate loans with the Broker/Lender.

Box 262 shows the following. If the originator obtains a broker's license, the originator may either hang it independently or may hang it directly with the Broker/Lender.

FIG. 3G includes the following for STEP #3—PRELIMINARY SETUP—FOR the originator "B".

Box 264 shows the LOT FOLDER, which contains forms, pamphlets and disclosures that are not customized for each Buyer/the Borrower and a stacking order checklist. Each lot in the subdivision will have its own lot folder. Lot folder will be modified to comply with regulatory and professional organization rules and standards.

Box 266 shows COMPUTERIZED SYSTEM. System will be preconfigured for each subdivision using the originator's available lots. This pre-configuration reduces the input needed from the originator. All set parameters for each lot are pre-configured in advance (i.e. specific model option, by lot; lot premiums; elevation data; premiums for view, size, location, etc.)

Box 268 shows System can be customized to include any specialized forms that the originator uses in the course of its business (i.e. contracts, state disclosures, federal disclosures, local disclosures, etc.) Forms that are "Boiler Plate" may be copied and included in the lot folder instead. Cypher will be modified to comply with regulatory rules and professional organization rules and standards.

Arrow 269 directs the system and procedure to Continue with Step #4, FIG. 3H.

FIG. 3H includes the following STEP #4—INFORMATION AND INTERVIEW—FOR the originator "B".

Box 270 shows the originator meets with Buyer/the Borrower to gather information.

Box 272 shows the LOT FOLDER, which explains forms, pamphlets, etc. to Buyer/the Borrower.

Box 274 shows REALITY CHECK, the computer system used to prequalify Buyer/the Borrower to determine the maximum amount for which Buyer/the Borrower can qualify under several different loan scenarios.

Box 276 shows REALity Check can run several different options based on loan programs, down payment, closing costs, etc. Some of this information will be transferred to Cypher. the originator can get current rates from REALity Check, through rate sheets from the Broker/Lender (via modem), over the Internet from the Broker/Lender or directly from the Broker/Lender over the phone.

Box 278 shows CYPHER the originator inputs information that is needed to complete pre-configured sales contract and other the originator forms. Some inputs that are not required for the originator's forms but is required for the loan application is included as well. the originator may omit assets and liabilities sections of application. If it does omit these items they will be completed by the Broker/Lender.

Box 280 shows Personal information to be input in Cypher includes (but is not limited to) current address and phone number as well as information on whether or not Buyer/the Borrower currently owns or rents its current home and the amount of the monthly housing payments. If Buyer/the Borrower owns its current home then the market value is entered as well. Length of time at residence is also entered. Name and address of employer, time on the job, current compensation, job title and employers phone number are also entered.

Arrow 282 directs the system and procedure that Step #4 continues on FIG. 3I.

FIG. 3I includes the following STEP #4 (CONT)—INFORMATION AND INTERVIEW FOR the originator "B".

Box 290 shows Property information to be entered includes (but is not limited to) sales price of new home, date of price list being used, prices of any options and upgrades, amount of deposits, amount of future deposits, etc. the originator also tells Cypher whether the Buyer/the Borrower wants a set loan amount or if the loan is to be a set percentage of the ultimate sales price.

Box 292 shows Loan details to be entered include (but are not limited to) estimated final sales price after all options are selected and an estimated final loan amount (should estimate on the high side); rate; term; points; whether or not there is a balloon payment; title and escrow fees (if Cypher has these fees in advance they can be pre-programmed into the system) and whether or not the originator is giving a credit for closing costs. Such a credit can be manually input or Cypher can calculate the credit if it is based on a pre-determined formula. the originator will also indicate whether or not the Buyer/the Borrower will have impounds for taxes/insurance.

Box 294 shows the originator must also complete the Declarations section on the loan application (example page 3 of current FNMA 1003), this section discloses any lawsuits, bankruptcies, foreclosures, loan defaults, etc. Also, information about sex and national origin is requested. If Buyer/the Borrower does not wish to provide information about sex and national origin, the originator will acknowledge that Buyer/the Borrower does not wish to provide such information.

Box 296 shows the originator prints and explains forms to Buyer/the Borrower, including forms and pamphlets from the lot folder (the boiler plate forms). Buyer/the Borrower signs all forms.

Box 298 shows the originator collects all applicable documentation on the stacking order checklist from the Buyer/the Borrower, including (but not limited to) W-2 forms, paystubs, bank statements, tax returns, bankruptcy papers, retirement information, etc.

Box 300 shows the originator packages up all gathered information and puts said information in a pre-determined stacking order and sends it to the Broker/Lender for processing.

Arrow 302 directs the system and procedure to Continue with Step #5, FIG. 3Y Pages 10-13 of FIG. 3 have been cancelled. These Figures are not relabeled FIG. 3J includes the following for STEP #2—LICENSING FOR "FP". Where the originator "FP" includes CPAs, Financial Planners, Broker/Dealers, Stock Brokers, Insurance Brokers/Agents, Attorneys or other financial professionals. Collectively the originator is a financial professional.

Box 310 asks "Is a special license required to originate loans?" Box 312 shows YES for Box 310.

Box 314 asks "Does the originator have required license?" Box 316 shows YES for Box 314.

Box 318 shows the following. If the originator has a lender's agent's license, it hangs with the Broker/Lender, or any other entity that allows the originator B to originate loans with the Broker/Lender.

Arrow 320 directs the system and procedure to Continue with Step #3, FIG. 3K.

Box 322 shows NO for Box 310.

Box 324 shows No for Box 314.

Box 326 shows the following. If the originator has a lender's broker's license, the originator may either hang it independently or may hang it directly with the Broker/Lender.

Box 328 shows the Broker/Lender assists the originator in obtaining license, or the originator gets license on its own.

Box 330 shows the following. If the originator obtains an agent's license, it hangs with the Broker/Lender, or any other entity that allows the originator to originate loans with the Broker/Lender.

Box 332 shows the following. If the originator obtains a broker's license, the originator may either hang it independently or may hang it directly with the Broker/Lender.

FIG. 3K includes the following for STEP #3—PRELIMINARY SETUP—FOR the originator "FP".

Box 340 shows the file folder, which contains forms, pamphlets and disclosures that are not customized for each the Borrower and a stacking order checklist. Each the originator will have several blank files to be customized at application. File folder will be modified to comply with regulatory and professional organization rules and standards.

Box 342 shows COMPUTERIZED SYSTEM. The system will coordinate and read information from the originator's industry software such as tax files for accountants, insurance files for insurance brokers, Broker/Dealer files, etc. Through reading files in other software the originator uses in the course of its normal business practices, information can be extracted for loan documents. The originator inputs any infomation that is not extracted from its other software systems directly (see details below under CYPHER). Cypher will be modified to comply with regulatory rules and professional organization rules and standards.

Arrow 344 directs the system and procedure to Continue with Step #4, FIG. 3L.

FIG. 3L includes the following for STEP #4—INFORMATION AND INTERVIEW FOR the originator "FP".

Box 350 shows the originator meets with the Borrower to gather information.

Box 352 shows the file folder, which explains forms, pamphlets, etc. to the Borrower.

Box 354 shows DETERMINING RATE. The originator will either get rates directly from the Broker/Lender or use REALity check or other computerized system to look up rates. Also, rates may be made available online or through a fax distribution or fax-on-demand system.

Box 356 shows CYPHER Transfer data from the originator's software systems into Cypher to complete most of information needed in loan application package. the originator will manually input any other required information not already provided by the originator's other software systems. the originator may omit assets and liabilities. If the originator does not input assets and liabilities then the Broker/Lender will complete this info.

Box 358 shows Personal information to be input in Cypher includes (but is not limited to) current address and phone number. Length of time at residence is also entered. Name and address of employer, time on the job, current compensation, job title and employer's phone number are also entered.

Box 360 shows Property information to be entered includes (but is not limited to) current value of the Borrower's home as will as the age of the home and current payments.

Arrow 362 directs the system and procedure to continue Step #4 FIG. 3M.

FIG. 3M includes the following for STEP #4—(CONT)—the originator "FP".

Box 370 shows Loan details to be entered include rate; term; points; whether or not there is a balloon payment; title and escrow fees (they can be pre-programmed into the system). Also indicated is whether or not the Broker/Lender is giving a credit for closing costs. the originator will also indicate whether or not the Borrower will have impounds for taxes/insurance. If loan is to be a "No Point, No Fee" Cypher will calculate and disclose applicable credits.

Box 372 shows the originator must also complete the Declarations section on the loan application (example page 3 of current FNMA 1003), this section discloses any lawsuits, bankruptcies, foreclosures, loan defaults, etc. Also, information about sex and national origin is requested. If the Borrower does not wish to provide information about sex and national origin, the originator will acknowledge that the Borrower does not wish to provide such information.

Box 374 shows the originator prints and explains forms to the Borrower, including forms and pamphlets from the lot folder (the boiler plate forms). the Borrower signs all forms.

Box 376 shows the originator collects all applicable documentation on the stacking order checklist from the Borrower, including (but not limited to) W-2 forms, paystubs, bank statements, tax returns, bankruptcy papers, retirement information, etc.

Box 378 shows the originator packages up all gathered information and puts said information in a pre-determined stacking order and sends it to the Broker/Lender for processing.

Arrow 380 directs the system and procedure to Continue with Step #5, FIG. 3Y.

FIG. 3N includes the following for STEP #2—LICENSING—FOR the originator "FI".

Box 390 asks "Is a special license required to originate loans?" Box 392 shows YES for Box 390.

Box 394 asks "Does the originator have required license?" Box 396 shows YES for Box 394.

Box 398 shows the following. If the originator has a lender's agent's license, it hangs with the Broker/Lender, or any other entity that allows the originator B to originate loans with the Broker/Lender.

Arrow 400 directs the system and procedure to Continue with Step #3, FIG. 3O.

Box 402 shows No for Box 390.

Box 404 shows No for Box 394.

Box 406 shows the Broker/Lender assists the originator in obtaining license, or the originator gets license on its own.

Box 408 shows the following. If the originator has a lender's broker's license, the originator may either hang it independently or may hang it directly with the Broker/Lender.

Box 410 shows the following. If the originator obtains an agent's license, it hangs with the Broker/Lender, or any other entity that allows the originator to originate loans with the Broker/Lender.

Box 412 shows the following. If the originator obtains a broker's license, the originator may either hang it independently or may hang it directly with the Broker/Lender.

FIG. 3O includes the following for STEP #3—PRELIMINARY SETUP—FOR the originator "FI".

Box 420 shows the file folder, which contains forms, pamphlets and disclosures that are not customized for each Buyer/the Borrower and a stacking order checklist. Each the originator will have several blank files to be customized at application. File folder will be modified to comply with regulatory and professional organization rules and standards.

Box 422 shows COMPUTERIZED SYSTEM. The system will coordinate and read information from the originator's industry software. Through reading files in other software the originator uses in the course of its normal business practices, information can be extracted for loan documents. The originator inputs any information that is not extracted from its other software systems directly (see details below under CYPHER). Cypher will be modified to comply with regulatory rules and professional organization rules and standards.

Arrow 424 directs the system and procedure to Continue with Step #4, FIG. 3P.

FIG. 3P includes the following for STEP #4—INFORMATION AND INTERVIEW FOR the originator "FI".

Box 430 shows the originator meets with the Borrower to gather information.

Box 432 shows the file folder, which explains forms, pamphlets, etc. to the Buyer/the Borrower.

Box 434 shows DETERMINING RATE. The originator will either get rates directly from the Broker/Lender or use REALity check or other computerized system to look up rates. Also, rates may be made available online or through a fax distribution or fax-on-demand system.

Box 436 shows CYPHER Transfer data from the originator's software systems into Cypher to complete most of information needed in loan application package. the originator will manually input any other required information not already provided by the originator's other software systems. the originator may omit assets and liabilities. If the originator does not input assets and liabilities then the Broker/Lender will complete this info.

Box 438 shows Personal information to be input in Cypher includes (but is not limited to) current address and phone number. Length of time at residence is also entered. Name and address of employer, time on the job, current compensation, job title and employer's phone number are also entered.

Box 440 shows Property information to be entered includes (but is not limited to) current value of Buyer/the Borrower's home as will as the age of the home and current payments.

Arrow 442 directs the system and procedure to continue Step #4 on FIG. 3Q.

FIG. 3Q includes the following for STEP #4—(CONT)—FOR the originator "FI".

Box 450 shows Loan details to be entered include (but are not limited to) rate; term; points; whether or not there is a balloon payment; title and escrow fees (if Cypher has these fees in advance they can be pre-programmed into the system) and whether or not Broker/Lender is giving a credit for closing costs. Such a credit can be manually input or Cypher can calculate the credit if it is based on a predetermined formula. the originator will also indicate whether or not the Buyer/the Borrower will have impounds for taxes/insurance. If loan is to be a "No Point, No Fee" Cypher will calculate and disclose applicable credits.

Box 452 shows the originator must also complete the Declarations section on the loan application (example page 3 of current FNMA 1003), this section discloses any lawsuits, bankruptcies, foreclosures, loan defaults, etc. Also, information about sex and national origin is requested. If Buyer/the Borrower does not wish to provide information about sex and national origin, the originator will acknowledge that Buyer/the Borrower does not wish to provide such information.

Box 454 shows the originator prints and explains forms to Buyer/the Borrower, including forms and pamphlets from the lot folder (the boiler plate forms). Buyer/the Borrower signs all forms.

Box 456 shows the originator collects all applicable documentation on the stacking order checklist from the Buyer/the Borrower, including (but not limited to) W-2 forms, paystubs, bank statements, tax returns, bankruptcy papers, retirement information, etc.

Box 458 shows the originator packages up all gathered information and puts said information in a pre-determined stacking order and sends it to the Broker/Lender for processing.

Arrow 460 directs the system and procedure to Continue with Step #5, FIG. 3Y.

FIG. 3R includes the following for STEP #2—LICENSING—FOR the originator "R".

Box 470 asks "Is a special license required to originate loans?" Box 472 shows Yes for Box 470.

Box 474 asks "Does the originator have required license?" Box 476 shows YES for Box 474.

Box 478 shows the following. If the originator has a lender's agent's license, it hangs with the Broker/Lender, or any other entity that allows the originator B to originate loans with the Broker/Lender.

Arrow 480 directs the system and procedure to Continue with Step #3, FIG. 3S.

Box 482 shows No for Box 470.

Box 484 shows No for Box 474.

Box 486 shows the Broker/Lender assists the originator in obtaining license, or the originator gets license on its own.

Box 488 shows the following. If the originator has a lender's broker's license, the originator may either hang it independently or may hang it directly with the Broker/Lender.

Box 490 shows the following. If the originator obtains an agent's license, it hangs with the Broker/Lender, or any other entity that allows the originator to originate loans with the Broker/Lender.

Box 492 shows the following. If the originator obtains a broker's license, the originator may either hang it independently or may hang it directly with the Broker/Lender.

FIG. 3S includes the following with STEP #3—PRELIMINARY SETUP—FOR the originator "R".

Box 500 shows the file folder. Which contains forms, pamphlets and disclosures that are not customized for each Buyer/the Borrower and a stacking order checklist. Each the originator will have several blank files to be customized at application. File folder will be modified to comply with regulatory and professional organization rules and standards.

Box 502 shows COMPUTERIZED SYSTEM. The system will coordinate and read information from the originator's industry software Through reading files in other software the originator uses in the course of its normal business practices, information can be extracted for loan documents. the originator inputs any information that is not extracted from its other software systems directly (see details below under CYPHER). Cypher will be modified to comply with regulatory rules and professional organization rules and standards.

Arrow 504 directs the system and procedure to Continue with Step #4, FIG. 3T.

FIG. 3T includes the following for STEP #4—INFORMATION AND INTERVIEW FOR the originator "R".

Box 510 shows the originator meets with Buyer/the Borrower to gather information.

Box 512 shows the file folder, which explains forms, pamphlets, etc. to Buyer/the Borrower.

Box 514 shows DETERMINING RATE. The originator will either get rates directly from the Broker/Lender or use REALity check or other computerized system to look up rates. Also, rates may be made available online or through a fax distribution or fax-on-demand system.

Box 516 shows CYPHER. Transfer data from the originator's software systems into Cypher to complete most of information needed in loan application package. the originator will manually input any other required information not already provided by the originator's other software systems. the originator may omit assets and liabilities. If the originator does not input assets and liabilities then the Broker/Lender will complete this info.

Box 518 shows Personal information to be input in Cypher includes (but is not limited to) current address and phone number as well as information on whether or not Buyer/the Borrower currently owns or rents its current home and the amount of the monthly housing payments. If Buyer/the Borrower owns its current home then the market value is entered as well. Length of time at residence is also entered. Name and address of employer, time on the job, current compensation, job title and employers phone number are also entered.

Box 520 shows Property information to be entered includes (but is not limited to) sales price of home, contingencies, amount of deposits, amount of future deposits, etc. the originator also tells Cypher whether the Buyer/the Borrower wants a set loan amount or if the loan is to be a set percentage of the ultimate sales price.

Arrow 522 directs the system and procedure to continue Step #4 on FIG. 3U.

FIG. 3U includes the following for STEP #4—(CONT)—FOR the originator "R".

Box 530 shows Loan details to be entered include (but are not limited to) estimated final sales price after all options are selected and an estimated final loan amount (should estimate on the high side); rate; term; points; whether or not there is a balloon payment; title and escrow fees (if Cypher has these fees in advance they can be pre-programmed into the system) and whether or not the Broker/Lender is giving a credit for closing costs and if so the amount of the credit. Such a credit can be manually input or Cypher can calculate the credit if it is based on a pre-determined formula. the originator will also indicate whether or not the Buyer/the Borrower will have impounds for taxes/insurance.

Box 532 shows the originator must also complete the Declarations section on the loan application (example page 3 of current FNMA 1003), this section discloses any lawsuits, bankruptcies, foreclosures, loan defaults, etc. Also, information about sex and national origin is requested. If Buyer/the Borrower does not wish to provide information about sex and national origin, the originator will acknowledge that Buyer/the Borrower does not wish to provide such information.

Box 534 shows the originator prints and explains forms to Buyer/the Borrower, including forms and pamphlets from the lot folder (the boiler plate forms). Buyer/the Borrower signs all forms.

Box 536 shows the originator collects all applicable documentation on the stacking order checklist from the Buyer/the Borrower, including (but not limited to) W-2 forms, paystubs, bank statements, tax returns, bankruptcy papers, retirement information, etc.

Box 538 shows the originator packages up all gathered information and puts said information in a pre-determined stacking order and sends it to the Broker/Lender for processing.

Arrow 540 directs the system and procedure to Continue with Step #5, FIG. 3Y.

FIG. 3V includes the following for STEP #2 and STEP #3—LICENSING and SETUP—FOR the originator "C".

Box 550 shows the originator will have access to the system through their employer, a club or organization, church group, alumni association, their children's school, sports groups, over the Internet, etc.

Box 552 shows No license will be required, since consumer will be entering the data for himself/herself.

Box 554 shows the file folder. A separate file folder will be set up in advance for each individual borrower. It will contain the appropriate individual pamphlets, boiler-plate forms and disclosures, etc. that do not have to be specifically customized for each borrower. The files will be given to the organization through which the Borrower accesses Cypher or can be obtained over the Internet. If the Borrower requests forms over the Internet then the Broker/Lender will send out the pamphlets and disclosures. the Borrower will get other forms over the Internet.

Box 556 shows COMPUTERIZED SYSTEM. The System will be available over the Internet or onsite at the organizations to which the Borrower is affiliated. The system will be set up to read data files from popular tax preparation, accounting and financial planning software that may be available in order to reduce the amount of inputs required. The Borrower will input directly any additional information that is required but that is not available through the additional software systems.

Arrow 558 directs the system and procedure to Continue with Step #4, FIG. 3W.

FIG. 3W includes the following for STEP #4—INFORMATION GATHERING—FOR the originator "C".

Box 560 shows Consumer gathers his or her own information.

Box 562 shows the file folder. An explanation of the forms will accompany the disclosures. File folder will be modified to comply with regulatory rules and professional organization rules and standards.

Box 564 shows DETERMINING RATE. Consumer will either get rates directly from the Broker/Lender or use REALity check or other computerized system to look up rates. Also, rates may be made available online or through a fax distribution or fax-on-demand system.

Box 566 shows CYPHER. Consumer will transfer data from its other software systems into Cypher, provided such interfaces are available. Any information that cannot be automatically extracted from other sources must be manually entered by the consumer. If Consumer so desires he may omit assets and liabilities which will then be input by the Broker/Lender. Cypher will be modified to comply with regulatory rules and professional organization rules and standards.

Box 568 shows Personal information to be input in Cypher includes (but is not limited to) current address and phone number as well as information on whether or not Buyer/the Borrower currently owns or rents its current home and the amount of the monthly housing payments. If Buyer/the Borrower owns its current home then the market value is entered as well. Length of time at residence is also entered. Name and address of employer, time on the job, current compensation, job title and employers phone number are also entered.

Arrow 570 directs the system and procedure to continue Step #4 on 3X.

FIG. 3X includes the following for STEP #4—(CONT)—FOR the originator "C".

Box 580 shows Property information to be entered includes (but is not limited to) sales price of home, contingencies, amount of deposits, amount of future deposits, etc. Consumer also tells Cypher whether the Buyer/the Borrower wants a set loan amount or if the loan is to be a set percentage of the ultimate sales price.

Box 582 shows Loan details to be entered include (but are not limited to) estimated final sales price after all options are selected and an estimated final loan amount (should estimate on the high side); rate; term; points; whether or not there is a balloon payment; title and escrow fees (if Cypher has these fees in advance they can be pre-programmed into the system) and if the Broker/Lender is giving a credit for all or part of the non-recurring closing costs. Such a credit can be manually input or Cypher can calculate the credit if it is based on a pre-determined formula. Consumer will also indicate whether or not the Buyer/the Borrower will have impounds for taxes/insurance.

Box 584 shows Consumer must also complete the Declarations section on the loan application (example page 3 of current FNMA 1003), this section discloses any lawsuits, bankruptcies, foreclosures, loan defaults, etc. Also, information about sex and national origin is requested. If Buyer/the Borrower does not wish to provide information about sex and national origin, Consumer will acknowledge that Buyer/the Borrower does not wish to provide such information.

Box 586 shows Consumer prints all forms and also prints an explanation sheet regarding all the forms and then proceeds to sign the forms.

Box 588 shows Consumer collects all applicable documentation on the stacking order checklist including (but not limited to) W-2 forms, paystubs, bank statements, tax returns, bankruptcy papers, retirement information, etc.

Box 590 shows Consumer packages up all gathered information and puts said information in a predetermined stacking order and sends it to the Broker/Lender for processing.

Arrow 592 directs the system and procedure to Continue with Step #5, FIG. 3Y.

FIG. 3Y includes the following for STEP #5—PACKAGE RECEIVED BY THE BROKER/LENDER.

Box 600 shows the Broker/Lender receives package from the originator and reviews the package to determine whether or not the package is complete. If the package is incomplete, the Broker/Lender contacts the originator to get missing information and arrange for delivery of missing documents.

Box 602 shows the Broker/Lender analyzes the loan package to determine whether or not the loan will be submitted through an automated underwriting system or through traditional underwriting channels.

Figure 3Z:
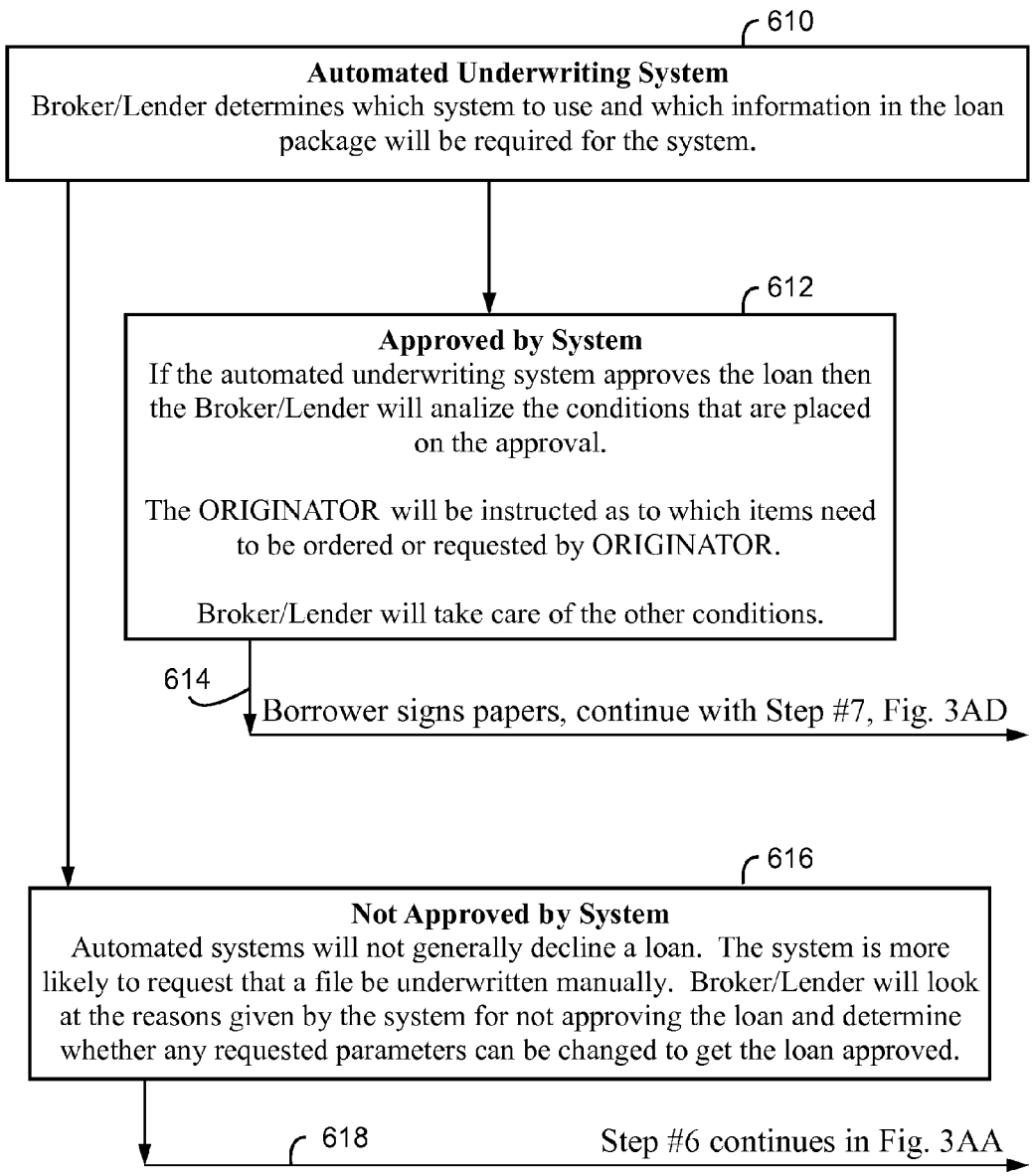
Figure 3A:
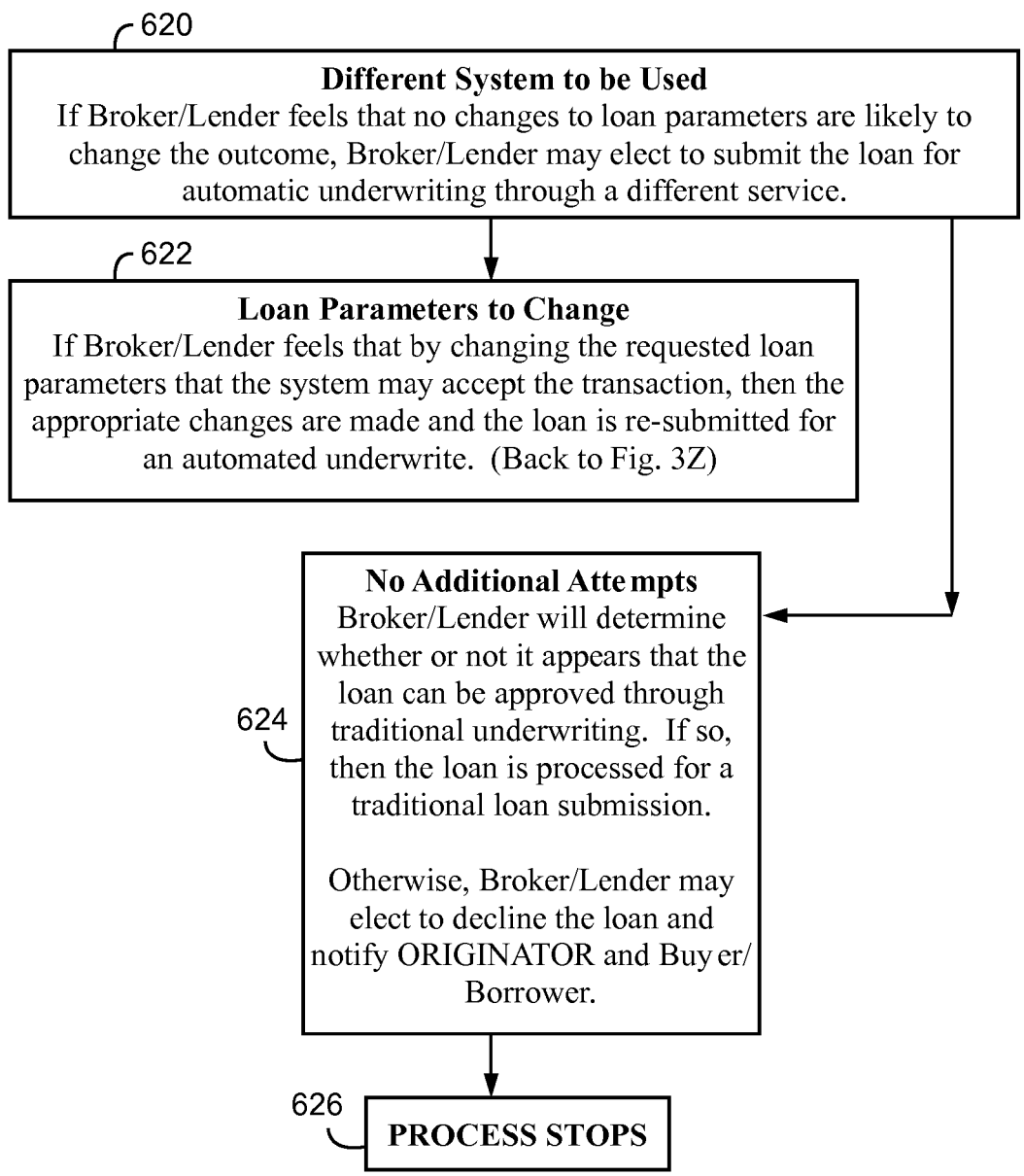
Figure 3A:
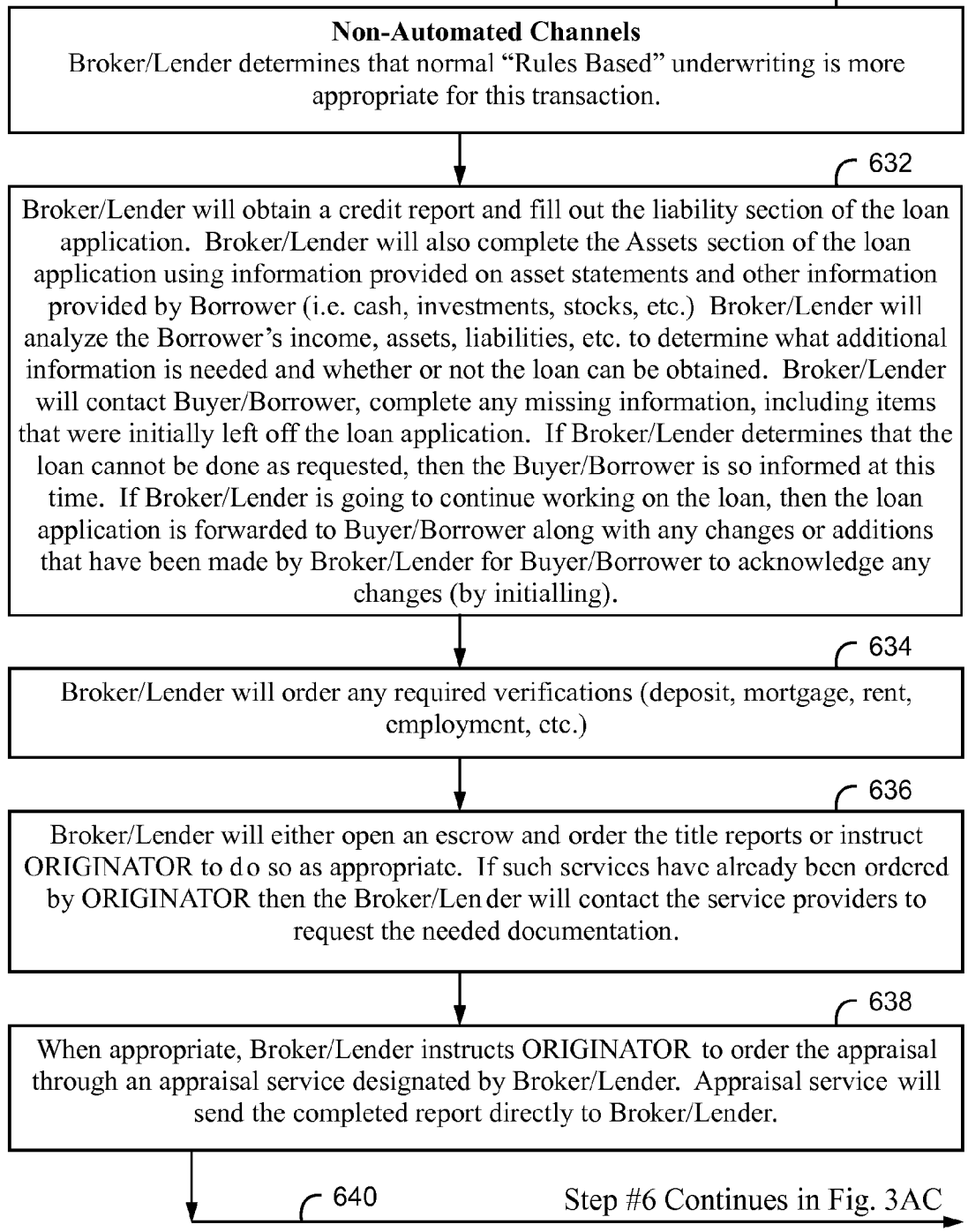
Figure 3A:
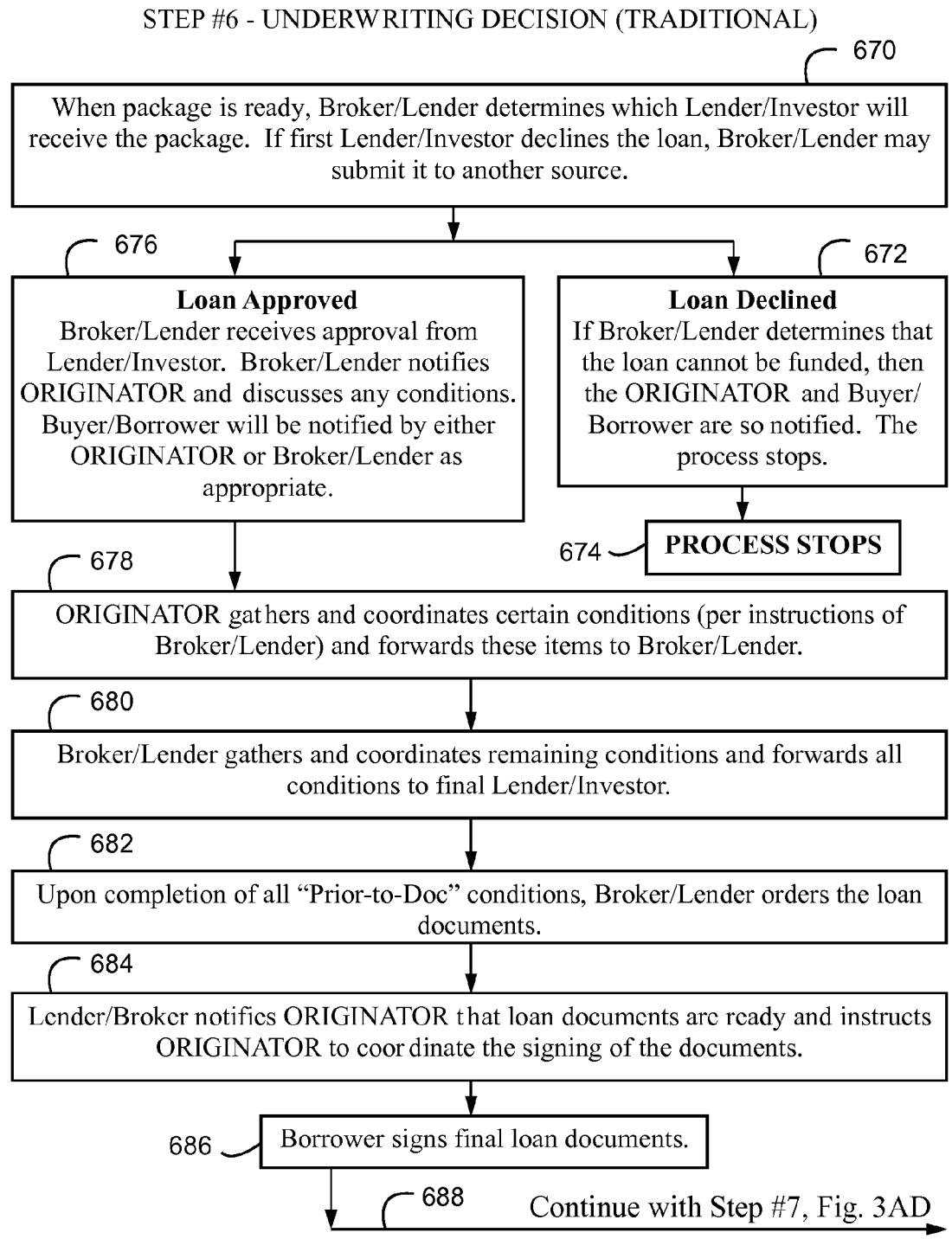
Figure 3A:
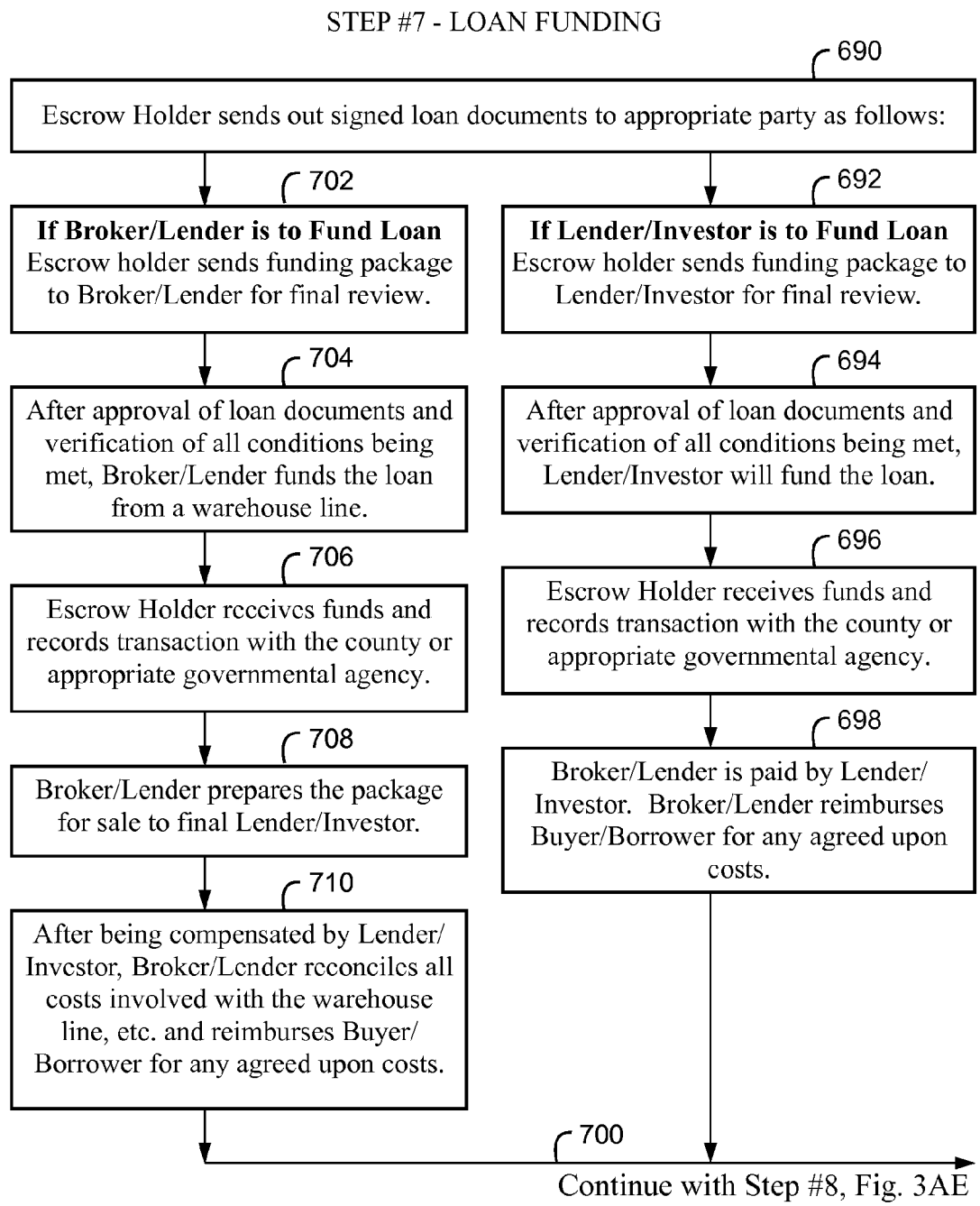
Figure 3A:
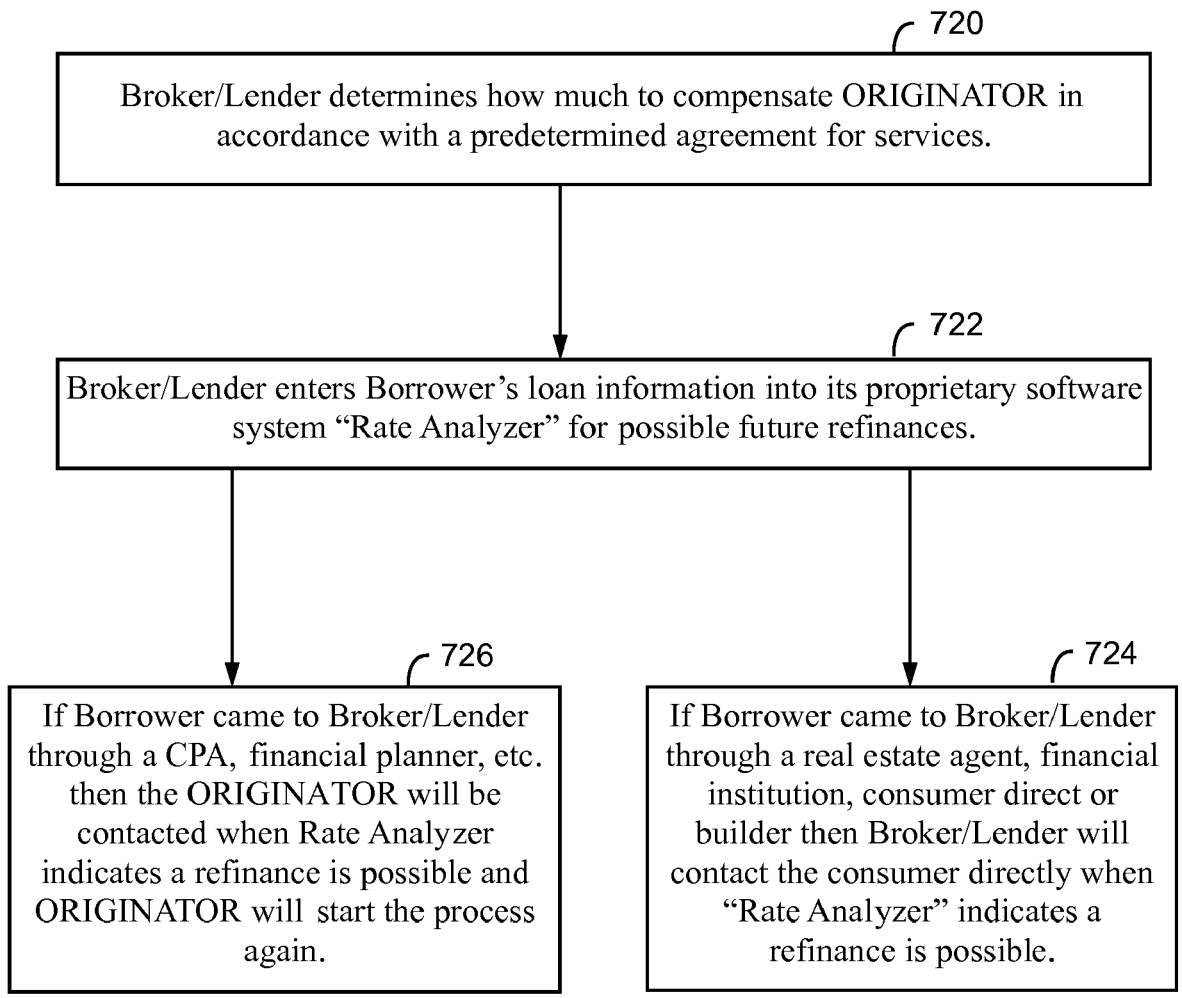

Arrow 604 directs the system and procedure to Continue with Step #6, FIG. 3Z.

FIG. 3Z includes the following for STEP #6—UNDERWRITING DECISION (AUTOMATED).

Box 610 shows Automated Underwriting System. the Broker/Lender determines which system to use and which information in the loan package will be required for the system.

Box 612 shows Approved by System. If the automated underwriting system approves the loan then the Broker/Lender will analyze the conditions that are placed on the approval. The originator will be instructed as to which items need to be ordered or requested by the originator. the Broker/Lender will take care of the other conditions.

Arrow 614 directs the system and procedure that the Borrower Signs Papers, Continue with Step #7, FIG. 3AD.

Box 616 shows Not Approved by System. Automated systems will not generally decline a loan. The system is more likely to request that a file be underwritten manually. the Broker/Lender will look at the reasons given by the system for not approving the loan and determine whether any requested parameters can be changed to get the loan approved.

Arrow 618 directs the system and procedure to continue Step #6 on FIG. 3AA.

FIG. 3AA includes the following for STEP #6—UNDERWRITING DECISION (AUTOMATED)—NOT ACCEPTED.

Box 620 shows Different System to be Used. If the Broker/Lender feels that no changes to loan parameters are likely to change the outcome, the Broker/Lender may elect to submit the loan for automatic underwriting through a different service.

Box 622 shows Loan Parameters to Change. If the Broker/Lender feels that by changing the requested loan parameters that the system may accept the transaction, then the appropriate changes are made and the loan is re-submitted for an automated underwrite. (Back to FIG. 3Z) Box 624 shows No Additional Attempts. The Broker/Lender will determine whether or not it appears that the loan can be approved through traditional underwriting. If so, then the loan is processed for a traditional loan submission. Otherwise, the Broker/Lender may elect to decline the loan and notify the originator and Buyer/the Borrower.

Box 626 shows Process Stops.

FIG. 3AB includes the following for STEP #6—UNDERWRITING DECISION (TRADITIONAL).

Box 630 shows Non-Automated Channels. The Broker/Lender determines that normal "Rules Based" underwriting is more appropriate for this transaction.

Box 632 shows the Broker/Lender will obtain a credit report and fill out the liability section of the loan application. The Broker/Lender will also complete the Assets section of the loan application using information provided on asset statements and other information provided by the Borrower (i.e. cash, investments, stocks, etc.) The Broker/Lender will analyze the Borrower's income, assets, liabilities, etc. to determine what additional information is needed and whether or not the loan can be obtained. The Broker/Lender will contact the Buyer/Borrower, complete any missing information, including items that were initially left off the loan application. If the Broker/Lender determines that the loan cannot be done as requested, then the Buyer/the Borrower is so informed at this time. If the Broker/Lender is going to continue working on the loan, then the loan application is forwarded to Buyer/the Borrower along with any changes or additions that have been made by the Broker/Lender for Buyer/the Borrower to acknowledge any changes (by initialing).

Box 634 shows the Broker/Lender will order any required verifications (deposit, mortgage, rent, employment, etc.)

Box 636 shows the Broker/Lender will either open an escrow and order the title reports or instruct the originator to do so as appropriate. If such services have already been ordered by the originator then the Broker/Lender will contact the service providers to request the needed documentation.

Box 638 shows when appropriate, the Broker/Lender instructs the originator to order the appraisal through an appraisal service designated by the Broker/Lender. Appraisal service will send the completed report directly to the Broker/Lender.

Arrow 640 directs the system and procedure to continue Step #6 on FIG. 3AC.

FIG. 3AC includes the following for STEP #6—UNDERWRITING DECISION (TRADITIONAL).

Box 670 shows when the package is ready, the Broker/Lender determines which Lender/Investor will receive the package. If first Lender/Investor declines the loan, the Broker/Lender may submit it to another source.

Box 672 shows Loan Declined. If the Broker/Lender determines that the loan cannot be funded, then the originator and Buyer/the Borrower are so notified. The process stops.

Box 674 shows PROCESS STOPS.

Box 676 shows Loan Approved. the Broker/Lender receives approval from Lender/Investor. The Broker/Lender notifies the originator and discusses any conditions. Buyer/the Borrower will be notified by either the originator or the Broker/Lender as appropriate.

Box 678 shows the originator gathers and coordinates certain conditions (per instructions of the Broker/Lender) and forwards these items to the Broker/Lender.

Box 680 shows the Broker/Lender gathers and coordinates remaining conditions and forwards all conditions to final Lender/Investor.

Box 682 shows Upon completion of all "Prior-to-Doc" conditions, the Broker/Lender orders the loan documents.

Box 684 shows Lender/Broker notifies the originator that loan documents are ready and instructs the originator to coordinate the signing of the documents.

Box 686 shows the Borrower signs final loan documents.

Arrow 688 directs the system and procedure to Continue with Step #7, FIG. 3AD.

FIG. 3AD includes the following STEP #7—LOAN FUNDING.

Box 690 shows Escrow Holder sends out signed loan documents to appropriate party as follows:

Box 692 shows the following. If Lender/Investor is to Fund Loan. Escrow holder sends funding package to Lender/Investor for final review.

Box 694 shows after approval of loan documents and verification of all conditions being met, Lender/Investor will fund the loan.

Box 696 shows Escrow Holder receives funds and records transaction with the county or appropriate governmental agency.

Box 698 shows the Broker/Lender is paid by Lender/Investor. The Broker/Lender reimburses Buyer/the Borrower for any agreed upon costs.

Arrow 700 directs the system and procedure to Continue with Step #8, FIG. 3AE.

Box 702 shows the following. If the Broker/Lender is to Fund Loan. Escrow holder sends funding package to the Broker/Lender for final review.

Box 704 shows after approval of loan documents and verification of all conditions being met, the Broker/Lender funds the loan from a warehouse line.

Box 706 shows Escrow Holder receives funds and records transaction with the county or appropriate governmental agency.

Box 708 shows the Broker/Lender prepares the package for sale to final Lender/Investor.

Box 710 shows after being compensated by Lender/Investor, the Broker/Lender reconciles all costs involved with the warehouse line, etc. and reimburses Buyer/the Borrower for any agreed upon costs.

FIG. 3AE includes the following for STEP #8—LOAN CLOSED.

Box 720 shows the Broker/Lender determines how much to compensate the originator in accordance with a predetermined agreement for services.

Box 722 shows the Broker/Lender enters the Borrower's loan information into its proprietary software system "Rate Analyzer" for possible future refinances.

Box 724 shows the following. If the Borrower came to the Broker/Lender through a real estate agent, financial institution, consumer direct or builder then the Broker/Lender will contact the consumer directly when "Rate Analyzer" indicates a refinance is possible.

Box 726 shows the following. If the Borrower came to the Broker/Lender through a CPA, financial planner, etc. then the originator will be contacted when Rate Analyzer indicates a refinance is possible and the originator will start the process again.

As illustrated in FIG. 4, builders utilize a series of screen displays 30 starting with Main Menu screen display 30a that has selection tabs 32 which are selected by pointing and clicking mouse 14 to move through screen displays 30. Selecting the File tab 32a leads the builder to File Management Control display screen 30b (FIG. 4b) from which the builder can create a new file for a particular buyer and property combination by selecting tab 34a or select an existing file by selecting tab 34b.

Selecting the Contract Info tab 32b from Main Menu display screen 30a leads the builder to Contract Information screen displays 30c (FIG. 4c) and 30d (FIG. 4d). Builders can receive the system pre-configured for each tract with separate data files already established for each lot in the subdivision as shown on Contract Information—Lot and Costs screen display 30c (FIG. 4c).

If the subdivision already has pre-configured plans and/or elevations then the system is also pre-set with this data and displayed in field group 34a, enabling the builder's sales agents to spend less time entering data and more time doing sales related activities. If given lots have a predetermined lot premium from the beginning of the development then this also is pre-configured and displayed in field 34b. Other pre-configured information that may be provided includes lender information 34c, liquidated damages information 34d, late close penalty information 34e, escrow company 34j and whether the property is subject to CC&R's 34f or a prior sale 34g. The builder enters any other information not already pre-configured that is needed to complete the loan application such as the loan to value (LTV) to use for loan calculations 34h, and the deposits received 34i. Amounts such as the total purchase price 34k and loan amount 34l are automatically calculated. Selecting the Next button 34l moves the builder to Contract Information—Buyer Info display screen 30b (FIG. 4d).

On Contract Information—Buyer Info display screen 30d the builder enters information regarding the buyer into the system and then returns to Main Menu display screen 30a when done by selecting Main Menu button 36a. The builder enters information such as the buyer's address 36b, telephone number 36c, current home information 36d. By selecting the Copy Address button 36e, the information from the first listed buyer fields 36b, 36c and 36d is copied into the co-buyer fields 36f. The builder also enters information regarding the buyer's social security number 36g, the co-buyer's social security number 36h, the buyer's employment 36i and the co-buyer's employment 36j.

Figure 4A:
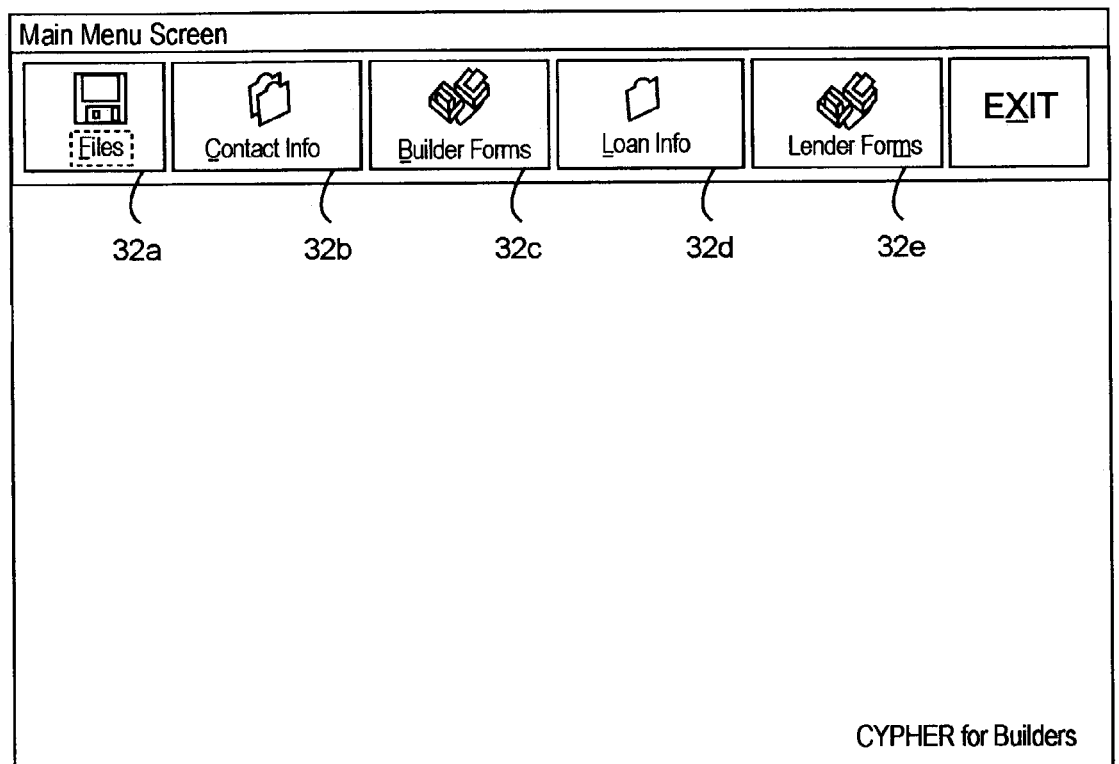
Figure 4B:
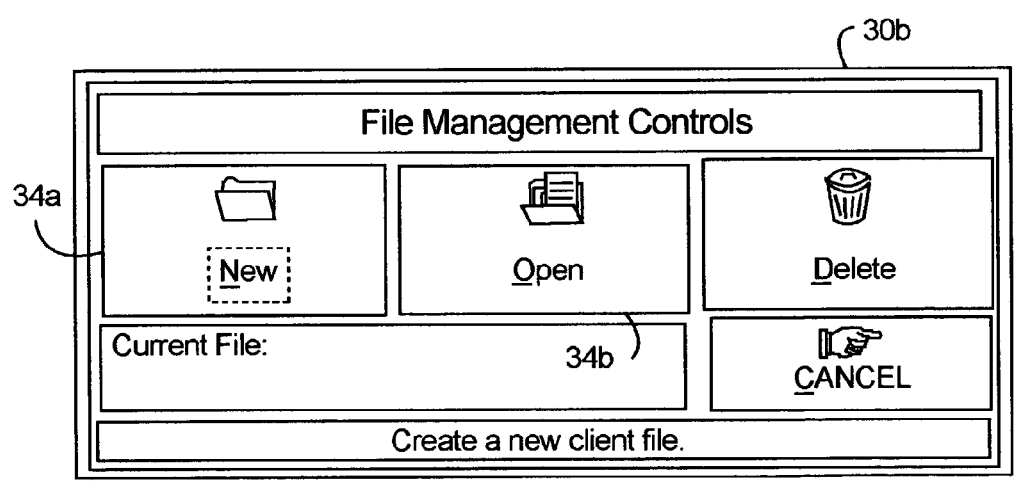
Figure 4G:

Selecting Loan Info tab 32d from Main Menu screen display 30a leads the builder to Loan Information screen displays 30e (FIG. 4e), 30f (FIG. 4f) and 30g (FIG. 4g). On screen display 30e, the builder enters loan information 38 regarding the loan amount 38a (if not already entered) and terms for first mortgage 38b, and if not pre-configured, escrow/title/tax issues 38c and credit to closing costs 38d. Selecting the Next button 40 moves the builder to the next Loan Information screen display 30f where the builder answers a series of yes/no questions 38e regarding the borrower and co-borrower (i.e., buyer and co-buyer) by checking the appropriate answer box. The builder also selects appropriate responses regarding the residence of the borrower and co-borrower from pull down fields 38f. Again, selecting Next button 42 moves the builder to the next Loan Information screen display 30g. On screen display 30g the builder enters information for government monitoring purposes on the borrower and co-borrower by selecting the appropriate boxes 38g. In text field 38h, the builder provides any explanations required for the declarations made on screen 30f or any other explanatory information necessary. The builder then returns to Main Menu screen display 30a by selecting the Main Menu button 44.

Figure 4H:
Figure 4H:

Selecting Builder Forms tab 32 from Main Menu screen display 30a leads the builder to Builder Forms screen display 30h (FIG. 4h). The builder selects the boxes 46 for the builder forms that are to be printed.

Selecting Loan Forms tab 32 from Main Menu screen display 30a leads the builder to Loan Forms screen display 30h (FIG. 4h). The builder selects the boxes 48 for the loan forms that are to be printed.

Owner-sellers have the system pre-configured with the information on the subject property. Where appropriate, real estate agents have the software system pre-configured to print out the purchase agreement generally used by members of their local Board of Realtors or multiple listing service group as well as additional forms and disclosures that are generally used and accepted and/or required. The real estate agent can also interface with his or her local MLS group to draw all of the pertinent property information into the system directly from the MLS computer service provided the MLS allows the real estate agent to access the system in this way. If the real estate agent's MLS provider is unable or unwilling to so cooperate but has the data available on the Internet then an additional software module is included to allow the real estate agent to view the information in a popular web browser such as those readily available by Netscape and Microsoft. This added software module is pre-programmed to translate the data that will be presented on a given screen of information from a web site and can actually save the appropriate fields to a data file that can be accessed by the loan origination system.

Figure 5A:
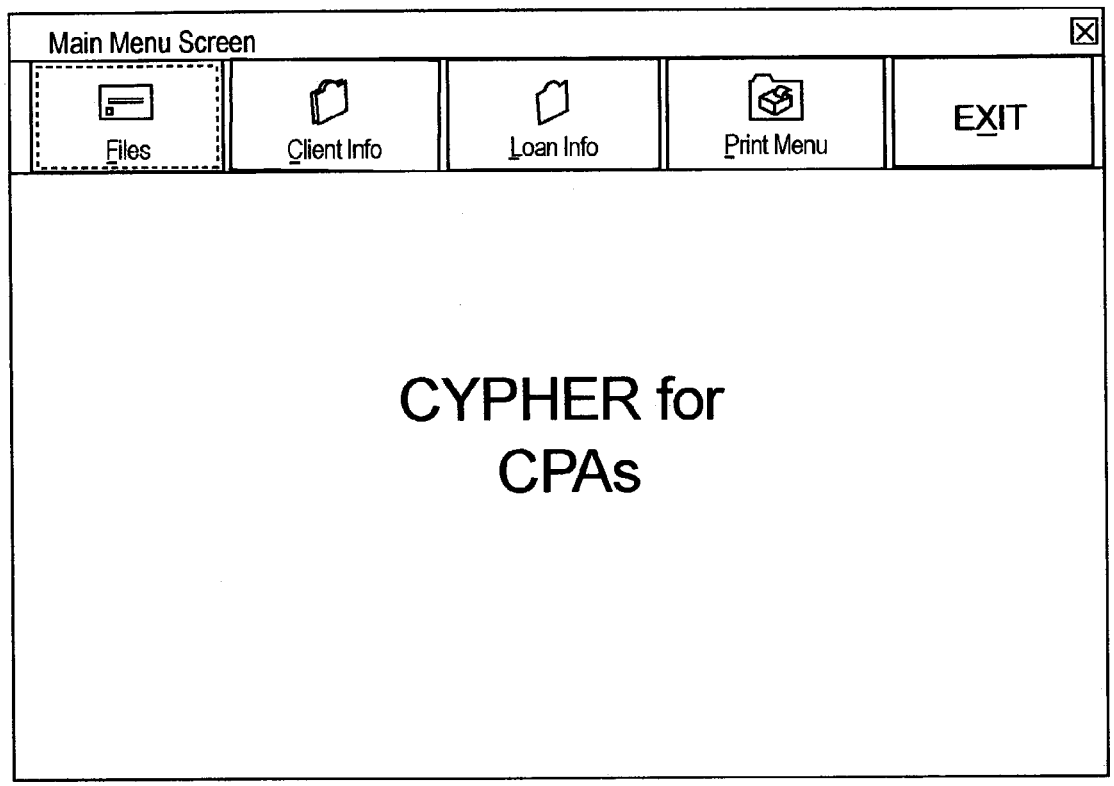
Figure 5B:
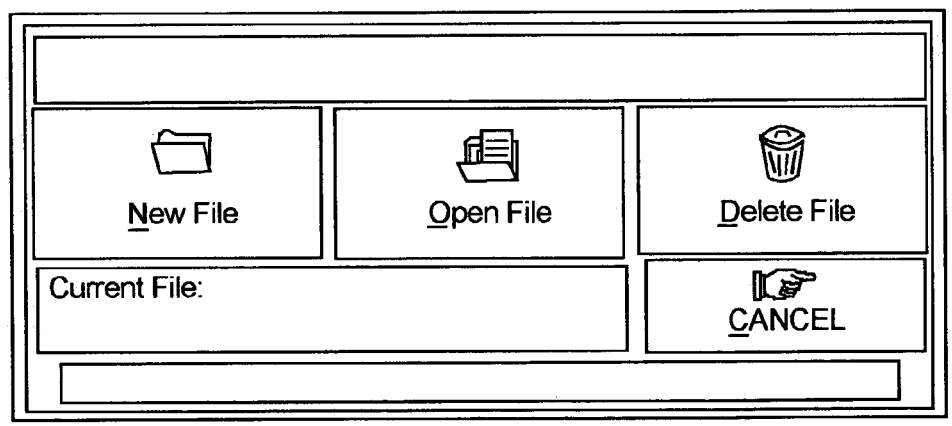

As illustrated in FIGS. 5a-5g, in the case of CPAs and other tax preparers acting as loan originators the system is set up to default to a refinance as shown on screen display 50 in FIG. 5d, as this is the most common function for these types of loan originators. The system can also be configured for purchases rather than refinances. Information regarding the current lien holder 52a, amount owed 52b and the priority 52c is entered into the appropriate fields if the information is not available from other customer service software in memory unit 24 and transferred into the system of the present invention as explained below. Otherwise, the screen displays are substantially the same as for the builder screen displays shown in FIGS. 4a-h and operate in the same manner to collect the same information. The system provides an interface with (or accept exported data from) popular tax preparation or accounting software which allows the loan originator to utilize detailed income and asset data already in his or her possession to reduce the loan origination time, and potential errors in inputting duplicate data. The system can also be incorporated into accounting or tax preparation software if so desired, which would allow seamless integration with little additional work.

In the case of direct consumers acting as loan originators the software system is configured to accept exported data from popular tax and or accounting software systems or is directly incorporated into tax and/or accounting software such as Intuit's Quicken®, QuickBooks® and TurboTax®. Popular accounting software often maintains detailed information on a consumer's assets and liabilities and have income information by way of evidence of net payroll deposits. Tax software may have definitive income information as well as information on the borrower's current property addresses and the addresses of any rental properties owned as well as income and expense information on those properties. All this information is needed in the processing of a mortgage loan and the consumer uses these system packages to submit a loan application directly to a final lender, bypassing the loan agent or loan broker to save additional fees or obtain a lower interest rate for the same fees.

The system is configurable to provide other professionals with a version of the software that best suits their situation. The user interface screens illustrated in FIGS. 4a-h and 5a-g would be modified to reflect the type of information that these other professionals already possess as well as meeting their specific needs.

Once basic information on the borrower (i.e., loan customer) is in the system and basic questions are answered, the loan originator need only provide a few loan details to make the final calculations and print the forms and reports. This information includes, but is not limited to, one or more of the following: loan amount, interest rate and points charged, length of the loan term and whether or not there is a balloon payment required. The system is customized with standard fees for other services required in the processing of a loan application which includes, but is not limited to, one or more of the following: fees for appraisals, credit reports, loan discount and/or origination, broker fees, flood certificate, tax service fees, wire transfer, processing, underwriting, document preparation, administration, other miscellaneous lender fees, various title and escrow company fees, charges for escrow, owner's title insurance, lender's title insurance, courier, processing, document preparation, notary, charges for any required endorsements, and typical county, city and state taxes/stamps, recording fees, etc. Any other fees that are typical to a given area or loan program can also be customized before the system is distributed to the loan originator, which in turn reduces the amount of detailed knowledge about loan or mortgage origination that is required by the loan originator.

The system is directly linked with title insurance companies, escrow companies, pest control companies, home inspection companies and other service providers to speed up the process as well as provide instant information with regards to fees charged. Companies that wish to be a part of the system can offer reduced rates and fees if so desired due to the greater ease with which the service can be processed. If such companies do not wish to provide a direct active link for the system but have relatively stable fees or fee charts for their services then such fees are pre-programmed into the system to provide accurate data.

The system uses these figures to make certain assumptions with regards to the various loan programs that allow printer 20 of computer system 10 to print out original loan application documents and disclosure forms that are complete enough for a lender to accept them for the processing and approval of a mortgage or other real estate loan. In the case for which a loan program requires impounds for taxes and hazard insurance then the loan originator is so informed and initial reserves for these items are also specified. If impounds are optional the loan originator is so informed and allowed to select whether or not impounds are desired. If impounds are not available the loan originator is also so informed.

The data from the system is corroborated by linking with a credit reporting service and the actual debt accounts are imported directly into the system using such a service. This information includes as much of the following information on each account as is available from the information service provider:
1. Account type
2. Name of lender/creditor
3. Account number
4. Balance owed
5. Months reported
6. Monthly payment
7. Number of payments remaining
8. High credit limit
9. Any other information available If the final lender or investor accepts on-line collateral assessments or appraisals then the system is linked to service providers which offer such reports and the data is drawn directly into the processing system.

If the final lender or investor accepts underwriting decisions made by an automated underwriting system such as Loan Prospector, Loan Originator, Desktop Underwriter or any new such system to be developed or if the final lender or investor has its own in-house automated underwriting system (such as GE Capital's OMNI Score) then the system can also be linked to such underwriting systems to allow the loan originator to get an immediate approval if the borrower is qualified for such immediate approval.

This system makes a typical loan broker or lender's loan officer unnecessary as the referral source or direct consumer is able to provide nearly as much value added to the transaction as is normally provided by the loan officer. The system allows lenders, mortgage brokers, mortgage bankers, and investors to compensate the loan originator for originating the loan(s).

Figure 6:
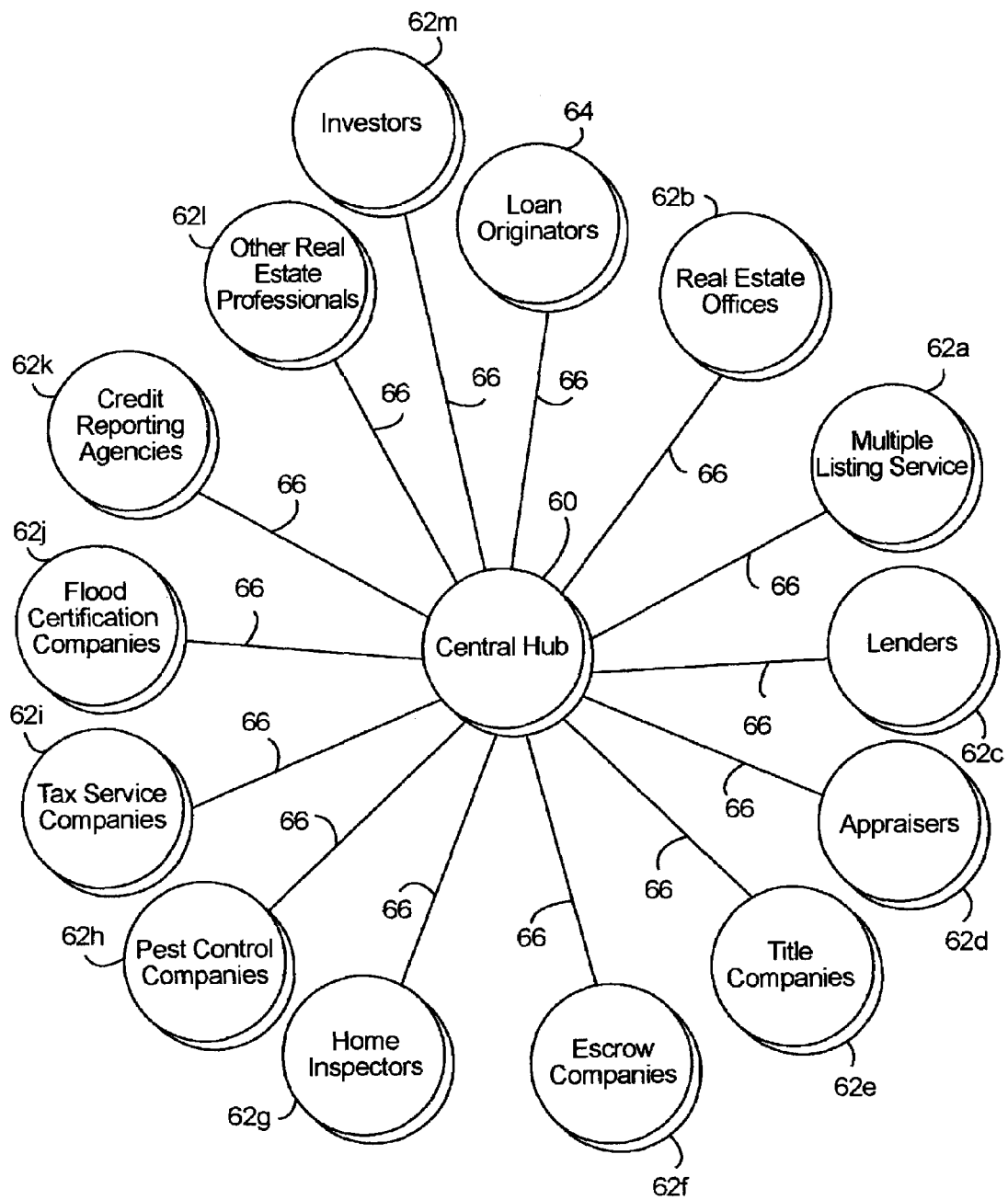
FIG. 6 is a schematic diagram illustrating the connections between the central hub and the computer systems of the other entities involved in the loan process.

As shown in FIG. 6, the system carries out the above described processes by means of a central data processing hub or host computer 60 which coordinates and processes information between two or more of the following:
1. Multiple Listing Services (MLS) 62*a*
2. real estate offices 62*b*
3. lenders/underwriters 62*c*
4. appraisers 62*d*
5. title companies 62*e*
6. escrow companies 62*f*
7. home inspectors 62*g*
8. pest control companies 62*h*
9. tax service companies 62*i*
10. flood certification companies 62*j*
11. credit reporting agencies 62*k*
12. other appropriate professionals involved in a real estate or real estate loan transaction 62*l*
13. investors 62*m*
14. loan originators 64.

Figure 7:
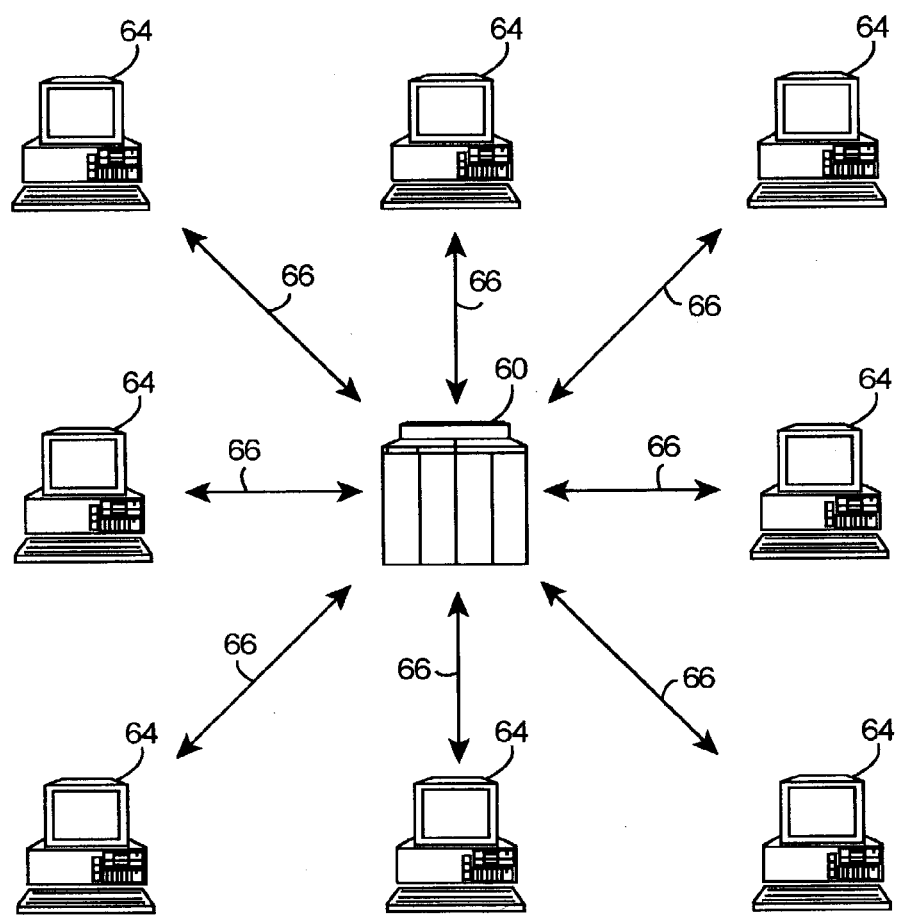
FIG. 7 is a schematic diagram illustrating the connections between the central hub and the loan originator computer systems.
Figure 8A:
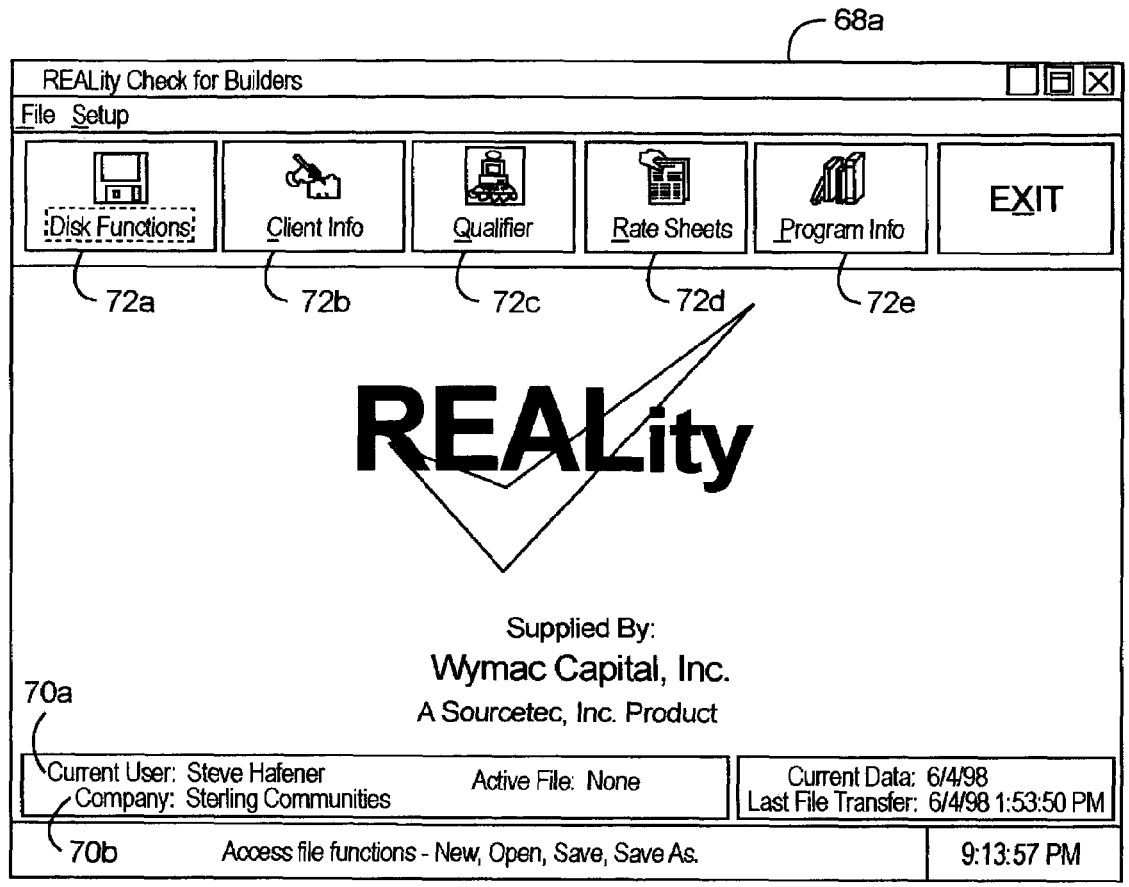
Figure 8B:
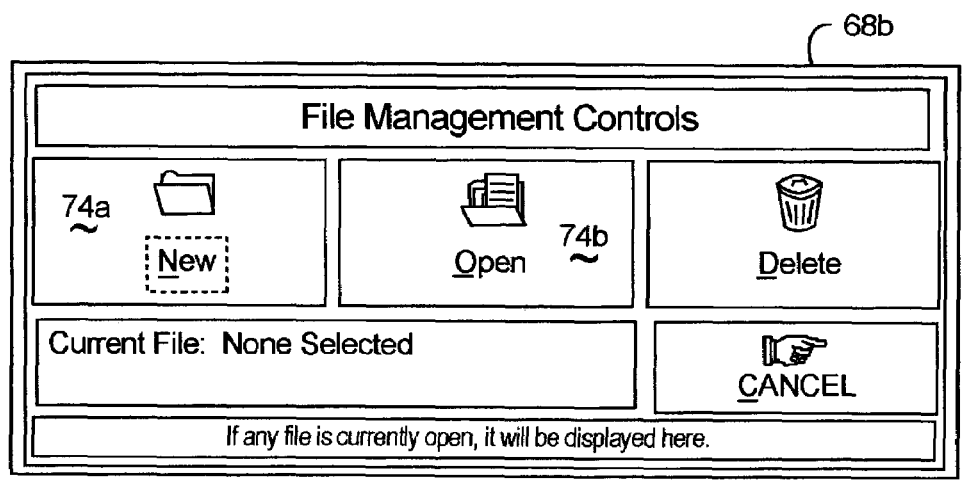
Figures 8C, 8D:

The system, as depicted in FIG. 6, has a hub and spoke configuration, where the flow of information is controlled by central hub 60. Information is exchanged between loan originator 64 and other entities 62 via central hub 60. Data transfer links 66 between central hub 60 and entities 62 and 64 may be any suitable transfer mechanism such as the Internet or a direct modem connection. As depicted in FIG. 7, multiple loan originators 64 are coupled to central hub 60.

The loan originator computer system allows the loan originator to input data that he or she already has or obtains from the borrower, into the system via a pre-developed matrix for organizing the information such as the screen displays of FIGS. 4*a-h* and 5*a-g*. If using other customer service computer software system(s), then the information will be transferred through the computer or other electronic media to forms or systems needed by the loan originator to coordinate the information.

The system of the present invention dictates that the loan originator follow specific steps in gathering the information and disclosing information to the buyer or borrower, and providing proper documentation to the lender or investor. These steps will include some or all of the following:
1. Fill out the loan application, either by hand or through a computer assisted processing system.
2. Analyze buyers' or borrowers' income and debt to determine the maximum mortgage that the borrower can afford either using a calculator or a computer pre-qualification system.
3. Educate the buyer or borrower in the home buying and financing process, advising him or her about different types of loan products available and demonstrate how closing costs and monthly payments may vary under different programs. This may be done with handout fliers that go through most of the explanation for the loan originator, such as standard regulatory pamphlets and through information generated by the system (examples of which are included in Appendix A).
4. Collect required financial information as appropriate which may include one or more of the following: pay stubs, W-2 forms, tax returns, bank statements, 401K and/or pension and/or profit sharing statements, divorce decree, bankruptcy and bankruptcy discharge papers and any additional information as may be required by the final lender or investor for a given loan program.

5. Maintain regular contact with the buyer or borrower, the lender and any real estate agents that may be involved and anybody else involved in the transaction between the application and the closing of the transaction to apprise buyer or borrower of the status of the application and to gather any additional information, as needed.
6. Order any legal documents required, including but not limited to any of the following, as appropriate: preliminary title report, CC&Rs, homeowners association certificates or any other required documentation on the property.
7. Determine whether the property is located in a special flood hazard zone or order such service through a flood certification company to so determine.
8. Participate in the loan closing
9. Initiate and order the appraisal through an appraisal service determined by lender or investor.
10. Provide appropriate loan disclosures when necessary, such as good faith estimate, fair lending notices, disclosures about the relationship between the lender or investor and the loan originator including the compensation to be paid to originator by lender/investor and other disclosures as may be required by various laws or licensing requirements.
11. Give copies of everything that has been signed by the buyer or borrower to the buyer or borrower as well as any fliers or handouts deemed necessary by the broker, lender or investor.

For various programs the lender or investor will determine which of the preceding items must be completed in order to qualify for compensation and whether any additional requirements must also be fulfilled. The original signed copies of all documentation are forwarded to the broker, lender or investor for processing and loan approval, along with a stacking order form generated by the system (an example of which is included as the last page of Appendix A).

Loan Calculation Module

The loan origination software present in computer system 10 also contains a module for enabling real estate agents, CPAs, attorneys, home builders and other mortgage and non-mortgage related persons to provide potential home buyers or homeowners with a variety of financing options, open house fliers, pre-qualification certificates and loan parameters.

The system enables in-depth mortgage calculations to be computed on a variety of mortgage loan programs even if the computer user has limited or no knowledge of current rates and loan guidelines. This enables a lender to provide the information to its own agents as well as prospective referral sources on as many of the brokers or lenders programs as the broker or lender desires. The in depth calculations and information provided enable the loan originator to appear extremely knowledgeable in real estate lending even if this is not the case.

Computer data files with current rates and program guidelines are maintained on a bulletin board system or other host computer system at broker or lender's site or another site designated by broker, lender or software provider. Central hub 60 periodically polls the bulletin board or host system to obtain the rate and program information. These file transfers will take place through a computer modem, or other electronic media. Such rates can be updated as often as lender desires, preferably at regular intervals. File transfers can also take place through an Internet connection if available. When the file transfer portion of the system of the present invention is executed, information on each and every prospective borrower from each and every user of the system is compiled into a single file at central hub 60 which is then transmitted by central hub 60 to lenders 62c. This enables the lender to gather desired information on prospective clients even if the referral source chooses not to provide it to the lender.

Additionally, central hub 60 collects current rate and program guideline data from lenders 62c, which is then transferred on data link 66 to all of the loan origination computer systems 10 in the field along with the files required to process the rates and any additional bulletins or program changes. The rate and program guideline updates are transferred upon request from the individual loan origination computer systems 10. However, the system may be configured to transmit the updates to the loan origination computer systems 10 at loan originators 64 periodically without waiting for update requests.

The loan originator inputs loan calculation data regarding the borrower into the system by means of user interface screens 68a-h, as depicted in FIGS. 8a-h, and keyboard/mouse input devices. When the portion of the system that runs calculations is executed it reads a data file on memory unit 24 that tells the system one or more of the following items about the authorized user acting as a loan originator: name, company name, address, telephone number and any other information previously input by the authorized user. If more than one authorized user uses the same machine or network installation then the loan originator is provided with a list from which to select his or her name. This way all reports can be personalized with the loan originator's name, address and phone number as well as the name, address and phone number of the loan originator's contact person with the broker or lender. If accessing over the Internet, the loan originator identifies himself or herself through a login procedure. At least a portion of the information is displayed on main menu screen display 68a as shown in fields 70a and 70b of FIG. 8a.

Once the loan originator is into the main body of the program the following areas can be selected from main menu screen display 68a by pointing and clicking on the appropriate tab with mouse 14: file management 72a, borrower info 72b, qualifier 72c, rate sheets 72d, detailed program information 72f and open house flier generator (not shown but would be presented as another tab to the right of the program info tab 72f)

File management (screen 68b in FIG. 8b): The loan originator is allowed to either create a new file 74a or select a previously created file 74b. Once a file is opened or created the loan originator returns to the main menu screen display 68a.

Borrower info (screen 68c in FIG. 8c): If the loan originator has not either opened or created a file, then he or she is prompted by the computer to enter a new, unique file name for this session. On this next screen 68c the loan originator is able to enter information on the buyer or borrower including one or more of the following in fields 76: name(s) 76a, address 76b, telephone number(s) 76c, income(s) 76d, social security number(s) 76e, and any other information desired by the lender. System allows the loan originator to input the income as weekly, monthly or annually in fields 76f, but then converts the entered figures internally into a monthly figure for debt ratio calculations. If calculations are being run for a purchase then the loan originator inputs the money to be used for a down payment in field 76g. If calculations are being run for a refinance then the loan originator inputs the value of the property. If the loan originator is a real estate agent processing info for a listing then a list price can also be entered (fields not shown). The data entered on this screen is saved to a master file in memory unit 24 for the current loan originator which is compiled and sent on to the lender the next time rates and programs are updated. Pressing the DONE button 76h moves the loan originator to Qualifier screen 68d.

Qualifier (screens 68d in FIG. 8d): The loan originator is prompted in field 78a to indicate to the system whether calculations are to be run for the maximum loan amount or purchase price under each loan program or for a specific loan amount or purchase price. The purchase price is entered in field 78b and whether the property is a condominium in field 78c. The loan originator also inputs the amount of the monthly payments that borrower is currently making for other debt servicing in fields 78d. The amount of the funds available, which is carried over from screen display 68c, is indicated in field 78e. The loan calculation is based upon this amount as the down payment, unless one of the fixed percentage buttons 78f is selected. Selecting one of the buttons 78f will alter the value in field 78d in accordance with the percentage selected and the loan calculation will be based upon this amount of down payment. Pressing the CALCULATION button 78g performs the calculation and moves the loan originator to either Calculation Results screen 68e or Qualification Information screen 68f depending on the selection made in field 78a.

If the loan originator has specified maximum loan amount/purchase price then the system takes several steps to determine the maximum loan amount and/or purchase price under each and every program. The resultant information is displayed on Qualification Information screen 68f in FIG. 8f. The information can be printed in either summary or detailed form by selecting Print Info button 82a. Steps taken include:

1. Calculating the maximum loan amount allowed under the program based on the equity in the property.
2. Calculating the maximum total loan payment for principal, interest, taxes and insurance (PITI) based on debt ratios allowed under the program.
3. Calculating the maximum total debt load allowed under each program and comparing this number with a sum of the maximum PITI and the current monthly debt for other expenses. If this sum is greater than the maximum total debt allowed, then the maximum PITI for each program is appropriately reduced to allow the total debt servicing to be within program guidelines.
4. Running appropriate calculations based on other loan program guidelines. If any restriction indicates that a maximum loan amount under a given program is less than the strict maximum from step 1 above then a temporary "maximum" is stored with this reduced number.
5. PITI is calculated based on the final "maximum" loan amount and is compared to the maximum PITI from steps 2 and 3. If this new calculation is greater than the allowable amount then the computer system lowers the loan amount calculated in step 4 by increments calculated by interpolating the difference between allowed PITI and the PITI for the requested loan amount in order to approach a final maximum loan amount. This step repeats itself up to 100 times in order to come as close as possible to the maximum number.
6. The system can also be customized for any of the above listed program variations to show how far the lender typically stretches things by "exception" and this information is compiled into a separate list to show how much more the borrower may qualify for if the exception is granted.
7. This information is then organized and output to the screen. The loan originator has the option of several different reports to organize data in a printed format.

If the loan originator has selected a specific loan amount or purchase price in field 78a then the system runs the exact same steps 1-6 from above, and then compares the maximum loan amount or purchase price in each loan program with the request loan amount or purchase price. The resultant information is displayed on Calculation Results screen 68e in FIG. 8e. Any instance for which the maximum loan amount or purchase price is greater than the amount requested is a match and the loan program's data is transferred into a temporary array of qualifying programs. Finally the PITI is calculated for each loan program under the requested loan amount or purchase price and the data is output to the screen. If exception data is also used and required for the output then a second list is used to show programs for which borrower may qualify if the exception is granted. From Calculation Results screen 68e, the loan originator then has the option of several reports to organize the data in a printed format by selecting button 80a. The loan originator can also print out a pre-qualification certificate by selecting button 80b if and only if the borrower appears to qualify under at least one loan scenario. The qualification module also calculates appropriate APRs if needed in order to distribute the calculations to the public.

Once the loan originator is done with the qualification screens the loan originator returns to Main Menu screen display 68a by pressing the DONE button 80c on screen 68e or 82b on screen 68f.

The Rate Sheet option 72d from Main Menu screen display 68a prints out rate sheets showing all the programs on the system and various tiers of retail pricing, if available.

The Loan Program Info option 72f from Main Menu screen display 68a sends the loan originator to display screen 68g in FIG. 8g to give the loan originator the option of selecting from a list of the loan programs on the system displayed in field 84a. The loan originator scrolls to the desired loan program and selects the view details button 84b to view various loan program details such as current rates and fees, index, margin and caps for ARMs and allowable loan amounts at various loan to value ratios as displayed on Detailed Program Information screen display 68h in FIG. 8h. If the system is customized with "exception" guidelines then these are also shown here.

The open house flier option is only available in cases for which the loan originator is a real estate agent, builder or full service broker and allows the loan originator to select from a variety of programs to print up open house fliers for the loan originator's marketing purposes. These fliers have the name, address and phone number of the loan originator and the loan originator's company as well as the name, address and phone number of the lender and the loan originator's contact person with lender. The open house flier calculates APRs if needed in order to show the fliers to the public.

From the above description, it will be apparent that the invention disclosed herein provides a novel and advantageous mortgage loan and financial services data processing system. The foregoing discussion discloses and describes merely exemplary methods and embodiments of the present invention. One skilled in the art will readily recognize from such discussion that various changes, modifications and variations may be made therein without departing from the spirit and scope of the invention. Accordingly, disclosure of the present invention is intended to be illustrative, but not limiting, of the scope of the invention, which is set forth in the following claims.

We claim:

1. A method, comprising the steps of:
    a loan originator independently providing services necessary for the origination of a mortgage loan and not duplicative of services provided by a loan broker by operating a loan originator computer associated with the loan originator as a member of a financial institution, further comprising the steps of:

collecting by the loan originator operating the loan originator computer loan data for a loan application in coordination with a loan broker distinct from the loan originator, for a loan customer distinct from the loan originator applying for a loan, further comprising the steps of:

collecting pre-stored customer data regarding the loan customer into a loan originator computer;

collecting by the loan originator new customer data different from the pre-stored customer data into the loan originator computer;

creating a loan application by combining in the loan originator computer the pre-stored customer data, the new customer data, and information about the loan; and transferring the loan application to the loan broker from the loan originator computer; and automatically verifying the services provided by the loan originator comply with the guidelines of federal and state law;

wherein the financial institution collection comprises the members: a bank, a savings and loan, a thrift, and a credit union.

2. The method of claim 1,
wherein the step collecting the pre-stored customer data regarding the loan customer is further comprised of the step of:
reading files from industry software used by the loan originator to extract pre-stored customer data regarding the loan customer.

3. The method of claim 1,
the step collecting the new customer data is further comprised of the steps of:
the loan originator obtaining credit bureau data regarding the loan customer from a remote credit bureau computer system.

4. The method of claim 1,
wherein the step collecting pre-stored customer data is further comprised of the steps of:
reading at least one file the loan originator uses in normal business to extract information for the loan application; and
inserting the information into the loan application.

5. The method of claim 4,
wherein the step inserting the information into the loan application is comprised of at least one member of the collection comprising the steps of:
transferring the information into the loan application; and
the loan originator manually inputting other required information not provided by the files used by loan originator into loan application.

6. The method of claim 1,
wherein the pre-stored customer data and new customer data different from the pre-stored customer data collectively include at least one member of the information type collection comprising:
personal information, property information, declarations, and demographics.

7. The method of claim 6,
wherein the pre-stored customer data and new customer data different from the pre-stored customer data collectively include each member of the information type collection.

8. The method of claim 6,
wherein the pre-stored customer data and new customer data different from the pre-stored customer data collectively further include assets-liabilities.

9. The method of claim 6,
wherein the personal information includes a current address, at least one phone number, a length of time at residence, an employer name, an employer address, time on the job, current compensation, job title, and an employer phone number.

10. The method of claim 6,
wherein the property information includes a current value of a home, home age, and at least one current payment.

11. The method of claim 6,
wherein the declarations includes disclosure of any lawsuits, disclosure of any bankruptcies, disclosure of any foreclosures, and disclosure of any loan defaults.

12. The method of claim 6,
wherein the demographics includes:
results of the loan originator requesting sex information of the loan customer; and
results of the loan originator requesting demographic information of the loan customer.

13. The method of claim 1,
wherein the information about the loan includes a loan rate, a term, points, whether there is a balloon payment, a title fee, an escrow fee, whether the loan broker giving credit for closing costs, whether the Borrower will have impounds for taxes/insurance, and applicable credits if loan is to be no point-no fee.

14. The method of claim 13, further comprising the step of: determining the loan rate.

15. The method of claim 14,
wherein the step determining the loan rate is further comprised of at least one member of the collection comprising the steps of:
the loan originator getting the loan rate directly from the loan broker;
using a computerized system to look up the loan rates;
using the loan rates available online;
using the loan rates through a fax distribution system; and
using the loan rates through a fax-on-demand system.

16. The method of claim 1,
wherein the step of automatically verifying the services further comprising the step of:
providing the loan originator with a stacking order checklist for the loan customer; and
wherein the step of the loan originator providing services, further comprising the step of:
the loan originator collecting from the loan customer applicable documentation;
wherein the applicable documentation includes a W-2 form, a paystub, a bank statement, a tax return, a bankruptcy paper, and retirement information.

17. The method of claim 16, wherein the step of the loan originator providing services, further comprising the steps of:
the loan originator printing a form collection comprising at least two forms and printing at least two pamphlets;
the loan originator presents the form collection and printed pamphlets to the loan customer;
the loan originator explains the form collection and printed pamphlets to the loan customer; and
an originator receives the form collection members signed by the loan customer.

18. The method of claim 16,
wherein the step transferring the loan application is further comprised of the step of:
the loan originator packaging the collected applicable documentation, and form collection members signed by the loan customer in a pre-determined stacking order to create the loan application.

19. A method, comprising the steps of:
a loan originator independently providing services necessary for the origination of a mortgage loan and not duplicative of services provided by a loan broker by operating a loan originator computer associated with the loan originator is a member of a financial institution, further comprising the steps of:
  collecting by the loan originator operating the loan originator computer loan data for a loan application in coordination with a loan broker distinct from the loan originator, for a loan customer distinct from the loan originator applying for a loan, further comprising the steps of:
  collecting pre-stored customer data regarding the loan customer into a loan originator computer;
  collecting by the loan originator new customer data different from the pre-stored customer data into the loan originator computer;
  creating a loan application by combining the pre-stored customer data, the new customer data, and information about the loan; and
wherein the method further comprising the step of:
  automatically verifying the services provided by the loan originator comply with the guidelines of federal and state law, comprising the step of: providing the loan originator with a stacking order checklist for the loan customer;
wherein the step of the loan originator further comprising the steps of:
  the loan originator collecting from the loan customer applicable documentation;
  the loan originator printing a form collection comprising at least two forms and printing at least two pamphlets;
  the loan originator presents the form collection and printed pamphlets to the loan customer;
the loan originator explains the form collection and printed pamphlets to the loan customer;
the loan originator receives the form collection members signed by the loan customer; and
transferring the loan application to the loan broker, further comprising the step of:
  the loan originator packaging the collected applicable documentation, and form collection members signed by the loan customer in a pre-determined stacking order to create the loan application;
wherein the financial institution is at least one of a bank, a savings and loan, a thrift, and a credit union; and
wherein the applicable documentation includes a W-2 form, a paystub, a bank statement, a tax return, a bankruptcy paper, and retirement information.

\* \* \* \* \*